(12) United States Patent
Jha et al.

(10) Patent No.: US 11,500,713 B2
(45) Date of Patent: Nov. 15, 2022

(54) METHODS AND SYSTEMS THAT RANK AND DISPLAY LOG/EVENT MESSAGES AND TRANSACTIONS

(71) Applicant: VMWARE, INC., Palo Alto, CA (US)

(72) Inventors: Ritesh Jha, Bangalore (IN); Nikhil Jaiswal, Bangalore (IN); Jobin Raju George, Bangalore (IN); Vaidic Joshi, Bangalore (IN); Shivam Satija, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 68 days.

(21) Appl. No.: 17/133,479

(22) Filed: Dec. 23, 2020

(65) Prior Publication Data

US 2022/0113938 A1    Apr. 14, 2022

(30) Foreign Application Priority Data

Oct. 12, 2020    (IN) .............................. 202041044375

(51) Int. Cl.
*G06F 11/07*    (2006.01)
(52) U.S. Cl.
CPC ........ *G06F 11/079* (2013.01); *G06F 11/0709* (2013.01); *G06F 11/0778* (2013.01)
(58) Field of Classification Search
CPC . G06F 11/0709; G06F 11/0778; G06F 11/079
See application file for complete search history.

(56) References Cited

U.S. PATENT DOCUMENTS

| 7,398,433 | B2 * | 7/2008 | Benedek ............... | G06F 11/079 |
| | | | | 714/38.14 |
| 2018/0165142 | A1 * | 6/2018 | Harutyunyan ........ | G06F 11/079 |
| 2019/0303231 | A1 * | 10/2019 | Togawa .............. | G06F 11/0778 |

* cited by examiner

*Primary Examiner* — Joseph R Kudirka

(57) ABSTRACT

Methods and systems that automatically rank log/event messages and log/event-message transactions to facilitate analysis of log/event-messages generated within distributed-computer systems are disclosed. A base-window dataset and current-window dataset are selected for diagnosis of a particular error or failure and processed to generate a transaction sequence for each dataset corresponding to log/event-message traces identified in the datasets. Then, frequencies of occurrence of log/event-message types relative to transaction types are generated for each dataset. From these two sets of relative frequencies of occurrence, changes in the relative frequency of occurrence for each log/event-message-type/transaction-type pair are generated. Normalized scores for log/event-message-type/transaction-type pairs and scores for transaction types are then generated from the changes in the relative frequency of occurrence. The generated scores reflect the relevance of log/event-messages in traces corresponding to particular transaction as well as the relevance of transaction types to the error or failure.

24 Claims, 45 Drawing Sheets

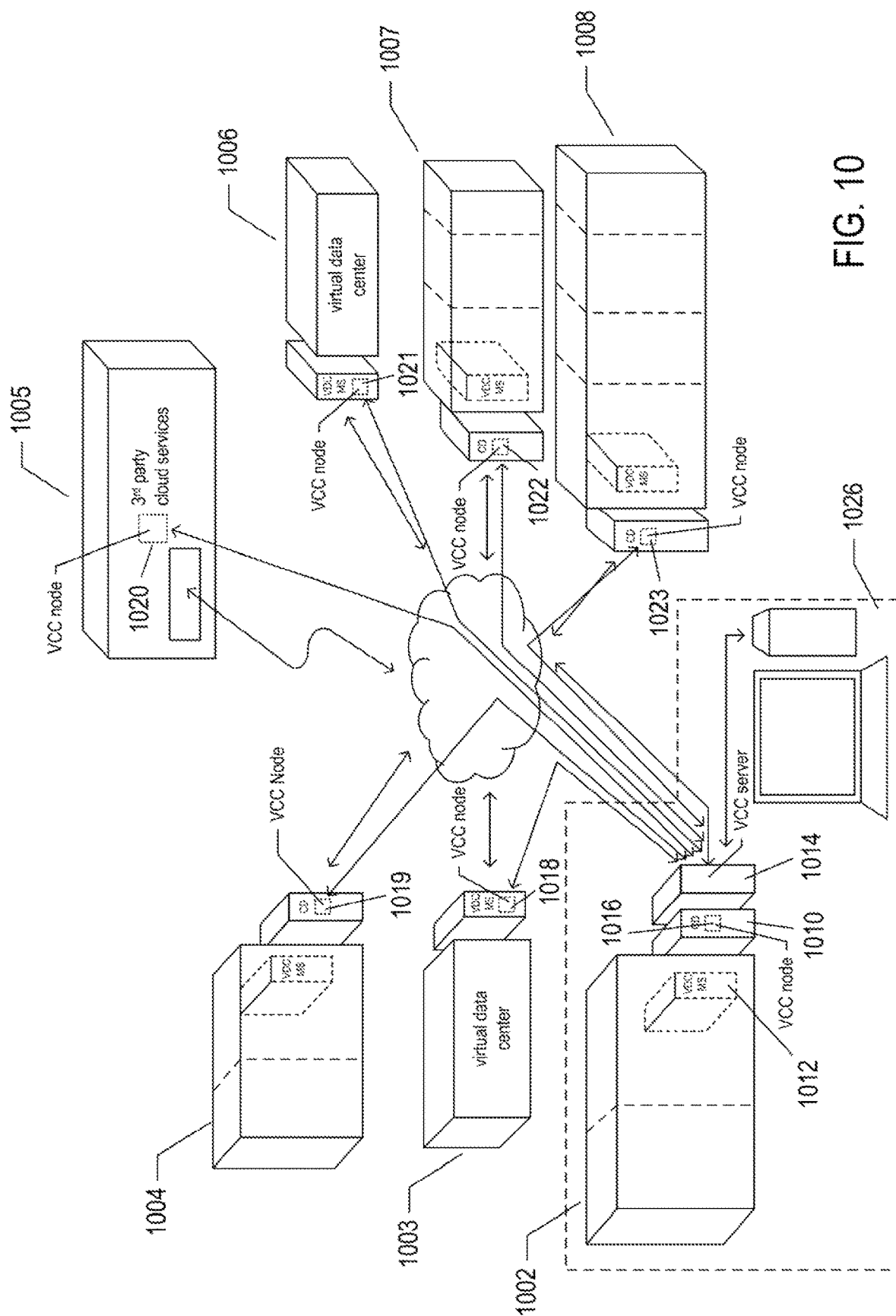

1104 {

2013-12-02T10:44:24.095Z li-qe-esx5.vmware.com Rhttpproxy: [28959B90 verbose 'Proxy Req 46691'] Connected to localhost:8307

2013-12-02T10:44:24.094Z li-qe-esx5.vmware.com Rhttpproxy: [FFFC2B90 verbose 'Proxy Req 46691'] new proxy client TCP (local=127.0.0.1:80, peer=127.0.0.1:50155)

2013-12-02T10:44:24.093Z li-qe-esx5.vmware.com Rhttpproxy: [2889B90 verbose 'Proxy Req 46685'] The client closed the stream, not unexpectedly.

Dec  2 18:48:29 strata-vc 2013-12-02T18:48:30.273Z [7FA39448B700 info 'commonvpxLro' opID=1947d5f9] [VpxLRO] -- FINISH task-internal-2163522 -- -- vim.SessionManager.logout -

2013-12-02T18:48:51.396Z strata-esx1.eng.vmware.com Vpxa: [65B5AB90 verbose 'VpxaHalCnxHostagent' opID=WFU-ed393333] [WaitForUpdatesDone] Completed callback 2013-12-02T18:48:51.395Z strata-esx1.eng.vmware.com Vpxa: [65B5AB90 verbose 'VpxaHalCnxHostagent' opID=WFU-ed393333] [WaitForUpdatesDone] Starting next WaitForUpdates() call to hostd 2013-12-02T18:48:51.395Z strata-esx1.eng.vmware.com Vpxa: [65B5AB90 verbose 'vpxavpxaInvtVm' opID=WFU-ed393333] [VpxaInvtVmChangeListener] Guest DiskInfo Changed 2013-12-02T18:48:51.395Z strata-esx1.eng.vmware.com Vpxa: [65B5AB90 verbose 'halservices' opID=WFU-ed393333] [VpxaHalServices] VMGuestDiskChange Event for vm(6) 59

2013-12-02T18:48:51.395Z strata-esx1.eng.vmware.com Vpxa: [65B5AB90 verbose 'hostdvm' opID=WFU-ed393333] [VpxaHalVmHostagent] 59: GuestInfo changed 'guest.disk'

2013-12-02T18:48:51.395Z strata-esx1.eng.vmware.com Vpxa: [65B5AB90 verbose 'VpxaHalCnxHostagent' opID=WFU-ed393333] [VpxaHalCnxHostagent::ProcessUpdate] Applying updates from 123718 to 123719 (at 123718)

2013-12-02T18:48:51.395Z strata-esx1.eng.vmware.com Vpxa: [65B5AB90 verbose 'VpxaHalCnxHostagent' opID=WFU-ed393333] [WaitForUpdatesDone] Received callback
2013-12-02T18:48:51.360Z li-dev-esx6.eng.vmware.com Hostd: [617C1B90 error 'SoapAdapter.HTTPService'] HTTP Transaction

FIG. 11

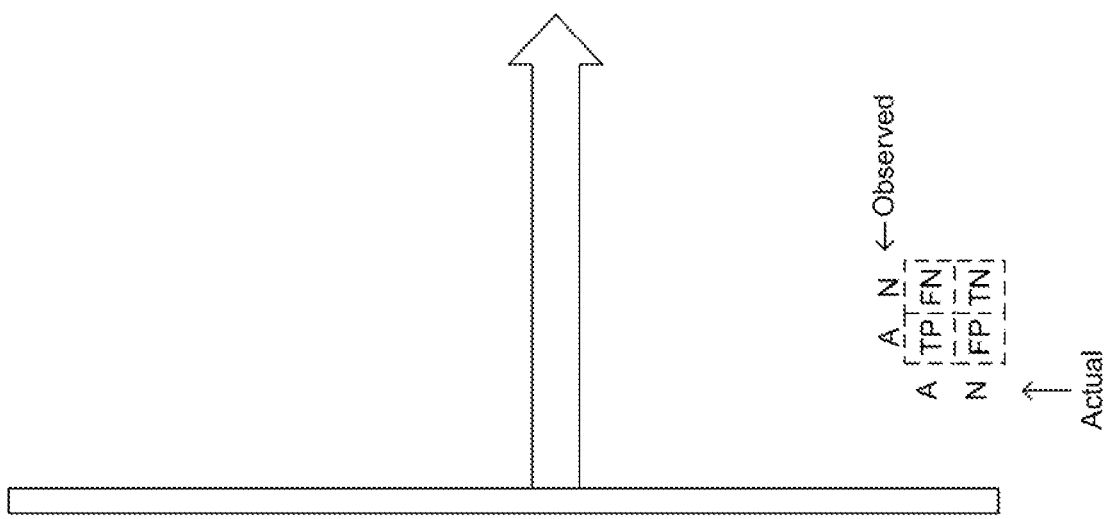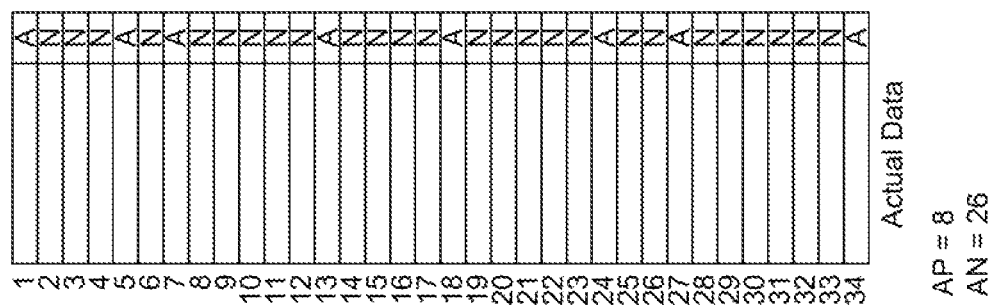
FIG. 17B

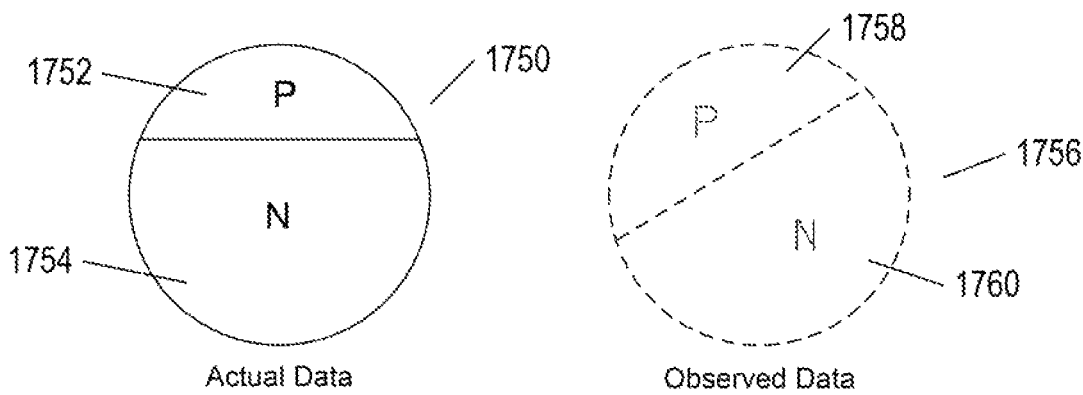
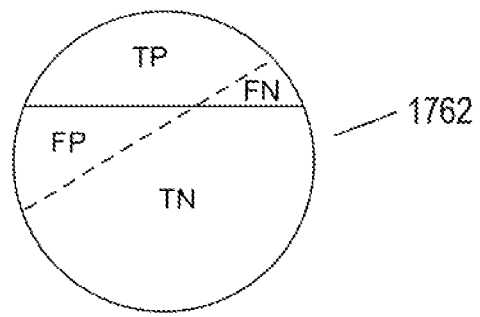
FIG. 17C

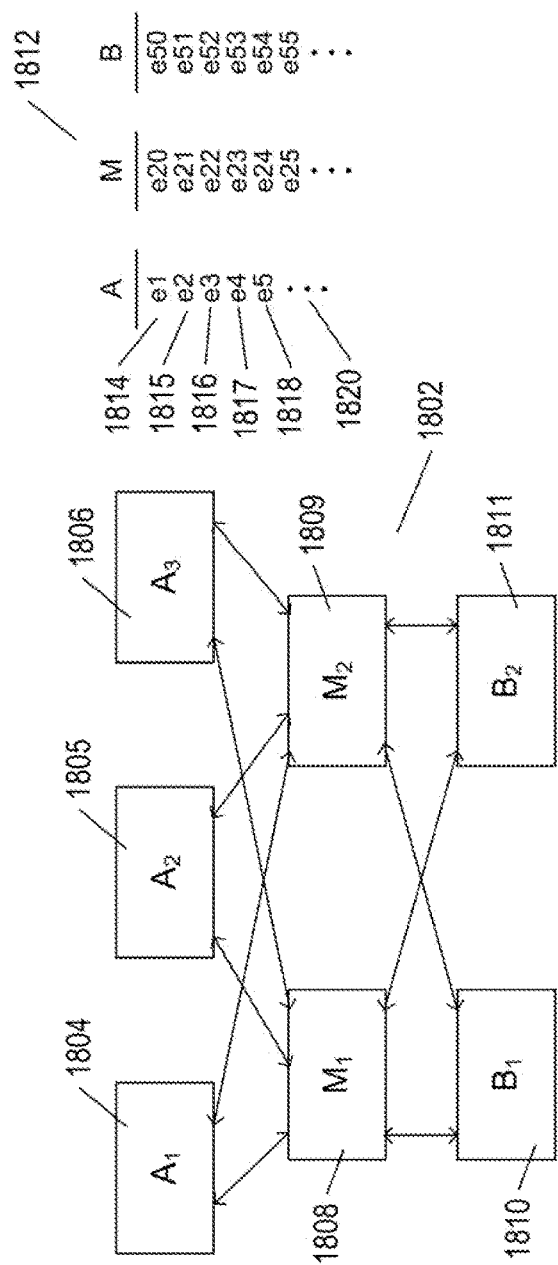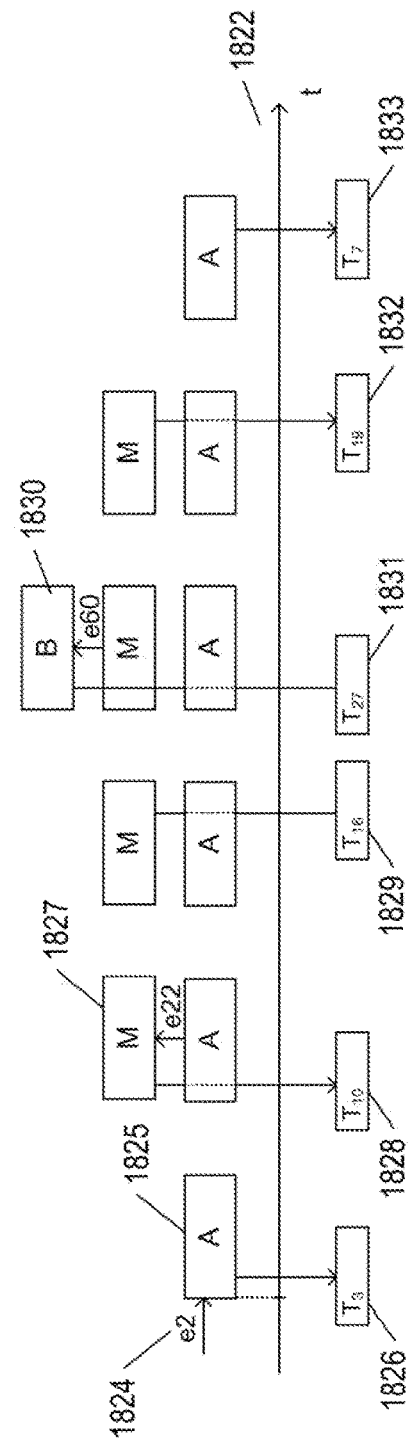
FIG. 18A

Application A1:
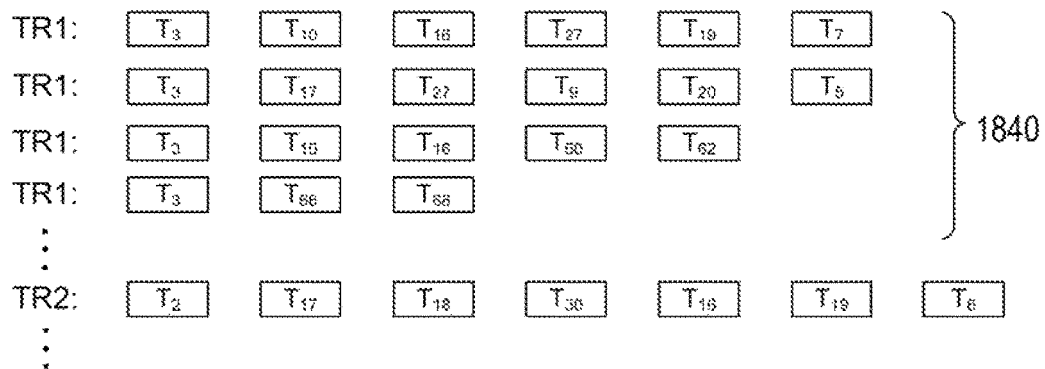
Application A1:
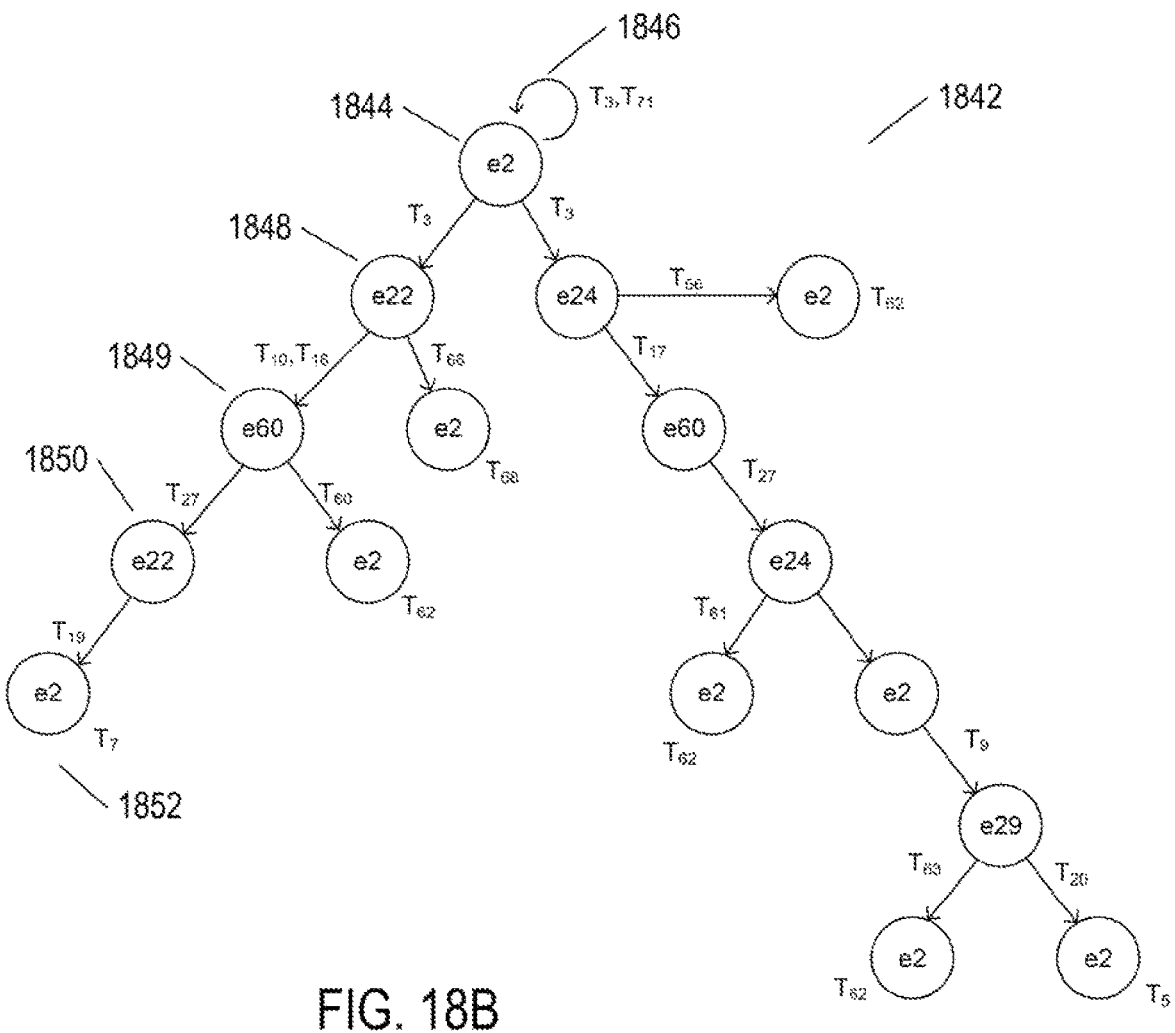
FIG. 18B

METHODS AND SYSTEMS THAT RANK AND DISPLAY LOG/EVENT MESSAGES AND TRANSACTIONS

RELATED APPLICATIONS

Benefit is claimed under 35 U.S.C. 119(a)-(d) to Foreign Application Serial No. 202041044375 filed in India entitled "METHODS AND SYSTEMS THAT RANK AND DISPLAY LOG/EVENT MESSAGES AND TRANSACTIONS", on Oct. 12, 2020, by VMware, Inc., which is herein incorporated in its entirety by reference for all purposes.

TECHNICAL FIELD

The current document is directed to distributed-computer-systems and, in particular, to methods and systems that automatically rank log/event messages and log/event-message transactions to facilitate analysis of log/event-messages by site-reliability-engineering ("SRE") personnel and other users and analyzers of log/event-messages generated within distributed-computer systems, including automated problem-detection and problem-amelioration systems.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management-and-administration facilities related to distributed computing systems are seeking new approaches to implementing automated management-and-administration facilities and functionalities.

SUMMARY

The current document is directed to methods and systems that automatically rank log/event messages and log/event-message transactions to facilitate analysis of log/event-messages by site-reliability-engineering ("SRE") personnel and other users and analyzers of log/event-messages generated within distributed-computer systems, including automated problem-detection and problem-amelioration systems. In a described implementation, a base-window dataset and current-window dataset are selected for diagnosis of a particular error or failure and processed to generate a transaction sequence for each dataset corresponding to log/event-message traces identified in the datasets. Then, frequencies of occurrence of log/event-message types relative to transaction types are generated for each dataset. From these two sets of relative frequencies of occurrence, changes in the relative frequency of occurrence for each log/event-message-type/transaction-type pair are generated. Normalized scores for log/event-message-type/transaction-type pairs and scores for transaction types are then generated from the changes in the relative frequency of occurrence. The generated scores reflect the relevance of log/event-messages in traces corresponding to particular transaction as well as the relevance of transaction types to the error or failure.

BRIEF DESCRIPTION OF THE DRAWINGS

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 11 shows a small, 11-entry portion of a log file from a distributed computer system.

FIGS. 17A-C illustrate various metrics used to indicate the quality of computational information retrieval and classification.

FIGS. 18A-C illustrate transactions and log/event-message traces.

DETAILED DESCRIPTION

Figure 1:
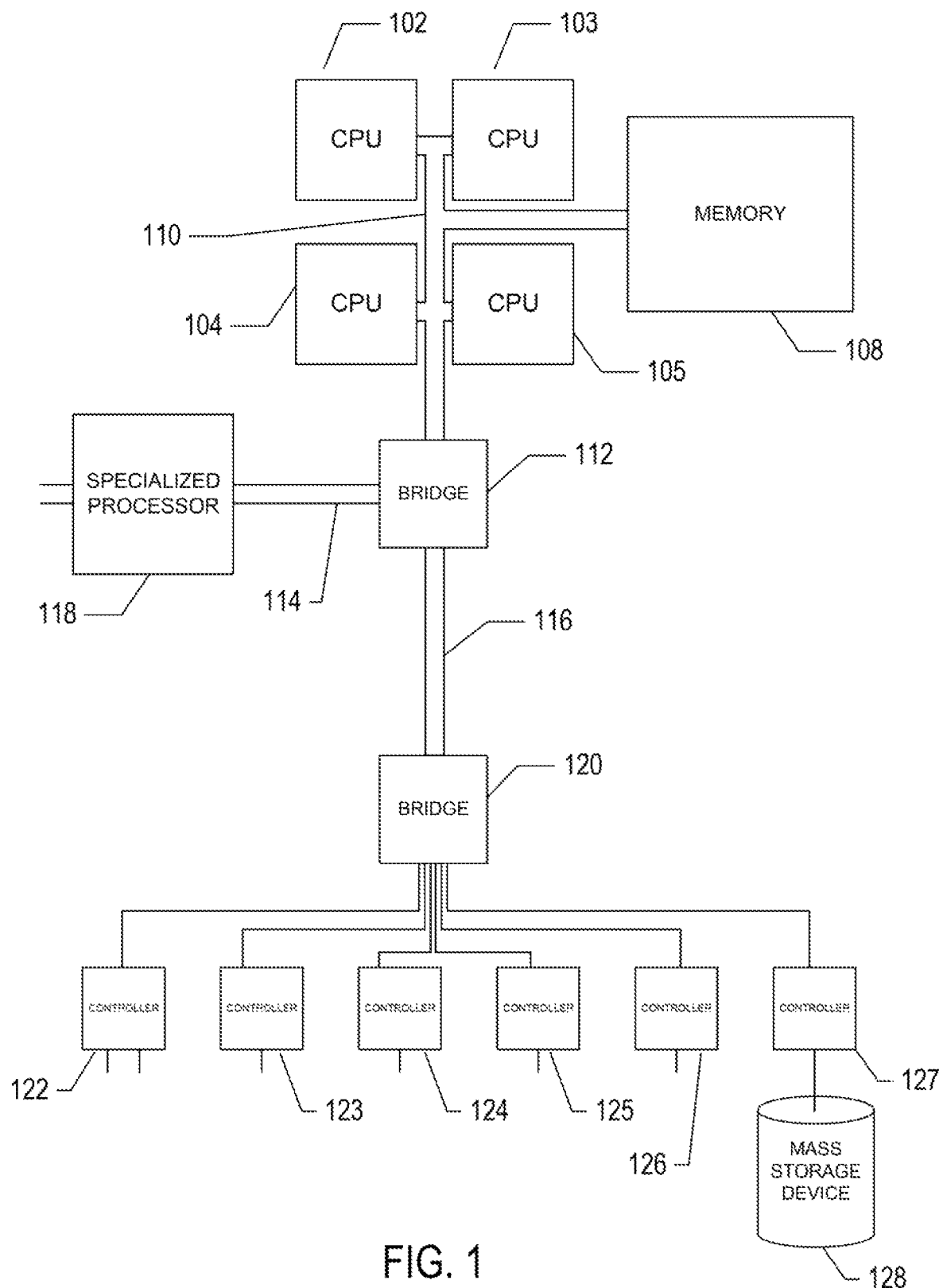
FIG. 1 provides a general architectural diagram for various types of computers.

The current document is directed to methods and systems that automatically rank log/event messages and log/event-message transactions to facilitate analysis of log/event-messages by SRE personnel and other users and analyzers of log/event-messages generated within distributed-computer systems. In a first subsection, below, a detailed description of computer hardware, complex computational systems, and virtualization is provided with reference to FIGS. 1-10. In a second subsection, the currently disclosed methods and systems are discussed with reference to FIGS. 11-31.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
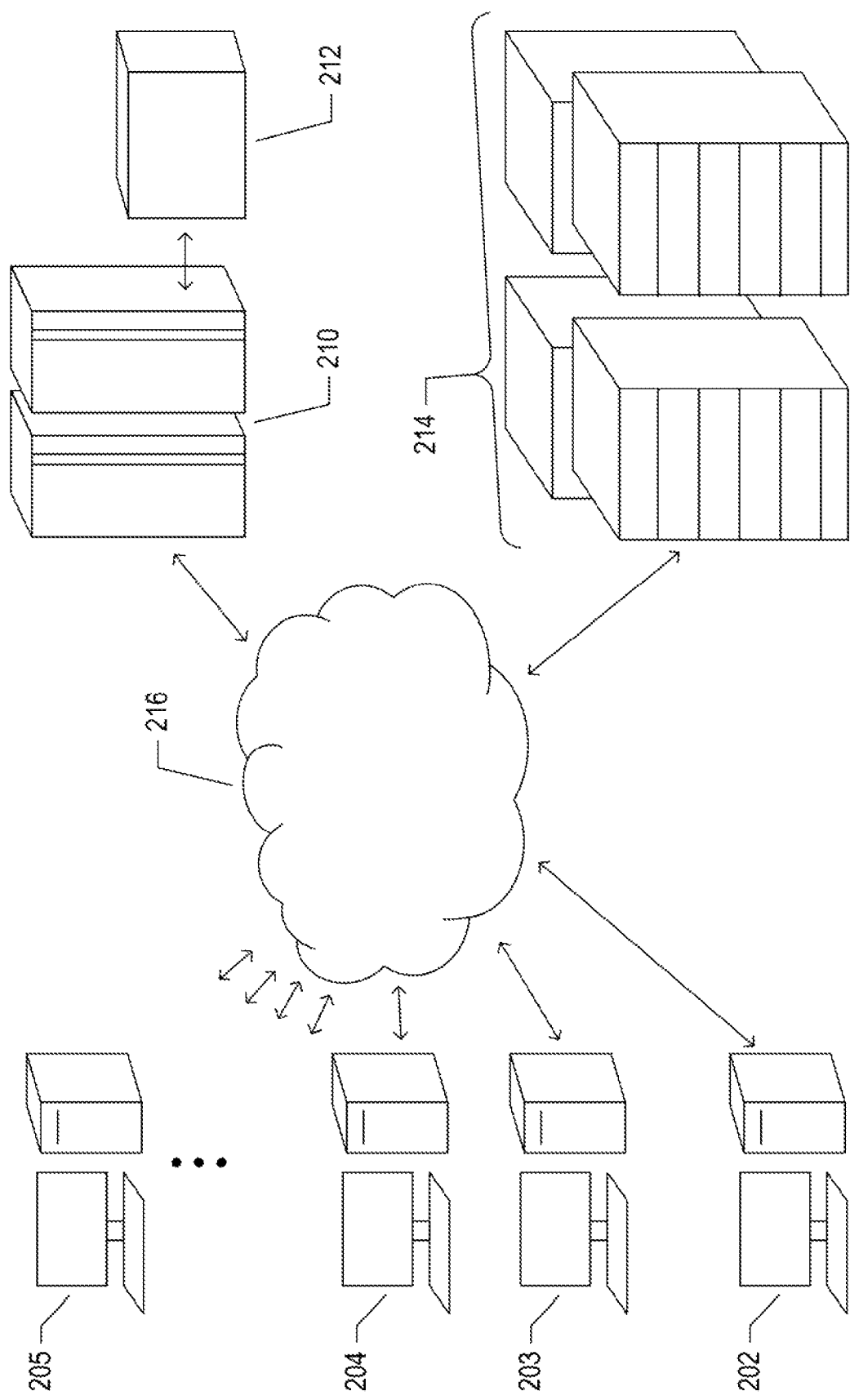
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
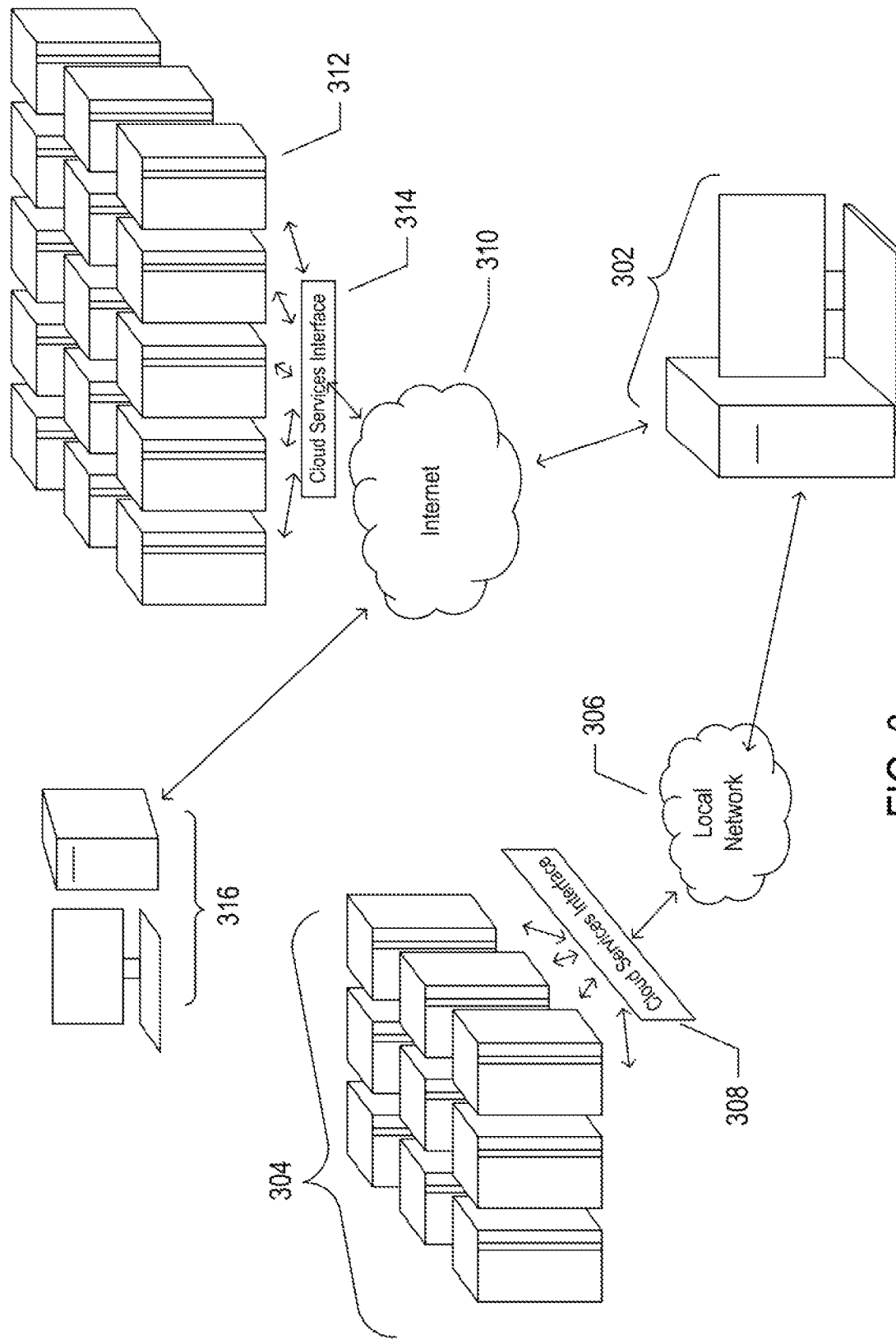
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
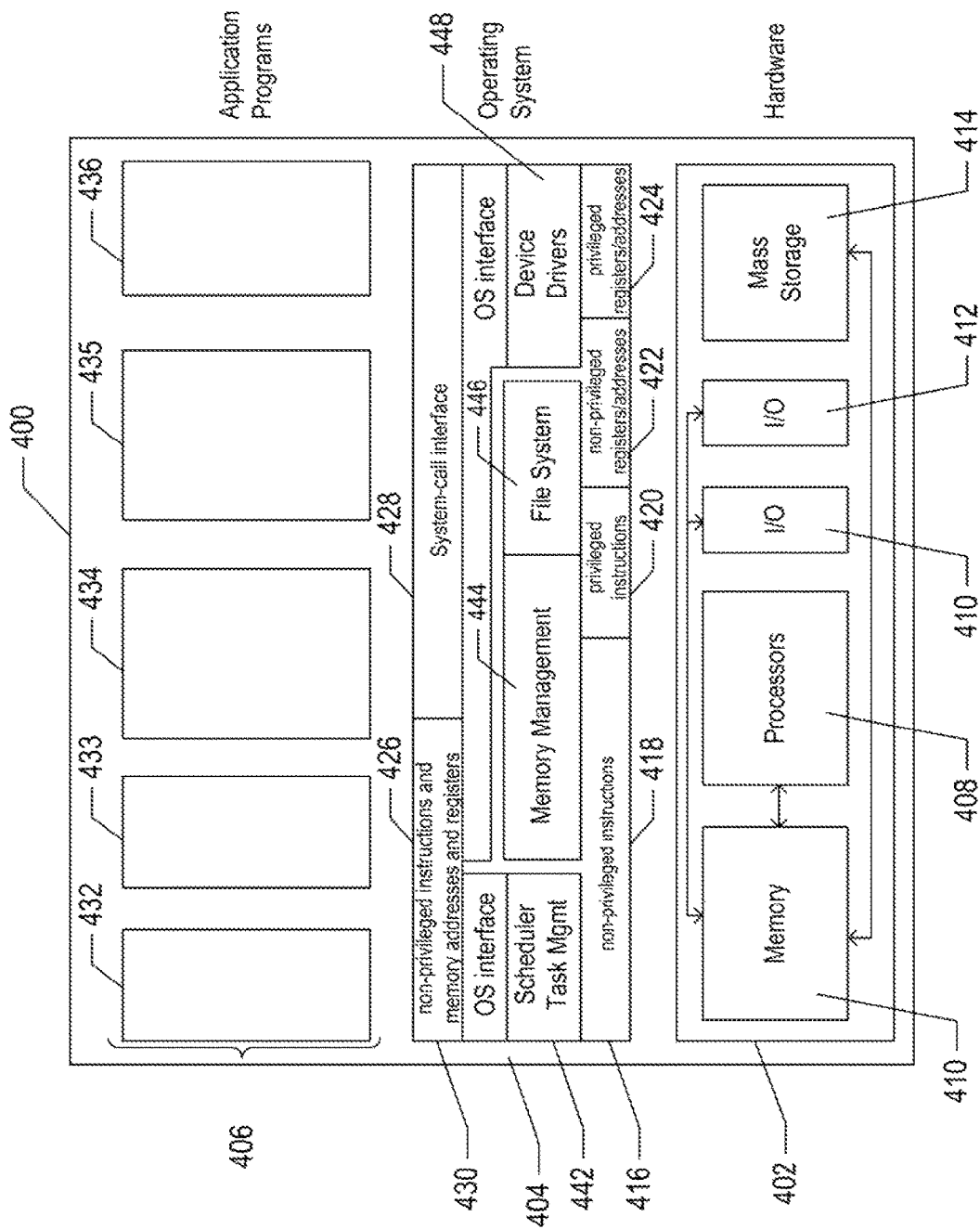
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
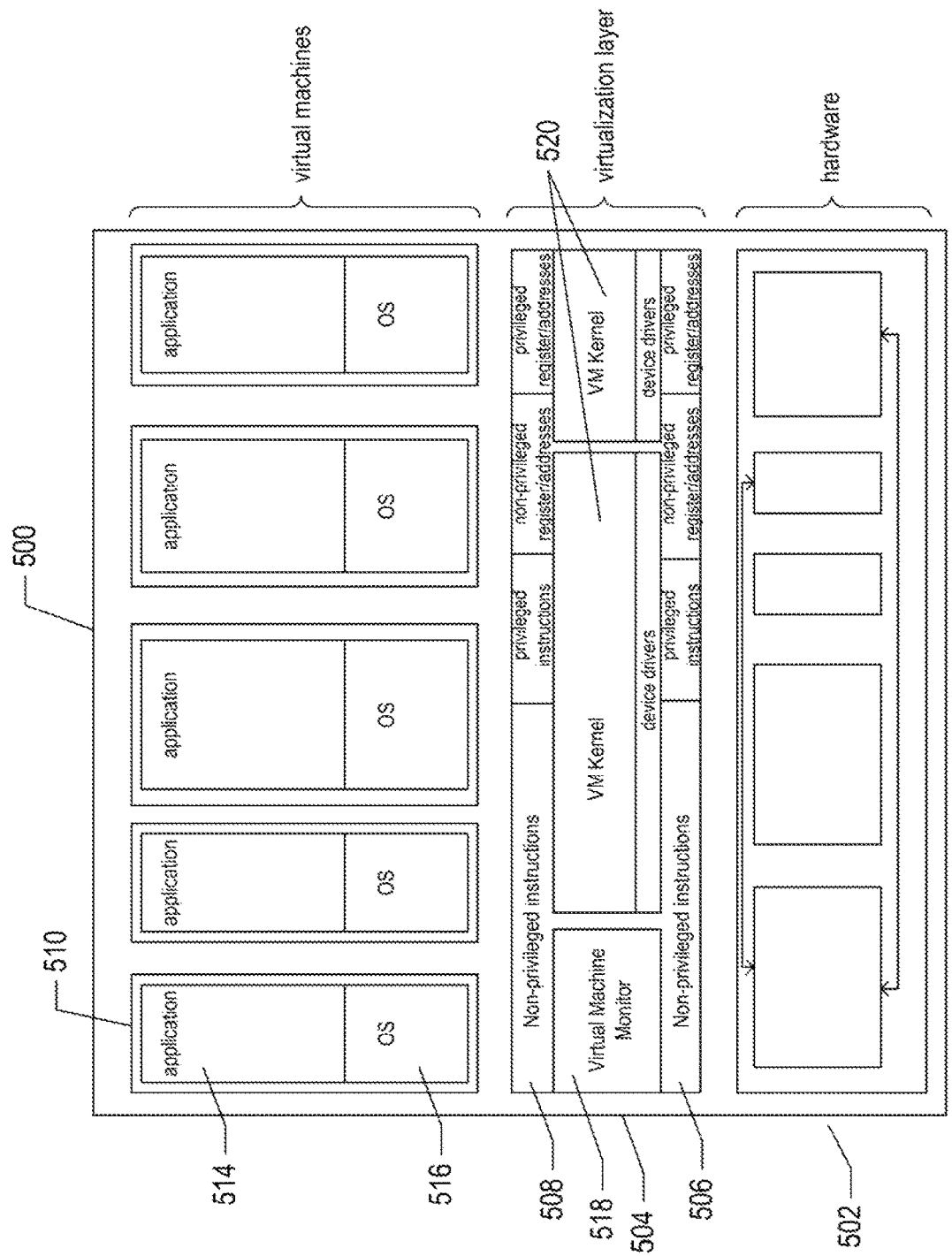
FIGS. 5A-D illustrate two types of virtual machine and virtual-machine execution environments.
Figure 5B:
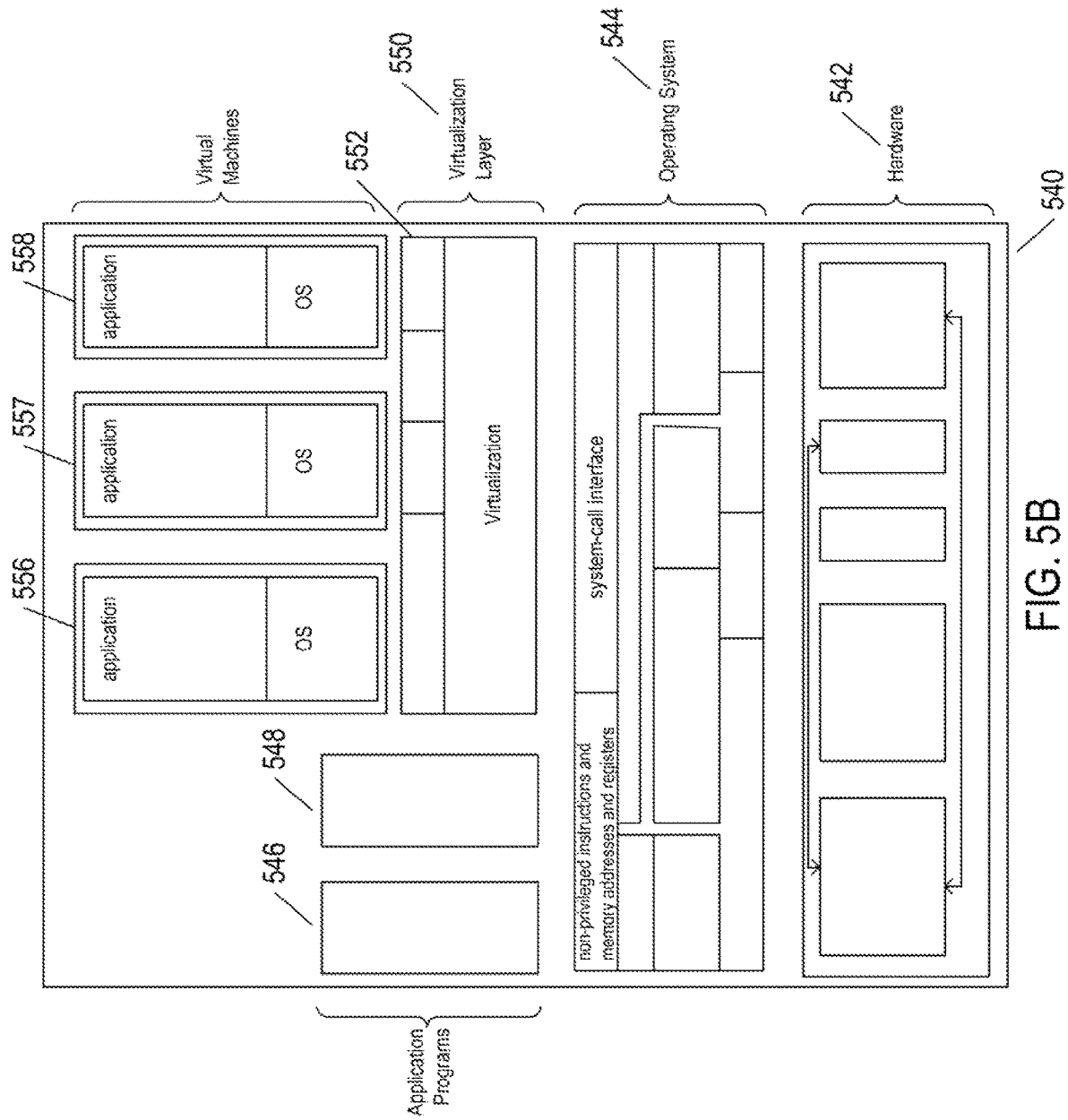

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
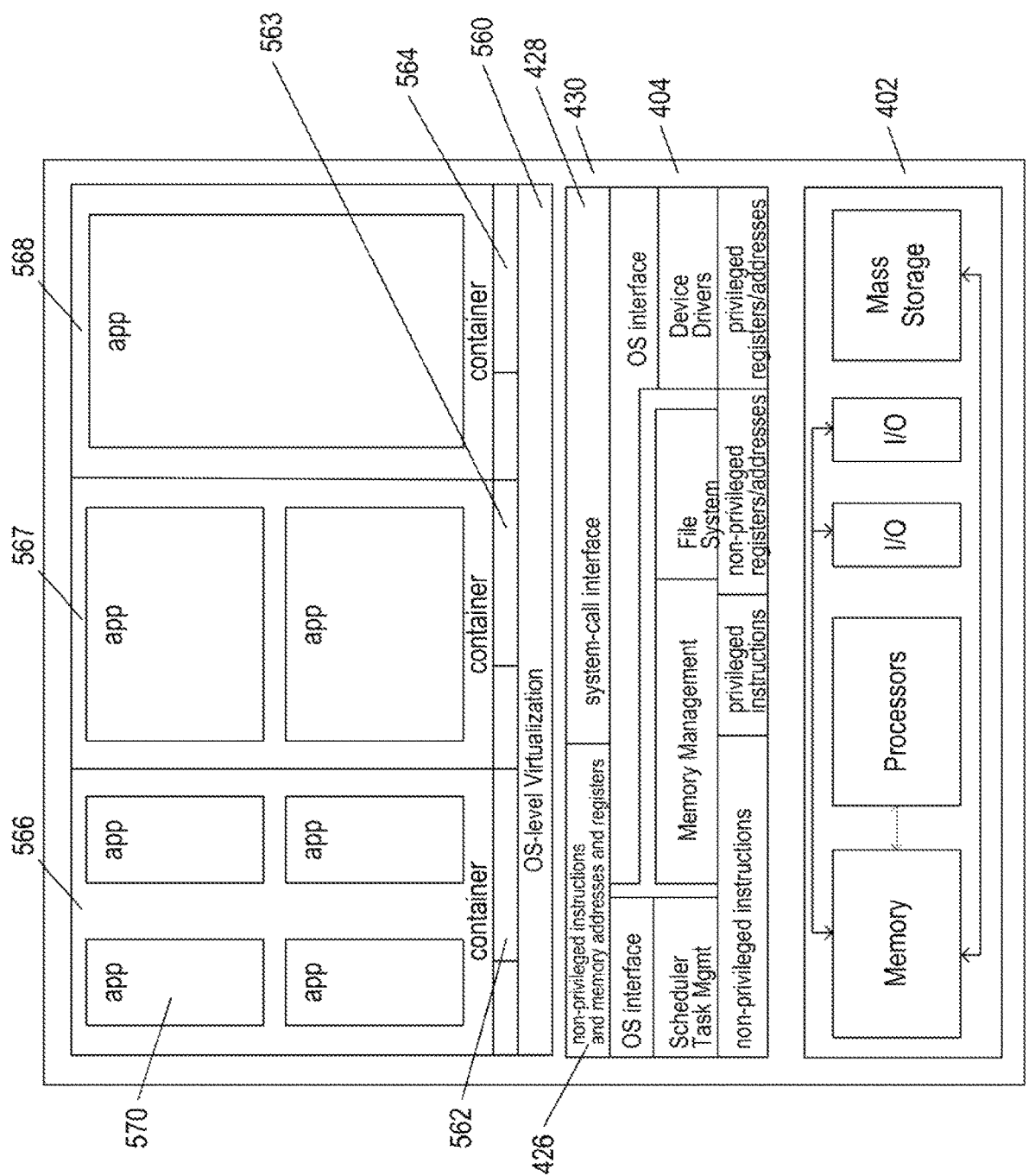

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
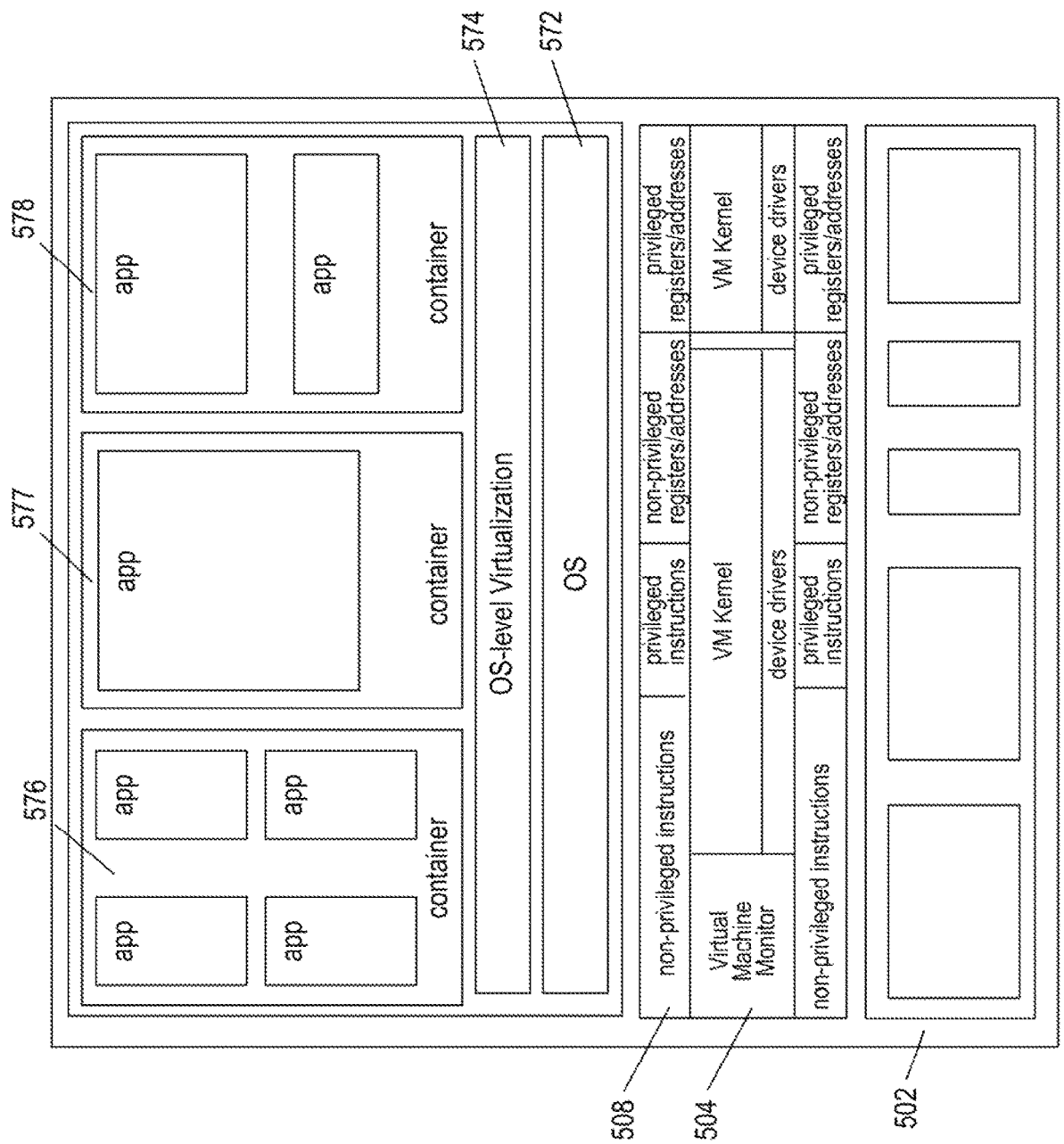

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

A virtual machine or virtual application, described below, is encapsulated within a data package for transmission, distribution, and loading into a virtual-execution environment. One public standard for virtual-machine encapsulation is referred to as the "open virtualization format" ("OVF").

Figure 6:
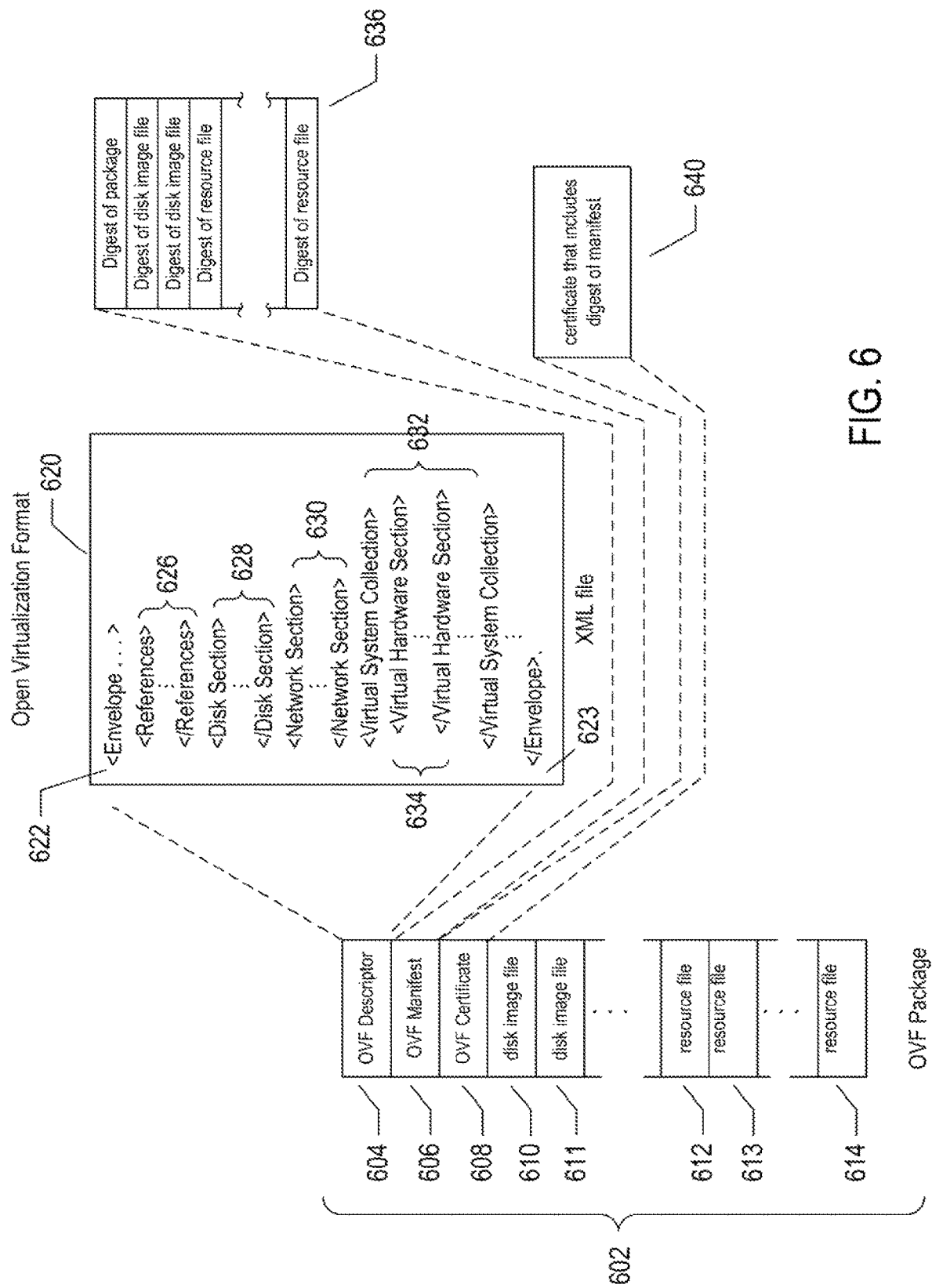
FIG. 6 illustrates an OVF package.

The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
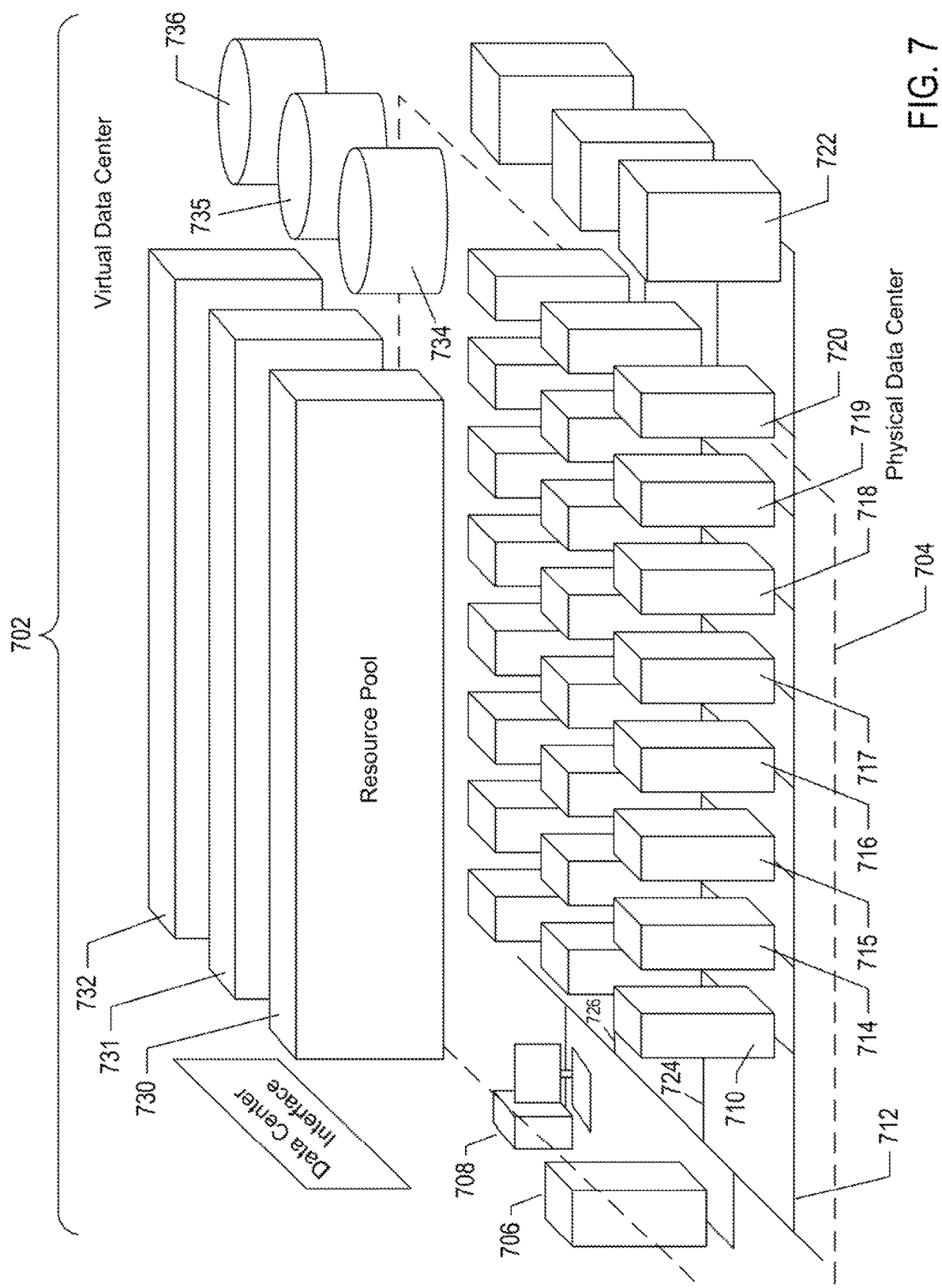
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
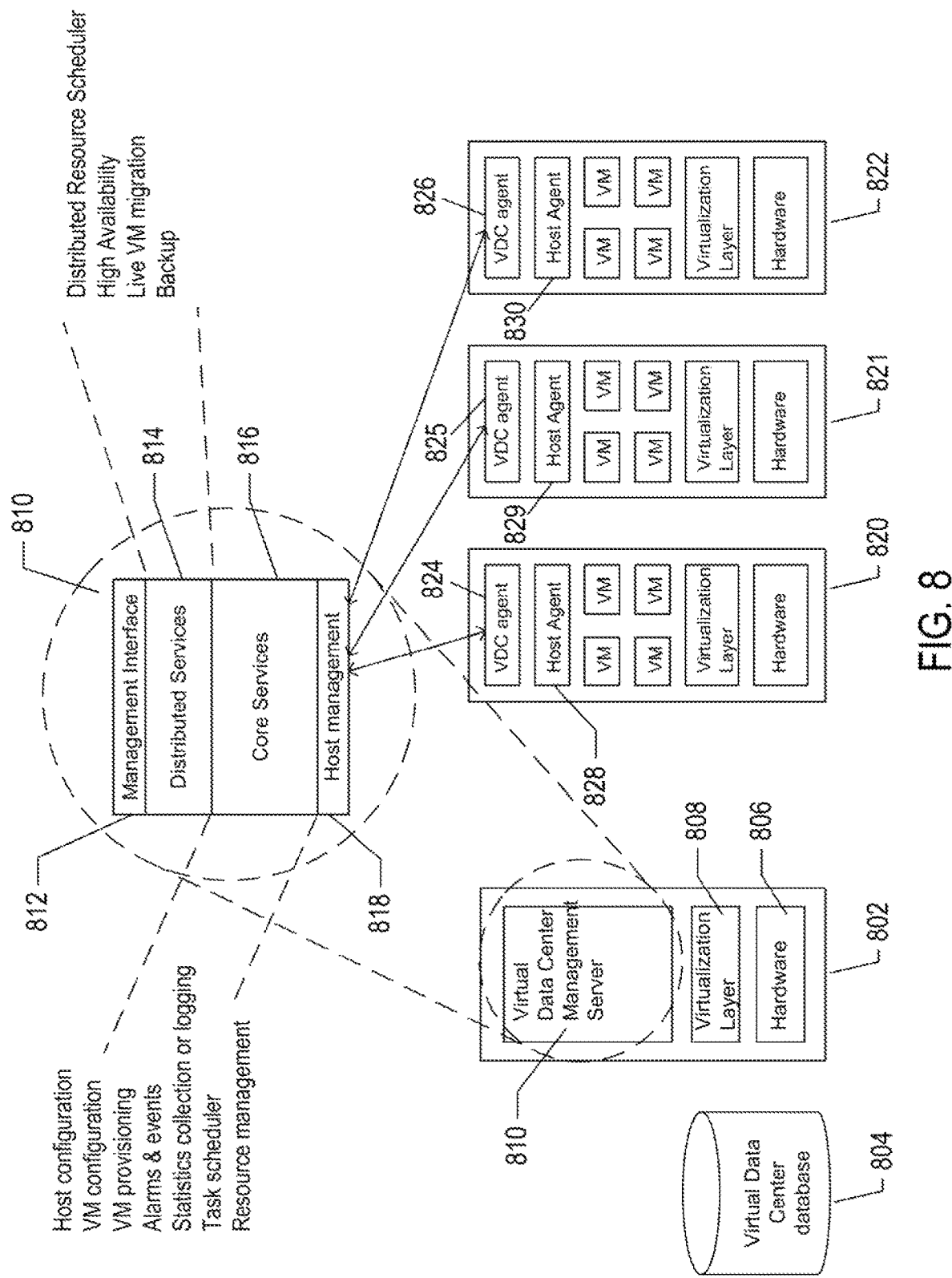
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
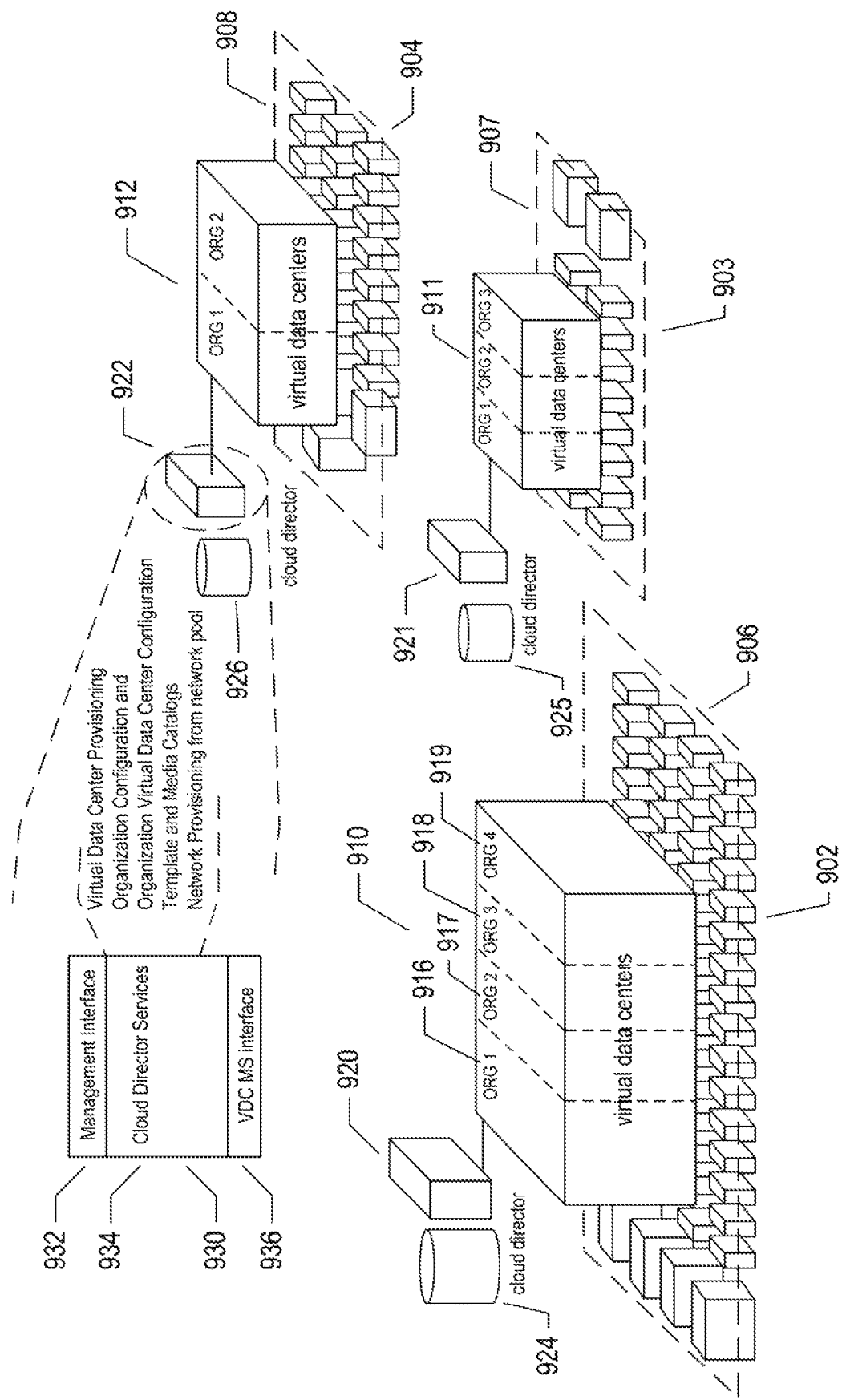
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Modern distributed computing systems feature a variety of different types of automated and semi-automated administration-and-management systems that monitor indications of operational behaviors of distributed-computing-system components, collect information regarding the operational behaviors of distributed-computing-system components, detect and collect indications of anomalous operational behaviors of distributed-computing-system components, and use the collected information to monitor and diagnose the operational states of the distributed computing systems in order to automatically undertake corrective and ameliorative actions to address potential, incipient and developing problems as well as to alert human system administrators of the potential, incipient, and developing problems. Log/event-message reporting, collecting, storing, and querying systems are fundamental components of administration and management subsystems.

The phrase "log/event message" refers to various types of generally short log messages and event messages issued by message-generation-and-reporting functionality incorporated within many hardware components, including network routers and bridges, network-attached storage devices, network-interface controllers, virtualization layers, operating systems, applications running within servers and other types of computer systems, and additional hardware devices incorporated within distributed computing systems. The log/event messages generally include both text and numeric values and represent various types of information, including notification of completed actions, errors, anomalous operating behaviors and conditions, various types of computational events, warnings, and other such information. In general, each log/event message includes a timestamp or other time-related value that allows collected log/event messages to be time ordered. The log/event messages are transmitted to message collectors, generally running within servers of local data centers, which forward collected log/event messages to message-ingestion-and-processing systems that collect and store log/event messages in message databases. Log/event-message query-processing systems provide, to administrators and managers of distributed computing systems, query-based access to log/event messages in message databases. The message-ingestion-and-processing systems may additionally provide a variety of different types of services, including automated generation of alerts, filtering, and other message-processing services.

Large modern distributed computing systems may generate enormous volumes of log/event messages, from tens of gigabytes ("GB") to terabytes ("TB") of log/event messages per day. Generation, transmission, and storage of such large volumes of data represent significant networking-bandwidth, processor-bandwidth, and data-storage overheads for distributed computing systems, significantly decreasing the available networking bandwidth, processor bandwidth, and data-storage capacity for supporting client applications and services. In addition, the enormous volumes of log/event messages generated, transmitted, and stored on a daily basis result in significant transmission and processing latencies, as a result of which greater than desired latencies in alert generation and processing of inquiries directed to stored log/event messages are often experienced by automated and semi-automated administration tools and services as well as by human administrators and managers. Thus, as with many areas in computing and electronics, there are trade-offs and careful balancing considerations in developing and using log/event-messages subsystems incorporated within distributed computing systems.

FIG. 11 shows a small, 11-entry portion of a log file from a distributed computer system. A log file may store log/event messages for archival purposes, in preparation for transmission and forwarding to processing systems, or for batch entry into a log/event-message database. In FIG. 11, each rectangular cell, such as rectangular cell 1102, of the portion of the log file 1104 represents a single stored log/event message. In general, log/event messages are relatively cryptic, including only one or two natural-language sentences or phrases as well as various types of file names, path names, network addresses, component identifiers, and, other alphanumeric parameters. For example, log entry 1102 includes a short natural-language phrase 1106, date 1108 and time 1110 parameters, as well as a numeric parameter 1112 which appears to identify a particular host computer.

Figure 12:
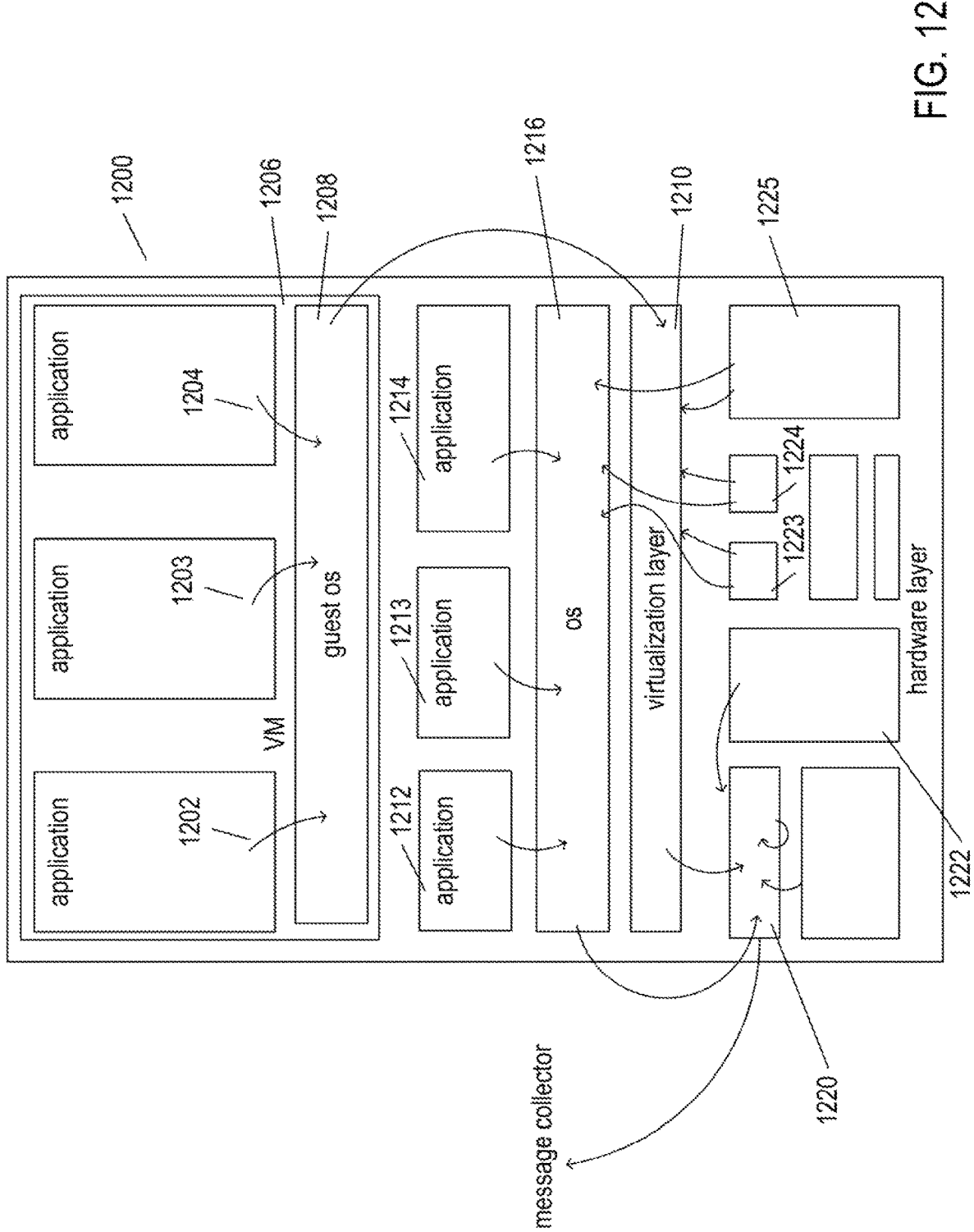
FIG. 12 illustrates generation of log/event messages within a server.

FIG. 12 illustrates generation of log/event messages within a server. A block diagram of a server 1200 is shown in FIG. 12. Log/event messages can be generated within application programs, as indicated by arrows 1202-1204. In this example, the log/event messages generated by applications running within an execution environment provided by a virtual machine 1206 are reported to a guest operating system 1208 running within the virtual machine. The application-generated log/event messages and log/event messages generated by the guest operating system are, in this example, reported to a virtualization layer 1210. Log/event messages may also be generated by applications 1212-1214 running in an execution environment provided by an operating system 1216 executing independently of a virtualization layer. Both the operating system 1216 and the virtualization layer 1210 may generate additional log/event messages and transmit those log/event messages along with log/event messages received from applications and the guest operating system through a network interface controller 1222 to a message collector. In addition, various hardware components and devices within the server 1222-1225 may generate and send log/event messages either to the operating system 1216 and/or virtualization layer 1210, or directly to the network interface controller 122 for transmission to the message collector. Thus, many different types of log/event messages may be generated and sent to a message collector from many different components of many different component levels within a server computer or other distributed-computer-system components, such as network-attached storage devices, networking devices, and other distributed-computer-system components.

Figure 13A:
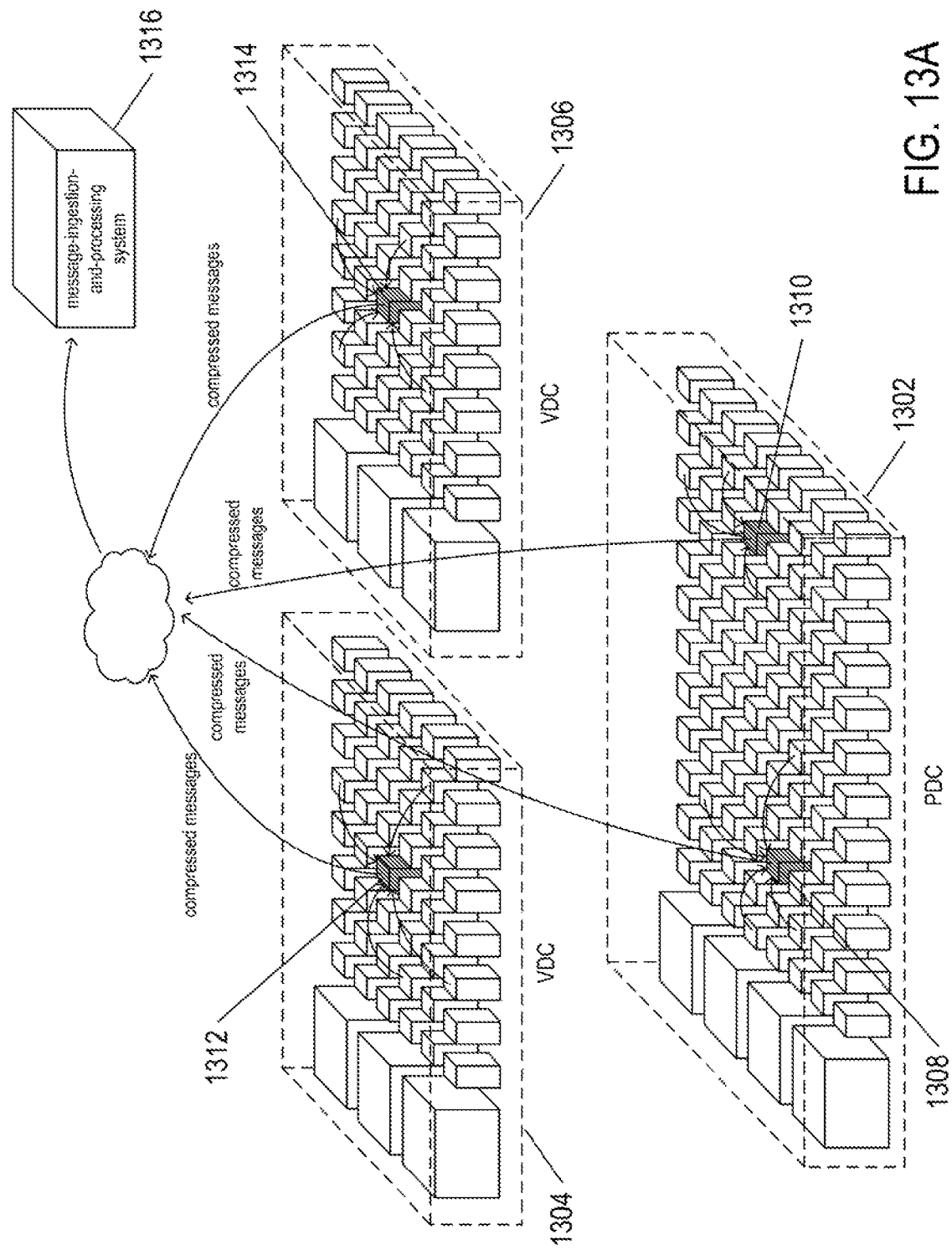
FIGS. 13A-B illustrate two different types of log/event-message collection and forwarding within distributed computer systems.
Figure 13B:
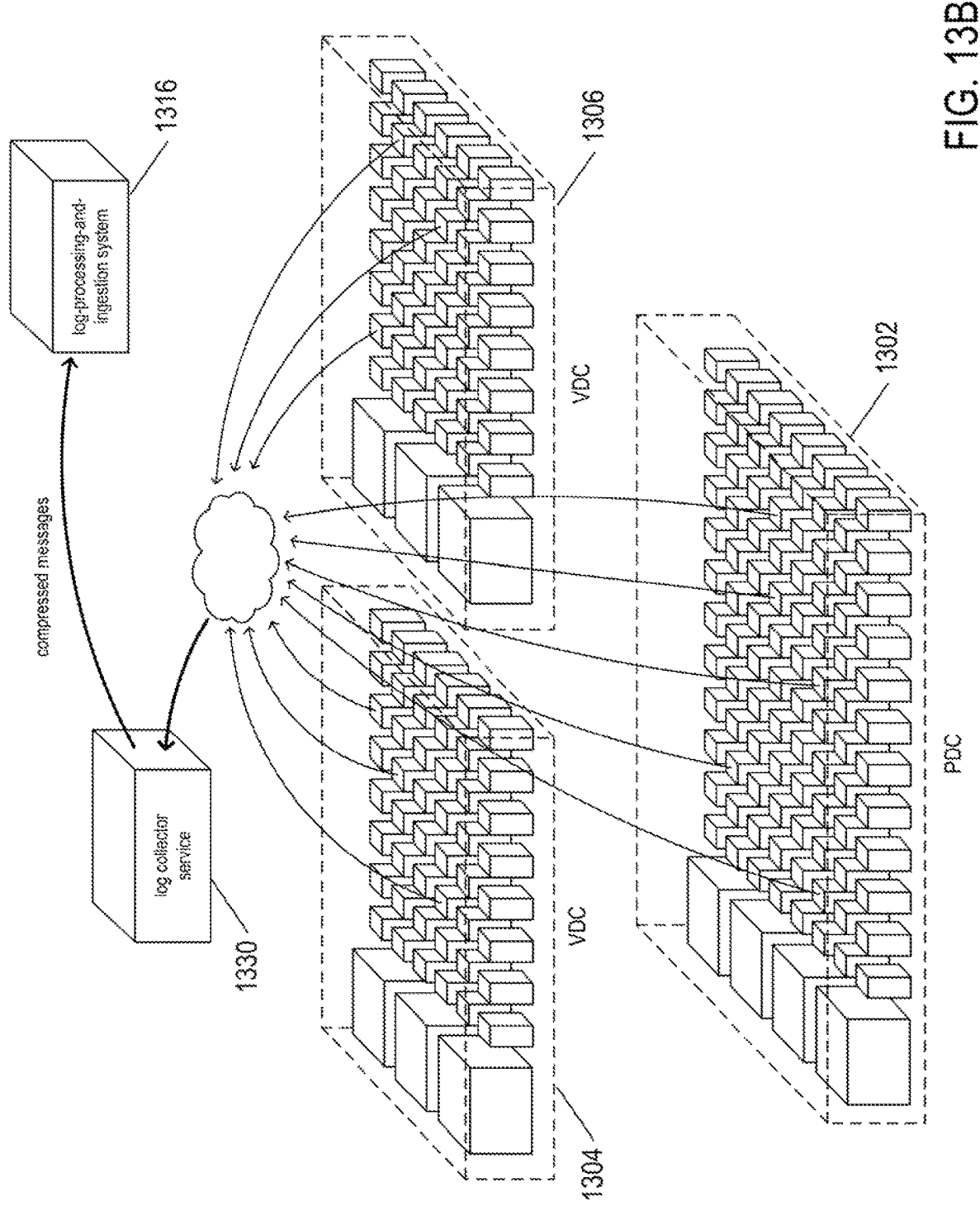

FIGS. 13A-B illustrate two different types of log/event-message collection and forwarding within distributed computer systems. FIG. 13A shows a distributed computing system comprising a physical data center 1302 above which two different virtual data centers 1304 and 1306 are implemented. The physical data center includes two message collectors running within two physical servers 1308 and 1310. Each virtual data center includes a message collector running within a virtual server 1312 and 1314. The message collectors compress batches of collected messages and forward the compressed messages to a message-processing-and-ingestion system 1316. In certain cases, each distributed computing facility owned and/or managed by a particular organization may include one or more message-processing-and-ingestion systems dedicated to collection and storage of log/event messages for the organization. In other cases, they message-processing-and-ingestion system may provide log/event-message collection and storage for multiple distributed computing facilities owned and managed by multiple different organizations. In this example, log/event messages may be produced and reported both from the physical data center as well as from the higher-level virtual data centers implemented above the physical data center. In alternative schemes, message collectors within a distributed computing system may collect log/event messages generated both at the physical and virtual levels.

FIG. 13B shows the same distributed computing system 1302, 1304, and 1306 shown in FIG. 13A. However, in the log/event-message reporting scheme illustrated in FIG. 13B, log/event messages are collected by a remote message-collector service 1330 which then forwards the collected log/event messages to the message-processing-and-ingestion system 1316.

Figure 14:
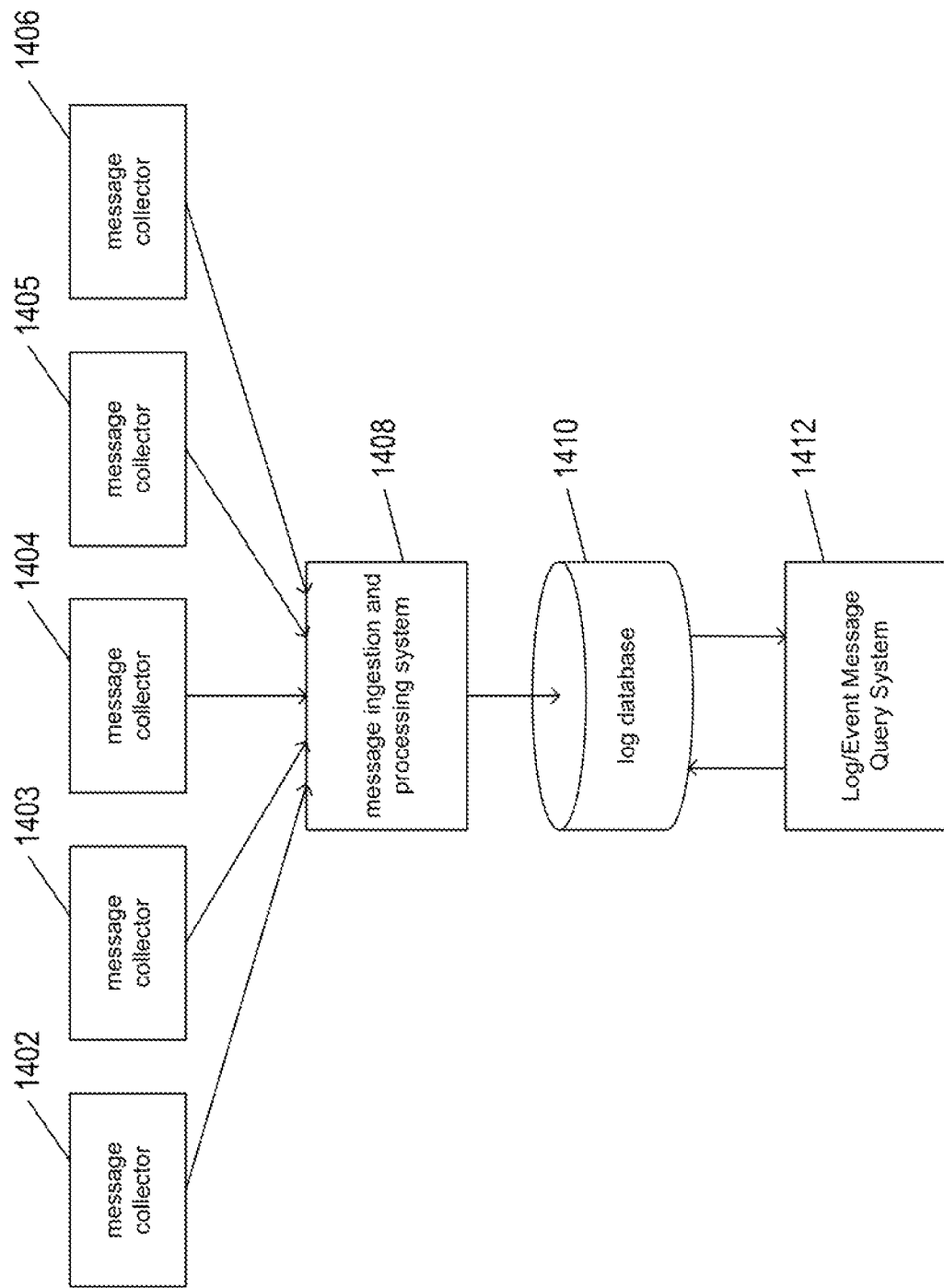
FIG. 14 provides a block diagram of a generalized log/event-message system incorporated within one or more distributed computing systems.

FIG. 14 provides a block diagram of a generalized log/event-message system incorporated within one or more distributed computing systems. The message collectors 1402-1406 receive log/event messages from log/event-message sources, including hardware devices, operating systems, virtualization layers, guest operating systems, and applications, among other types of log/event-message sources. The message collectors generally accumulate a number of log/event messages, compress them using any of commonly available data-compression methods, encrypt the compressed messages, and send the encrypted and compressed batches of log/event messages to a message-ingestion-and-processing system 1408. The message-ingestion-and-processing system decrypts and decompresses received compressed and encrypted batches of messages, carry out any of various types of message processing, such as generating alerts for particular types of messages, filtering the messages, and normalizing the messages, prior to storing some or all of the messages in a message database 1410. A log/event-message query-processing system 1412 receives queries from distributed-computer-system administrators and managers, as well as from automated administration-and-management systems, and accesses the message database 1410 to retrieve stored log/event messages and/or information extracted from log/event messages specified by the receive queries for return to the distributed-computer-system administrators and managers and automated administration-and-management systems.

Figure 15:
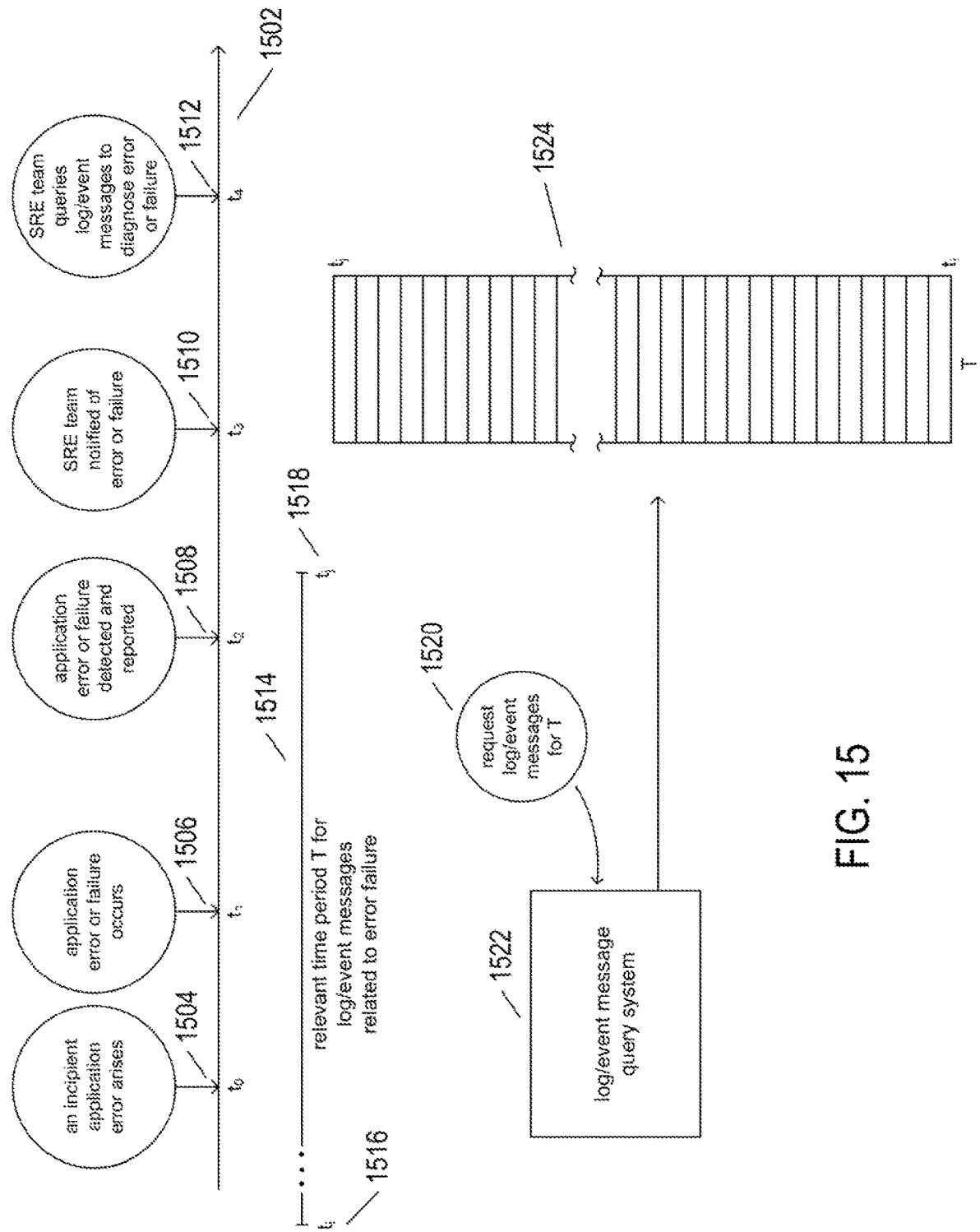
FIG. 15 illustrates problem detection in distributed computer systems.

FIG. 15 illustrates problem detection in distributed computer systems. This figure, subsequent figures, and the current discussion are largely focused on problems that arise during execution of distributed applications within distributed computer systems and that are diagnosed from log/event messages accumulated in log files within the distributed computer systems. However, the currently described methods and systems can be more generally applied to problems related to other types of executables and to hardware components within distributed computer systems.

A timeline 1502 is shown at the top of FIG. 15. This timeline is used to illustrate a sequence of events related to the occurrence of a problem and subsequent diagnosis of the problem. At a point in time $t_0$ 1504, a first event related to the problem occurs within the distributed computer system. The first-occurring event may be a hardware-component failure, execution of application code containing some type of erroneous logic or instruction, and unexpected hardware, operating-system, or virtualization-layer event, an improper call to an API entrypoint of a distributed application, or another of many different possible initial events that generally start a chain or cascade of additional events within the distributed computer system. Eventually, the chain or cascade of events leads to some type of detectable event, such as an application error or failure that occurs at a subsequent point in time $t_1$ 1506. At a point in time $t_2$ 1508 subsequent to time $t_1$ 1506, the failure or error is detected by the application and reported by the application in an event/log message. At time $t_3$ 1510, the log/event message results in notification of site-reliability-engineering ("SRE") personnel that an application failure or error has occurred. Finally, at time $t_4$ 1512, SRE personnel query the log/event-message query system (1412 in FIG. 14) to retrieve relevant log/event messages in order to diagnose the error or failure. As indicated by time segment 1514 in FIG. 15, SRE personnel may need to retrieve, from the log/event-message query system, log/event messages that span an interval of time beginning at a point in time $t_i$ 1516 preceding time point $t_0$ 1504 and extending to time point $t_j$ 1518 following time point $t_2$ 1508 in order to obtain log/event messages needed to diagnose the reported application error or failure. This time interval begins at time $t_i$ 1516 preceding time point to because, prior to diagnosis, SRE personnel do not know when the initial event related to the problem occurred, and so the time interval is generally chosen to extend sufficiently far back in time from time point $t_2$ 1508 to include all event/log messages that might have been generated in response to the initial event or a series of subsequent events related to the problem. The time interval extends to time point $t_j$ 1518 following time point $t_2$ 1508 in order to make sure to capture relevant log/event messages related to the problem that are received and stored by the log/event-message system prior to recording, by the log/event-message system, of the log/event message generated by the application at time point $t_2$ 1508. Thus, as shown in the lower portion of FIG. 15, SRE personnel submit a query for log/event messages relevant to the problem within the time interval 1522 to the log/event-message query system 1522 and receive, in response, a time-ordered set of log/event messages 1524 recorded by the log/event-message system.

The time-ordered set of log/event messages 1524 retrieved by SRE personnel is generally voluminous, even when SRE personnel have sufficient information to submit a relatively well-constrained and targeted query to the log/event-message query system. As discussed above, a distributed computer system may generate over a terabyte of log/event messages on a daily basis, as a result of which there may be 10 GB or more of log/event messages collected in a 15-minute interval. The SRE personnel may have a good understanding of the nature of the reported error or failure, allowing the SRE personnel to submit a query for log/event messages that represent only a subset of the log/event messages generated by the particular application in which the problem arose. Even in this best case, there may be thousands or hundreds of thousands of log/event messages in the returned set of log/event messages from which SRE personnel then need to identify the log/event messages of particular relevance to the problem at hand. However, when SRE personnel do not have a good understanding of the nature of the reported error or failure, the problem of selecting particularly relevant log/event messages from the returned set of log/event messages may be far more difficult and time consuming. The time taken to diagnose and ameliorate problems is often critical. Unless serious problems are quickly resolved, a business based on cloud-resident distributed applications, including e-commerce businesses, may falter or fail. Even when automated error-detection-and-amelioration systems are employed by SRE personnel to improve the speed and efficiency or error diagnosis and remediation, the time needed to handle distributed-application errors and failures is often a critical parameter.

Figure 16A:
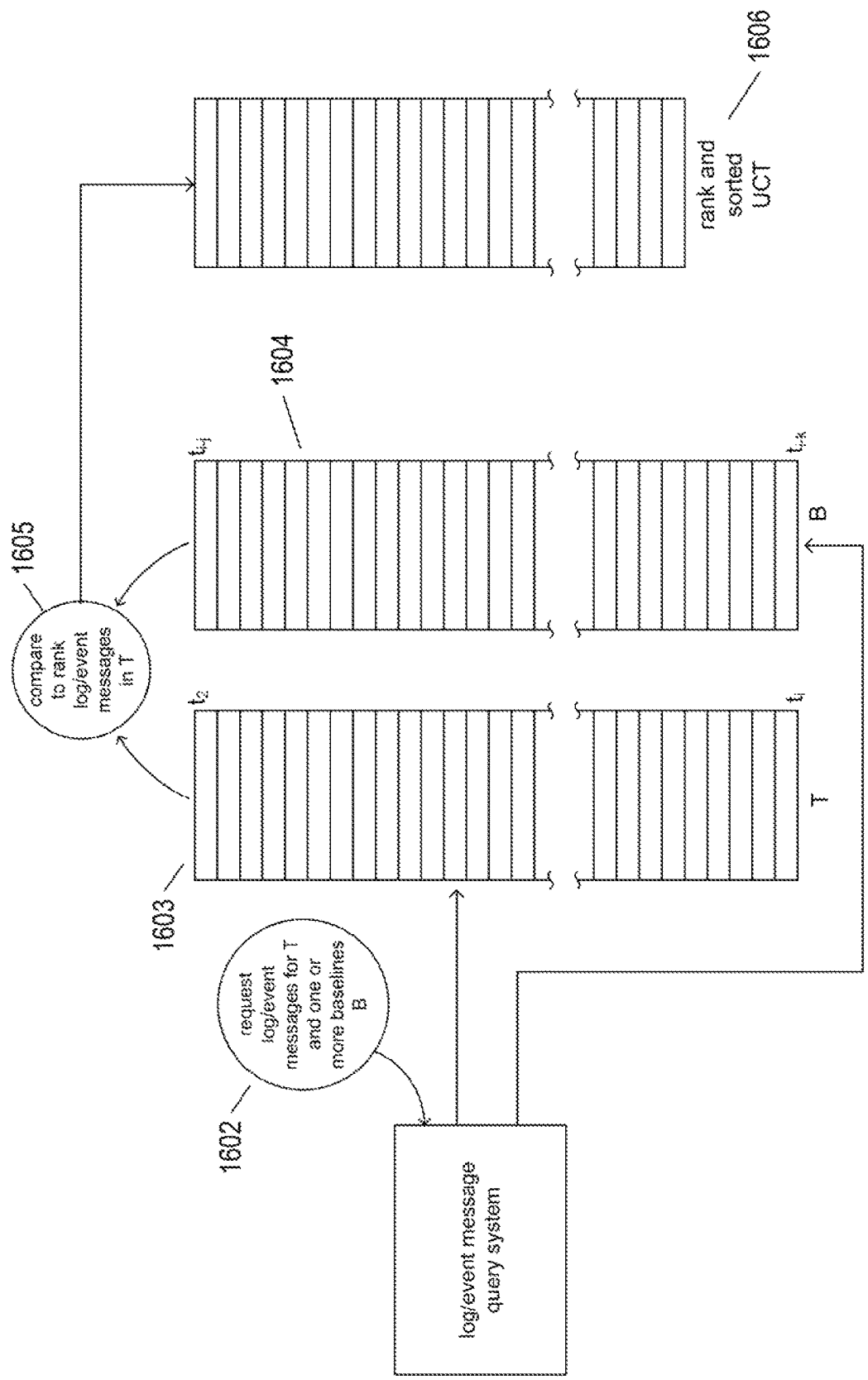
FIGS. 16A-B illustrate one approach used to identify relevant log/event messages in a set of log/event messages retrieved from a log/event-message system by SRE personnel in order to diagnose a particular problem.
Figure 16B:
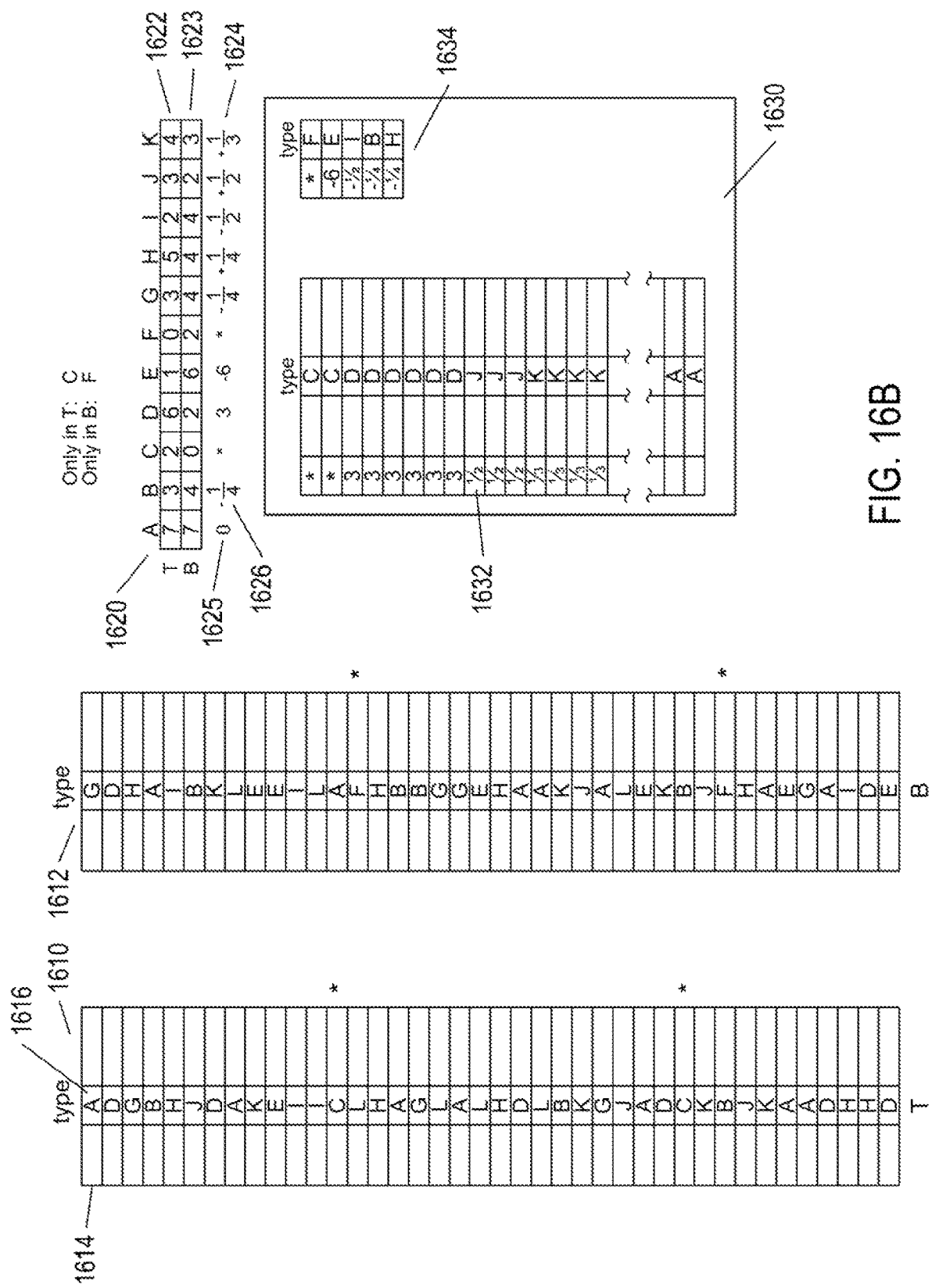

FIGS. 16A-B illustrate one approach used to identify relevant log/event messages in a set of log/event messages retrieved from a log/event-message system by SRE personnel in order to diagnose a particular problem. As shown in FIG. 16A, the SRE personnel request 1602 log/event messages for a particular time segment T 1603, thought to represent a current time window, referred to below as the "current window," that contains the log/event messages relevant to the particular problem as well as log/event messages for a different, non-overlapping time period or time periods B 1604 that serves as a base time window, referred to below as the "base window," representative of the log/event messages generated within the distributed computing system when the particular problem has not recently occurred and is not present. Generally, the base window B is a time interval that precedes the current time interval T. Then, as shown in FIG. 16A by labeled disk 1605, the contents of the retrieved log/event messages for the time intervals T and B are compared in order to generate a ranked and sorted set 1606 of the most important and/or relevant log/event messages within the current window T.

FIG. 16B illustrates the nature of the comparison operation indicated by labeled disk 1605 in FIG. 16A. In this example, the log/event messages retrieved for time interval T 1610 and for time interval B 1612 are shown in columns, with each log/event message shown to include a type field that contains an indication of the type of the log/event message, where the types are indicated by capital letters. In certain cases, the type field may comprise a concatenation of many fields in the original log/event message. As pointed out above, the log/event messages generally include a time-stamp or other time-related value that allows the log/event messages to be ordered in time. For example, the first log/event message 1614 in the log/event messages retrieved for time interval T 1610 includes type field 1616 indicating that the log/event message 1614 is of type A. The comparison operation looks for log/event-message types that occur with different frequencies in the two different datasets 1610 and 1612 for the two windows.

Table 1620 shows the number of log/event messages of each type in the two windows. Row 1622 shows the occurrences of different types of log/event messages in the current window, T, and row 1623 shows the occurrences of different types of log/event messages in the base window, B. Below the table, indications 1624 are provided for each log/event-message type that indicate the relative change in the number of occurrences of each type in the two windows. For example, because there are 7 occurrences of log/event messages of type A in both windows, the indication of the relative change is 0 (1625). Because log/event messages of type B occur 3 times in the current window T and 4 times in the base window B, the indication of the relative change is $-\frac{1}{4}$ (1626), indicating that the frequency of occurrence of log/event messages of type B decreases by $\frac{1}{4}$ from the base window B to the current window T. The symbol "*" is used to indicate log/event-message types that occur in one window but not in the other. The rank of any particular log/event message in the current window T is proportional to the magnitude of the numeric indication of the relative change in frequency and has a highest value for log/event-message types that occur in one time window but not in the other. This allows for a display 1630 that includes a listing 1632 of the most relevant and important log/event messages in the current window T as well as an indication of log/event-message types that occur in the base window but not in the current window and that occur with significantly less frequency in the current window than in the base window 1634. This type of information may provide useful indications, to SRE personnel, of the particularly relevant log/event messages in the current window as well as indications of the potentially missing log/event messages in the current window due to the problem that the SRE personnel are attempting to diagnose. However, there are many deficiencies associated with this approach, as further discussed below.

Figure 17A:
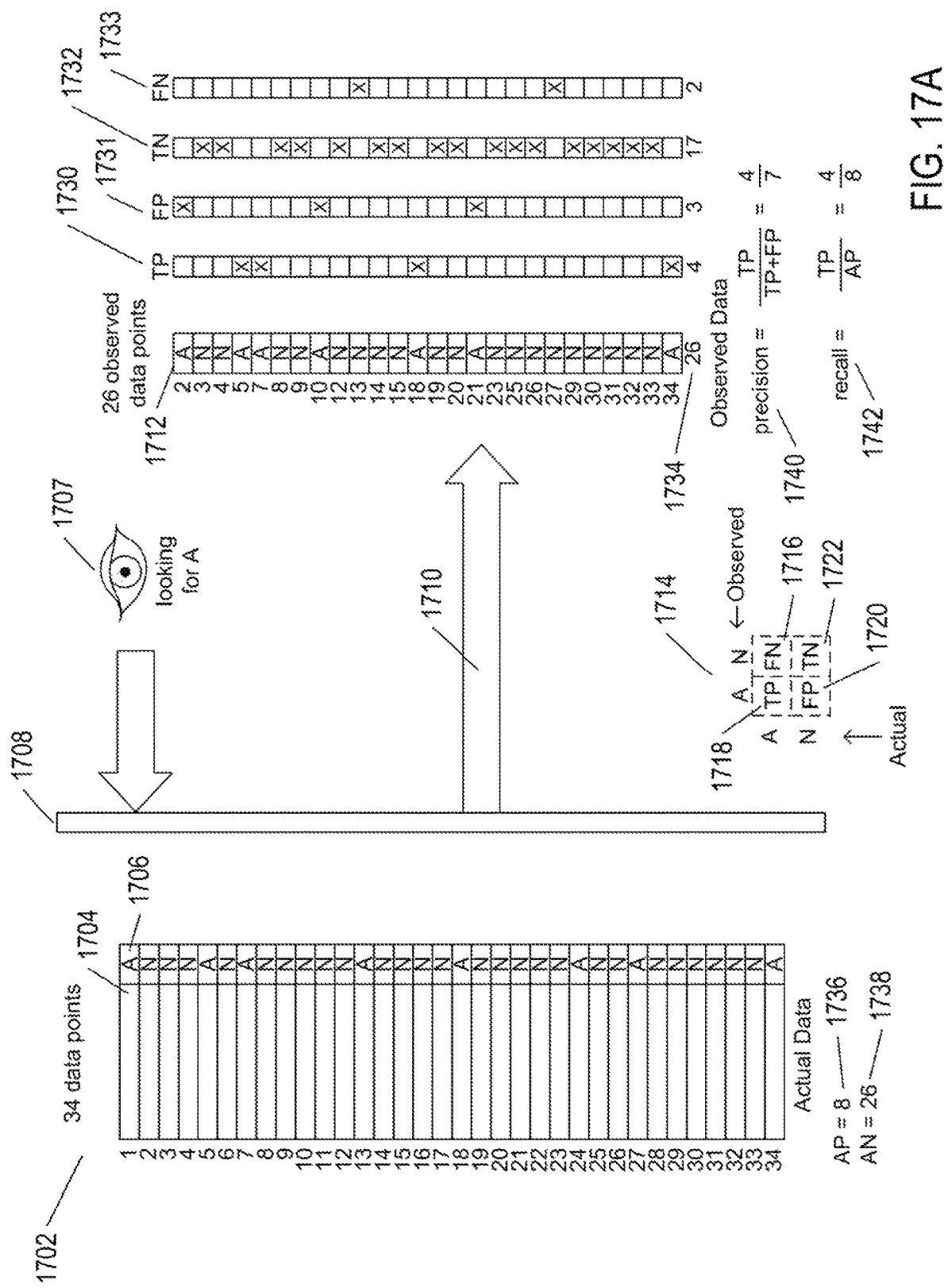

FIGS. 17A-C illustrate various metrics used to indicate the quality of computational information retrieval and classification. FIG. 17A illustrates computation of the precision and recall metrics for an example computational data retrieval. A column 1702 of data values, such as log/event messages, is shown in the left-hand portion of FIG. 17A to represent a dataset from which data values are to be retrieved by a person or automated system, referred to as the "observer"1707. Each data value is associated with an objective classification. For example, the first data value 1704 includes the objective classification "A" 1706. In this example, there are two different classification values: "A" which indicates abnormal; and "N" which indicates normal. This type of classification is relevant to the above-describe problem of identifying particularly relevant log/event messages with respect to an application failure or error, with abnormal log/event messages being relevant to the application failure or error and normal log/event messages having no relevance to the application failure or error. In FIG. 17A, the observer seeks to retrieve abnormal data values from the dataset for some purpose, such as diagnosing some type of problem or anomalous condition.

The vertical barrier 1708 in FIG. 17A represents the fact that the observer does not know whether the data values are normal or abnormal. The objective classifications are not included in the data values retrieved by the observer. The observer attempts to determine the normality or abnormality of data values retrieved from the dataset in order to select abnormal data values for analysis. In this example, the observer may only retrieve a portion of the total number of data values in the dataset represented by data-value column 1702. Retrieval of the portion of the data values is represented by horizontal arrow 1710. The retrieved data values, along with the observer's subjective classification of the data values, is represented by column 1712.

Table 1714 represents a system for categorizing the retrieved and subjectively classified data values and associated observer classification of the data values. The rows represent the actual, objective classification and the columns represent the observer's subjective classification. For example, the category FN 1716, which means "false negative," is assigned to a data value with an objective classification of "A" which the observer has classified as "N." In other words, this data value is associated with the label "A"

in column 1702, indicating that the data value is abnormal, but was retrieved and classified as "N" by the observer, indicating that the data value appeared to the observer to be normal. Since the observer is looking for abnormal data values, retrieval of an abnormal data value is a positive event while retrieval of a normal data value is a negative event. Thus, classification, by the observer, of an abnormal data value as being normal is a false negative result. When an abnormal retrieved data value is classified as abnormal by the observer, the observer's classifications is referred to as a "true positive," TP, 1718. When an abnormal retrieved data value is classified as normal by the observer, the observer's classification is referred to as a "false positive," FP, 1720. When a normal retrieved data value is classified as normal by the observer, the observer's classification is referred to as a "true negative," TN, 1722.

Columns 1730-1733 provide indications of the categories to which each retrieved and classified data value in column 1712 belongs. The number 1734 below column 1712 indicates the number of retrieve data values, 26. The numbers below columns 1730-1733 indicate the numbers of true positives, 4, false positives, 3, true negatives, 17, and false negatives, 2. In the dataset represented by column 1702, there are eight actual positives, or abnormal data values, 1736 and 26 actual negatives, or normal data values, 1738. The precision of the data-value retrieval 1740 is the ratio of true positives to the sum of the true positives and false positives and the recall 1742 is a ratio of the true positives to actual positives. Thus, the precision is the percentage of the retrieved observations classified as being positive by the observer that are actually positive and the recall is the ratio of the number of retrieved data values classified as positive by the observer to the number of actual positive data values in the dataset. In the case that the observer carries out perfect classification, the recall would be the percentage of positive data values in the dataset retrieved by the observer and the precision would be 1.0.

FIG. 17B shows a classification example that is similar to the example discussed above with reference to FIG. 17A. However, in this classification example, the observer is able to retrieve all of the data values in the dataset, rather than just a portion of the data values. The illustration conventions used in FIG. 17B are identical to those used in FIG. 17A. FIG. 17C illustrates four different metrics associated with the classification example. The actual data is represented by the Venn-like diagram 1750, with a first portion 1752 corresponding to positive data values, or data values objectively classified as abnormal, and a second portion 1754 corresponding to the data values objectively classified as normal. The observed data is represented by the Venn-like diagram 1756, with a first portion 1758 corresponding to positive data values, or data values subjectively classified as abnormal, and a second portion 1760 corresponding to the data values subjectively classified as normal. Note that the first and second portions of the actual data do not correspond exactly to the first and second portions of the observed data, due to the fact that the observer's classifications are not perfectly accurate. Superimposing the two Venn-like diagrams 1750 and 1756 produces a third Venn-like diagram 1762 with four portions corresponding to the categories discussed above with reference to table 1714 in FIG. 17A.

The four metrics accuracy 1764, precision 1766, recall 1768, and specificity 1770 are computed in the lower portion of FIG. 17C. In all cases, the metrics are computed as ratios of one or more of the numeric values of the categories to one or more different numeric values of the categories in Venn-like diagram 1762. For example, the accuracy 1764 is computed as the ratio of the sum of the true positives and true negatives divided by the sum of the true positives, true negatives, false positives and false negatives. That ratio is depicted by the shaded areas of the representations 1772 and 1774 of the Venn-like diagram 1762. Thus, the accuracy is the ratio of the number of correctly classified data values to the total number of data values. The precision is the ratio of the number of data values correctly classified as positive to the number of data values classified as positive. The recall is a ratio of the number of data values correctly classified as positive to the number of data values that actually are positive. The specificity is the ratio of the number of data values accurately classified as negative to the total number of actually negative data values. Perfect classification would produce an accuracy of 1.0, a precision of 1.0, a recall of 1.0, and a specificity of 1.0.

It turns out that the above-described approach for identifying log/event messages that are particularly relevant to a particular problem are associated with many serious deficiencies, as discussed above. One deficiency is that the change in frequency of occurrence of particular types of log/event messages between the current window and base window may result from different types of workloads being processed by a distributed computer system during the different time periods, rather than from differences in the log/event-message types generated when the particular problem occurs relative to the log/event-message types generated during normal system operation. In other words, the fact that the frequency of occurrence of a log/event-message type changes between the current window and the base window may not be reflective of the particular problem being diagnosed. Furthermore, there may be many intermittently occurring problems, which generate specific types of log/event-messages, types that are automatically remediated and that are unrelated to the particular problem that is being diagnosed. One or more of these intermittent problems may have occurred during the current window but may not have occurred during the base window, or vice versa, which result in false indications of relevancy As a result, the average precision of the current methods for ranking log/event messages with respect to relevancy or relatedness to a particular problem is less than 0.4 and the average recall of these methods is less than 0.3. There been various attempts to improve the accuracy and reliability of event/log-message ranking to assist SRE personnel, system administrators, and others, including automated systems, to quickly identify particularly relevant event/log messages in order to diagnose particular problems, but these attempts have not produced significant increases in the precision, recall, and accuracy of log/event-message ranking and identification of relevant log/event messages. It is these poor results that have motivated creation of the currently disclosed methods and systems.

Figure 18C:
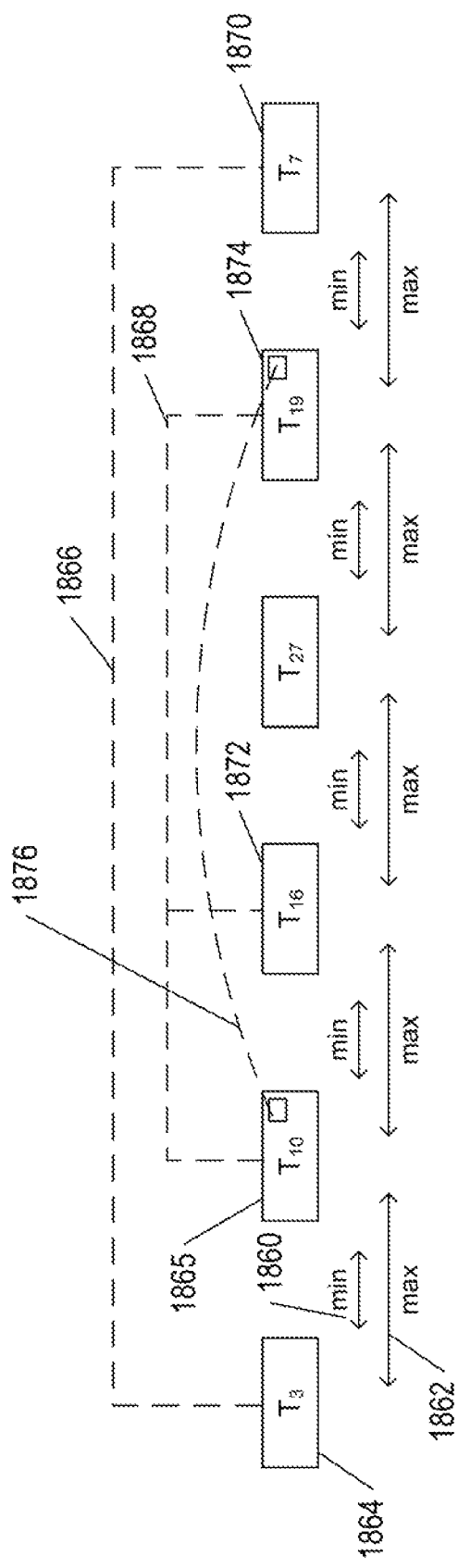

FIGS. 18A-C illustrate transactions and log/event-message traces. At the top of FIG. 18A, a simple diagram of a distributed application 1802 is provided. The distributed application includes three instances of a front-end application component 1804-1806, two instances of a mid-a level application component 1808 and 1809, and two instances of a back-end application component 1810 and 1811. The instances of distributed-application components may execute on multiple different servers or virtual servers within a distributed computer system. The small table 1812 shows the entrypoints of the application programming interfaces ("APIs") of the three different types of distributed-application component. For example, the front-end application component includes entrypoints e1 1814, e2 1815, e3

1816, e4 1817, e5 1818, and additional entrypoints represented by ellipsis 1820. In the lower portion of FIG. 18A, a timeline 1822 is shown in order to describe a transaction, which is a related sequence of entrypoint calls. The transaction begins with a call to entrypoint e2 1824 of a front-end application instance 1825. Soon after the front-end application instance begins executing application code in response to the call to entrypoint e2, the front-end application instance generates and transmits a first log/event message 1826 of type $T_3$ to the log/event-message system. This may, for example, be an entirely informational log/event message indicating that entrypoint e2 was called by a particular external entity. Somewhat later, the front-end application instance calls entrypoint e22 of mid-level application instance 1827. Soon after beginning to execute application code in response to the call, mid-level application instance 1827 generates and sends a second log/event message 1828 of type $T_{10}$ to the log/event-message system. Subsequently, the mid-level application instance generates and sends a third log/event message 1829 of type $T_{16}$ to the log/event-message system. Somewhat later, the mid-level application instance calls entrypoint e60 of back-end application instance 1830. Soon after beginning to execute application code in response to the call, the back-end application instance generates and sends a fourth log/event message 1831 of type $T_{27}$ to the log/event-message system. Later, the call to entrypoint e60 of the back-end application instance finishes and then the mid-level application instance generates and sends a fifth log/event message 1832 of type $T_{19}$ to the log/event-message system. Later, the call to entrypoint e22 of the mid-level application instance finishes and then the front-end application instance generates and sends a sixth log/event message 1833 of type $T_7$ to the log/event-message system before execution of the call to entrypoint e2 finishes. The example shown in FIG. 18A is relatively simple. A call to a front-end application-instance entrypoint may involve a much larger number of different and/or repeated internal entrypoint calls. The sequence of log/event messages 1826, 1828, 1829, 1831, 1832, and 1833 generated during execution of the call to entrypoint e2 is referred to as a "trace" in the current discussion. It is, in fact, a reflection, in the log/event messages stored by the log/event message system, of the execution flow within a distributed application launched by the call to entrypoint e2 of the front-end application instance of the distributed application. The number of log/event messages, the types of the log/event messages, and the sequence of log/event message types in a trace is implementation dependent, but for a given implementation, is a type of footprint or signature in stored log/event messages for the logically connected sequence of internal entrypoint calls, application-code execution, and occurrence of related events within the distributed application launched by a call to an entrypoint, referred to as a transaction.

As shown at the top of FIG. 18B, there may be a variety of different execution paths carried out by the distributed application in response to a call to any particular entrypoint. All of these execution paths are considered to be variations in the execution of the call to the particular entrypoint. Each of the different execution paths may be associated with a different, particular log/event-message trace. Thus, execution of a call to entrypoint e2, discussed above with reference to FIG. 18A, may produce a number of different traces 1840. In the current discussion, the variations in the execution of the call to a particular entrypoint are referred to, in the aggregate, as a "transaction" and the different sequences of log/event messages that are produced by the different execution paths resulting from a call to the particular entrypoint are referred to as "traces." Multiple different execution paths may produce a single type of trace, depending on implementation details, or may each produce a unique type of trace. The definition of transactions may differ in different implementations of the currently disclosed methods and systems. For example, all of the different execution paths that may occur following a call to a particular entrypoint may be partitioned into groups, with each different group considered a transaction. For a particular distributed computer system at a particular point in time, there may be numerous different distributed applications executing within a distributed computer system and, for each distributed application, there may be multiple transactions, each of which is associated with multiple types of traces. Thus, a distributed computer system may be associated with a file or other unit of information that contains an encoding of indications of the distributed applications running within a distributed computer system along with encodings of descriptions of the different transactions and associated trace types, as schematically represented in the top portion of FIG. 18B.

The lower portion of FIG. 18B shows a tree-like representation 1842 of the different execution paths for a particular entrypoint. The entrypoint is represented by a root node 1844. Each execution path is represented by a traversal of the tree-like representation from the root node to a leaf node as well as a very short execution path represented by curved arrow 1846 in which the call to the entrypoint returns following generation and transmission of log/event messages of types $T_3$ and $T_{71}$, without making internal calls to entrypoints. The execution path shown in FIG. 18A with respect to timeline 1822 is represented by a traversal of the tree-like representation from root node 1844 through nodes 1848-1852 to leaf node 1852.

As shown in FIG. 18C, a particular trace, such as the trace produced by the execution path shown in FIG. 18A, may be associated with various constraints. For example, the time interval between any two adjacent log/event messages in the sequence of log/event messages of the trace may be associated with a minimum and maximum length of time. For example, there may be minimum 1860 and a maximum 1862 expected times between the timestamp associated with the first log/event message 1864 of the second log/event message 1865. There also may be constraints associated with the source of the log/event messages. For example, dashed lines 1866 and 1868 in FIG. 18C represent constraints that the same front-end application instance generates and transmits log/event messages 1864 and 1870 and that the same mid-level application instance generates and transmits log/event messages 1865, 1872, and 1874. Curved dashed line 1876 represents an additional type of constraint requiring that a particular field common to log/event messages 1865 and 1874 has the same value in both log/event messages. Many other types of constraints are possible. For example, due to the variations in execution times of various calls, groups of two or more adjacent log/event messages may have different time orderings in different trace instances. When it is possible to determine such constraints for traces, the constraint information may assist in identifying transactions within large sets of time-ordered log/event messages. Constraints may be encoded in a constraints file or may be programmatically included in methods and systems that identify traces and corresponding transactions in log/event-message datasets.

It should be noted that even applications that run as one instance in a single execution environment produce log/event messages and include sequences of internal operations that can be identified as transactions. For example, a transaction may be, in such an application, the sequence of routine calls made during processing of a call an APLI entrypoint of the application. Thus, the term "transaction" refers to a more general concept than sequences of internal entrypoint calls of a distributed application. The term "abstraction" refers, most generally, to a group of related operations or events within a system that are logically connected, and which generate one or more identifiable trace types, or sequences of log/event-message types, in log/event messages collected and stored by log/event-message systems.

There are a variety of different methods for generating descriptions or catalogs of the various applications and corresponding transactions and traces that may be encountered in log/event-message datasets stored by a log/event-message system. The information may be compiled manually by systems administrators and/or SRE personnel, may be obtained from information provided by application vendors and/or developers, or may be automatically generated by manual or automated analysis of log/event messages actually generated within a distributed computer system.

Figure 19A:
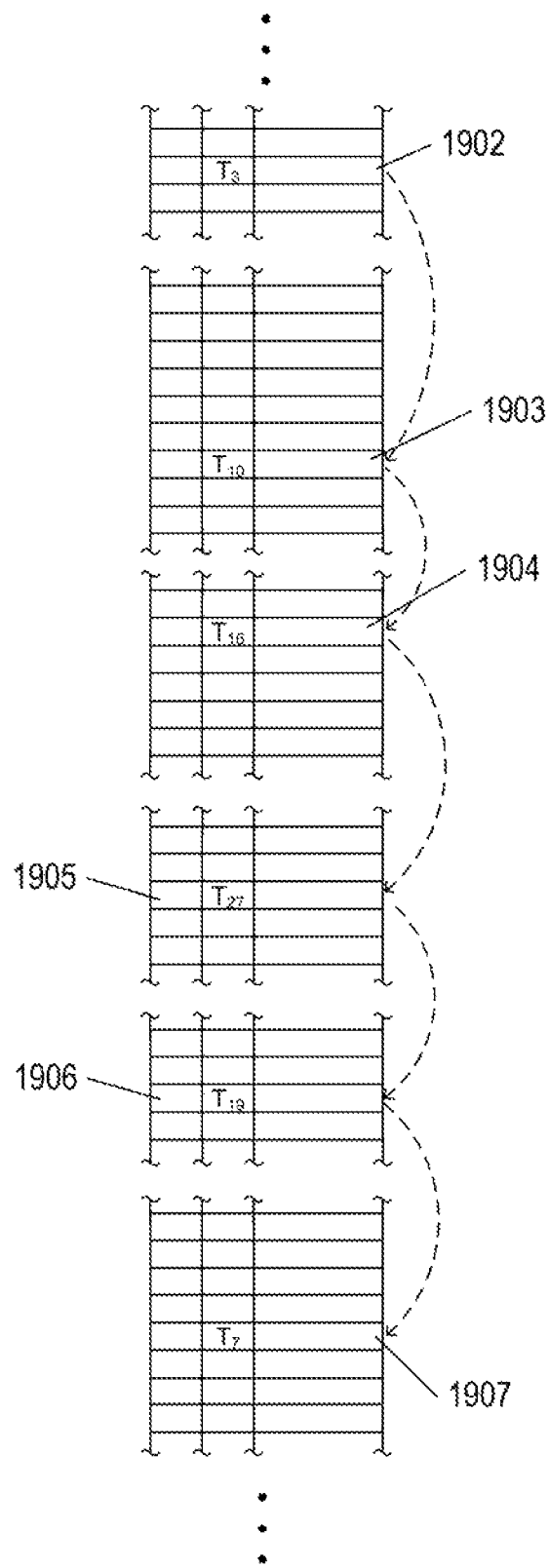
FIGS. 19A-B illustrates the problem of identifying transactions within a large log/event-message dataset.
Figure 19B:
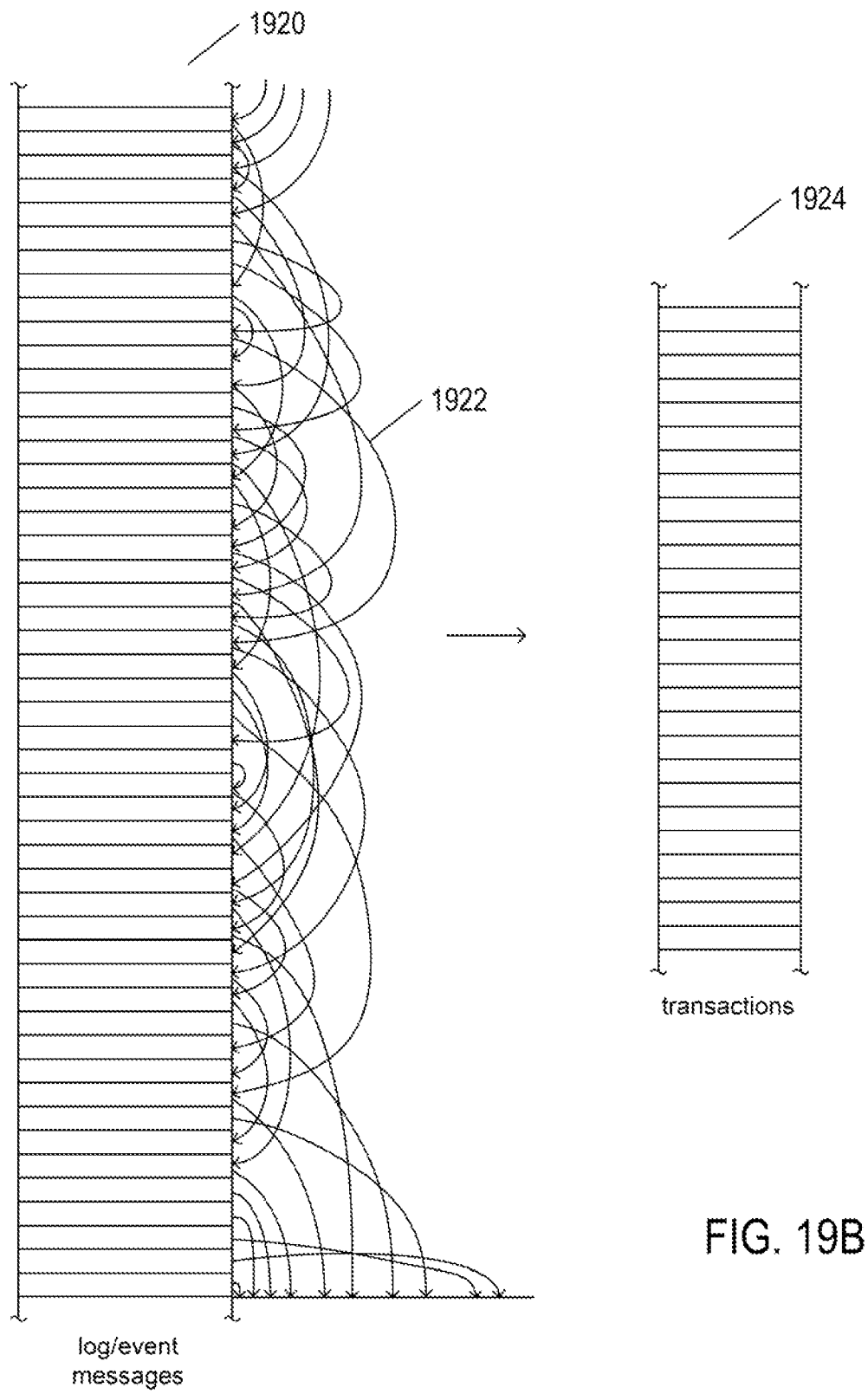

FIGS. 19A-B illustrates the problem of identifying transactions within a large log/event-message dataset. As shown in FIG. 19A, the log/event messages in a trace produced by a particular transaction may be widely separated from one another in a time-ordered log/event-message dataset. The sequence of log/event messages in a particular trace 1902-1907 may occur within a relatively large span of log/event messages, most of which belong to other traces. As shown in FIG. 19B, a particular time-ordered log/event-message dataset 1920 may include huge numbers of overlapping and interleaved traces, represented by the curved lines, such as curved line 1922, to the right of the dataset. However, using the above-described transaction/trace descriptions and, when available, descriptions of constraints associated with traces, a time-ordered sequence of transaction identifiers 1924 can be obtained from a much larger log/event-message dataset. In the described implementation, each transaction identifier identifies a particular type of transaction, inherits the timestamp of the first log/event message in the transaction, and includes indications of the log/event messages in the dataset comprising the trace associated with the transaction.

FIGS. 20A-D provide control-flow diagrams for a routine "generate transactions" that identifies traces in a log/event-message dataset and generates a time-ordered list of transactions corresponding to the identified traces. In step 2002, the routine "generate transactions" receives a file F containing the dataset comprising a time-ordered sequence of log/event messages, a file T containing indications of the traces that may occur in the dataset, grouped by transaction and application, as symbolically represented at the top of FIG. 18B, a file C containing indications of various constraints associated with traces, as discussed above with reference to FIG. 18C, and a file TR into which a list of transactions identified by the routine "generate transactions" will be stored. Of course, the term "file" can mean an operating-system file or a reference to such a file, but may also more generally indicate any type of data-storage entity, including memory blocks, distributed files, and other types of data-storage entities. The constraints file C is generally optional. As mentioned above, constraints may be programmatically encoded in a system rather than supplied in a constraints file. In general, even the definitions of traces include constraints, so constraints are inherent in the method. It is convenient, for describing the routine "generate transactions" and, subsequently, the routine "score logs," to assume that the constraints are supplied in a constraints file C, but they may be instead programmed and/or included with trace definitions.

In step 2003, the routine "generate transactions" opens the received files, associates entries in F with available indications, further discussed below, and clears any current contents from the results file TR. In step 2004, the routine "generate transactions" sets the local variable i to the index of the first log/event message in F associated with a time or timestamp sufficiently greater than the time or timestamp associated with the first log/event message in F to ensure that the log/event message with index i is likely the first log/event message of a trace. Then, in the while-loop of steps 2005-2010, each next available entry in F, starting with the entry, or log/event message, indexed by i, is considered. In step 2006, the routine "getNextTR" is called to identify a trace that begins with the currently considered entry in F indexed by the value in local variable i. The routine "getNextTR" returns: (1) score, a numeric score indicating a probability that the returned trace corresponds to an actual trace; (2) R, an ordered set of indexes for the log/event messages in the identified trace; and (3) indications of the application a, transaction t type, and trace type tr of the returned trace. When the score is greater than a threshold value, as determined in step 2007, then, in step 2008, the routine "generate transactions" uses the values returned by the routine "getNextTR" to add a next transaction to the results file TR and to set indications in F that the entries of the log/event-messages in the returned trace are no longer available for consideration in the while-loop of steps 2005-2010. When i corresponds to the last available index in F, as determined in step 2009, the while-loop terminates. Otherwise, in step 2010, i is set to the next available index in F in preparation for a next iteration of the while-loop. Following termination of the while-loop, the routine "generate transactions," in step 2012, calls a routine "extract additional transactions" to attempt to identify any remaining transactions in the dataset and insert them into the proper locations in the results file TR. This may involve identifying incomplete traces that began at time points earlier than the time associated with the first entry in F as well as identifying incomplete traces lacking one or more log/event messages that completed at time points later than the time or timestamp associated with the final entry in F. This step may be completely omitted when the time interval corresponding to the dataset stored in F is selected to be sufficiently wide to include all of the complete traces that may be useful in diagnosing a particular problem. The routine "extract additional transactions" represents handling of special border cases and rare corrupted-trace cases and is not further described. Finally, in step 2013, the routine "generate transactions" restores F by removing indications of the availability and unavailability of entries and closes all of the open files.

Figure 20A:
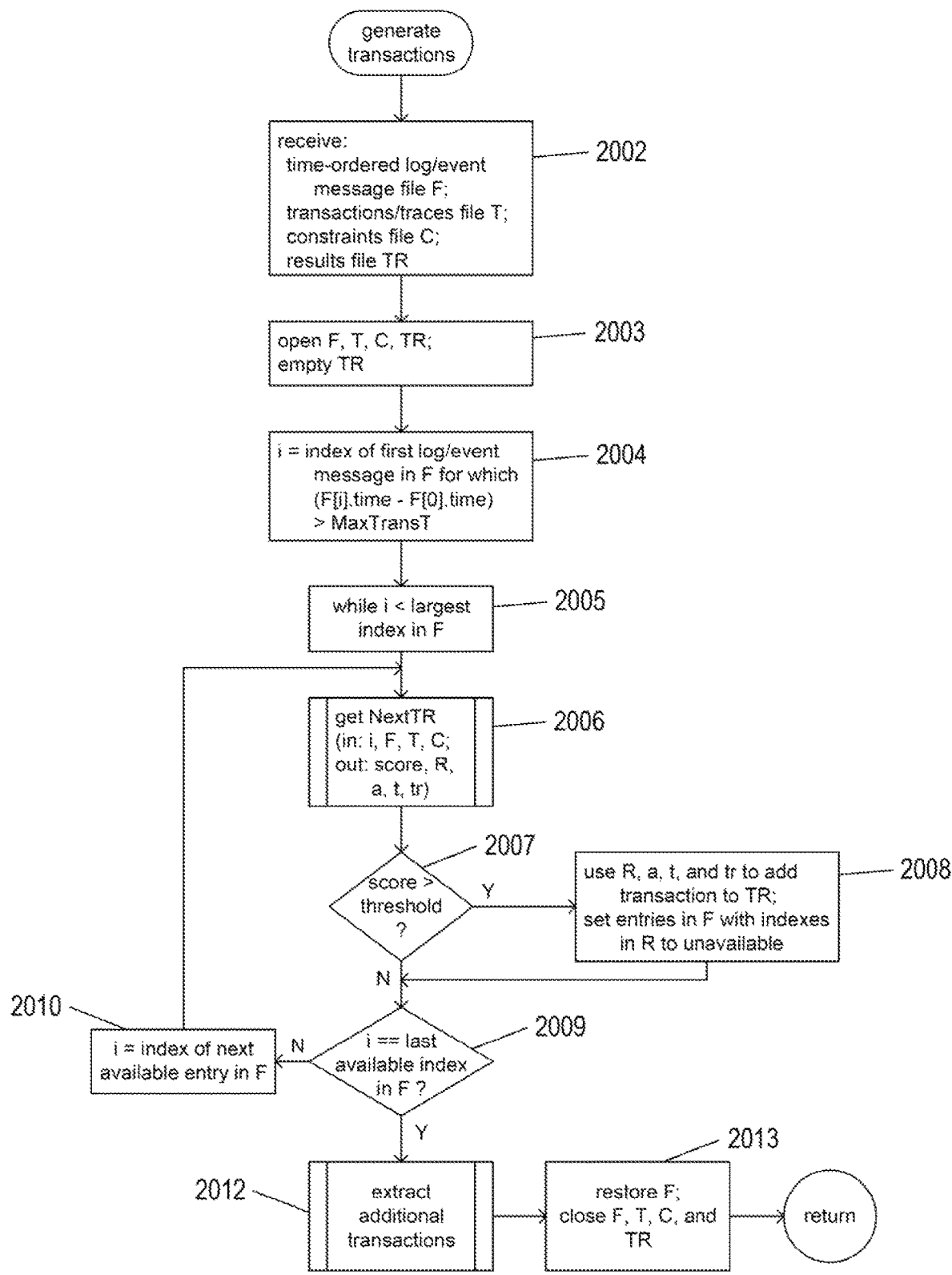
FIGS. 20A-D provide control-flow diagrams for a routine "generate transactions" that identifies traces in a log/event-message dataset and generates a time-ordered list of transactions corresponding to the identified traces.
Figure 20B:
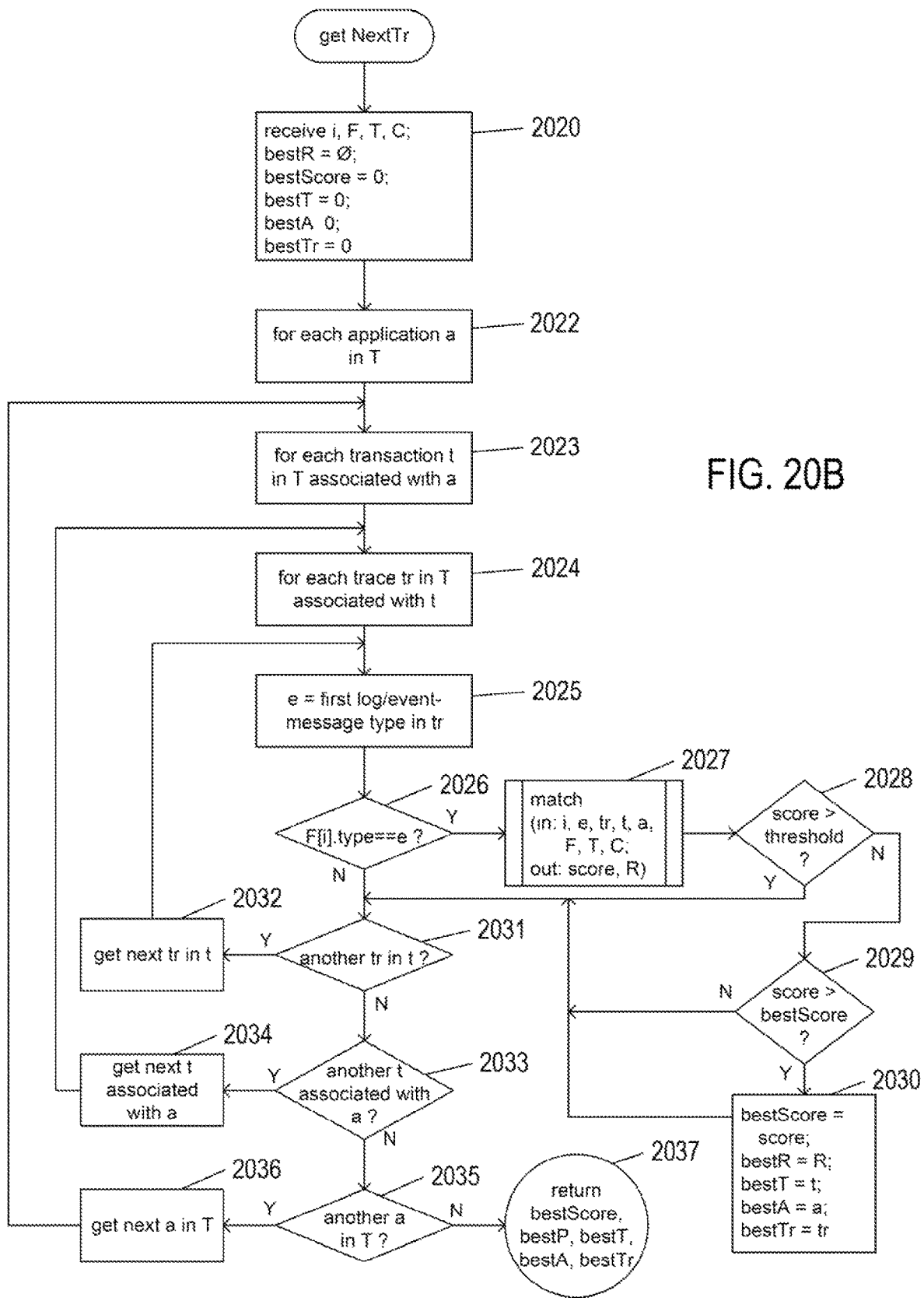

FIG. 20B provides a control-flow diagram for the routine "getNextTR" called in step 2006 of FIG. 20A. In step 2020, the routine "getNextTR" receives the index and file arguments passed to the routine, described above, initializes a local set variable R to the null set, and sets local variables bestScore, best, bestA, and bestTr to initial values. Then, in the triply nested for-loops of steps 2022-2036, the routine "getNextTR" calls the routine "match," in step 2027, for each possible trace identified by indications of the application a, transaction type t, and trace type tr corresponding to the for-loop variables a, t, and tr, with index i corresponding to the first log/event message in the trace and log/event-message type e indicating the type of the log/event-message indexed by index i. The trace that most closely matches a set of entries in F, identified by indications of the application a, transaction type t, and trace type tr, is returned by the routine "getNextTR" following completion of the triply nested for-loop.

Figure 20C:
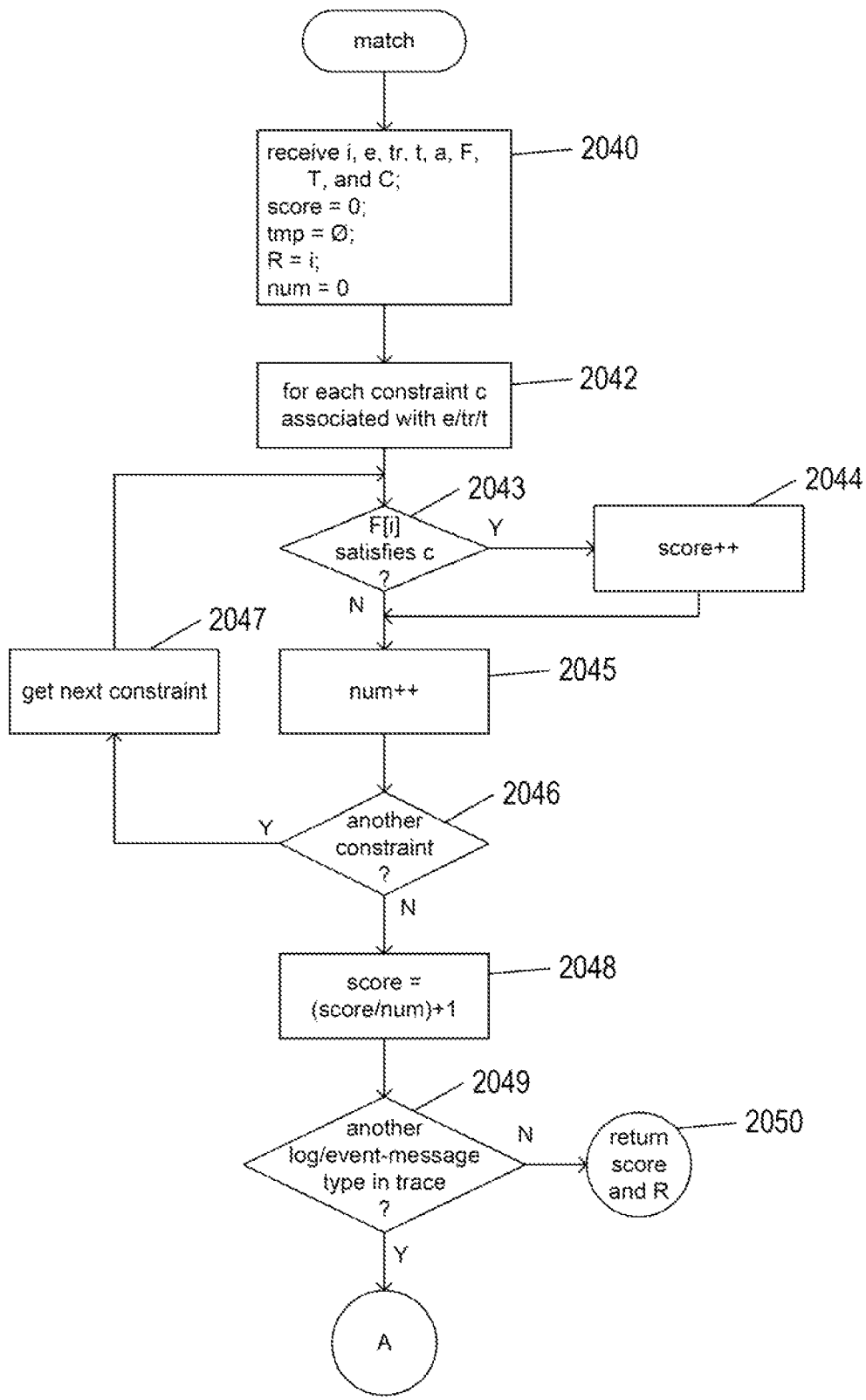
Figure 20D:
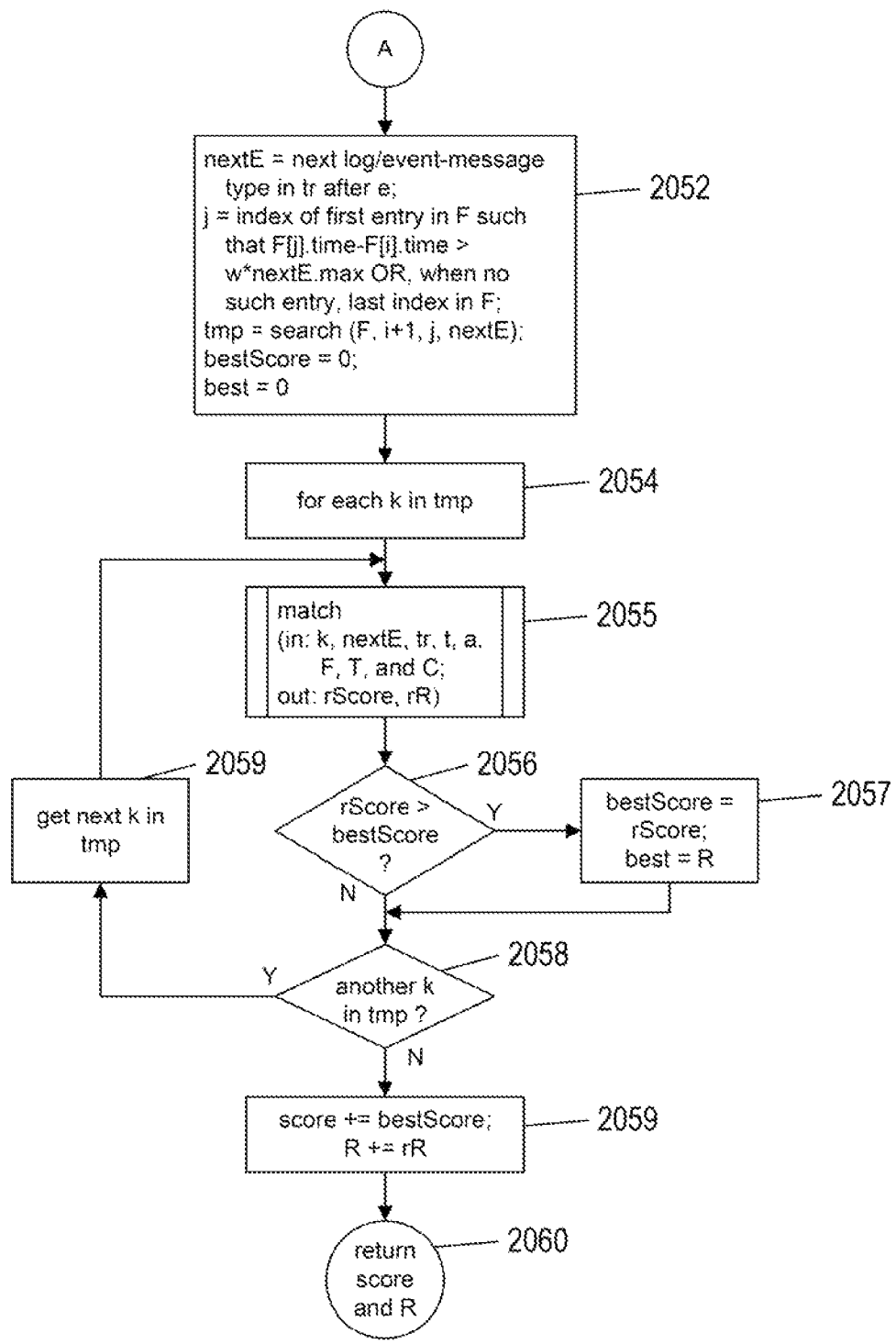

FIGS. 20C-D provide control-flow diagrams for the routine "match," called in step 2027 of FIG. 20B. The routine "match" receives calling arguments and initializes a local variable score to have the value 0, initializes local set variable tmp to the null set, initializes local set variable R to include received index i, and initializes local variable num to have the value 0 in step 2040. The routine "match" is recursive and recursively evaluates a candidate trace, in the first recursion represented by a single log/event message with index i and by the additional calling arguments. In the for-loop of steps 2042-2047, the routine "match" applies any available constraints for the candidate trace to the entry in F indexed by received index i, counting the number of satisfied constraints in the local variable score and counting the total number of constraints applied in the local variable num. When no constraints are supplied, the for-loop is not executed. Following termination of the for-loop of steps 2042-2047, a final score is computed as the sum of 1 and the contents of the local variable score divided by the contents of the local variable num, and step 2048. When there is another log/event-message in the trace identified by the received arguments, as determined in step 2049, the routine "match" continues in FIG. 20D. Otherwise, the routine "match" returns the contents of local variables score and R, in step 2050.

Continuing with FIG. 20D, the routine "match," in step 2052, sets local variable nextE to the type of the next log/event message in the candidate trace, local variable j to the index of the first entry in F sufficiently advanced in time from the entry indexed by index i to have little probability of corresponding to a next log/event message in the candidate trace, sets local set variable tmp to include indexes for all of the entries in F that may correspond to the next log/event message of the candidate trace, and local variables bestScore and best to initial values. In the for-loop of steps 2054-2059, the routine "match" recursively calls itself, in step 2055, for each possible next log/event message for the next log/event message of the candidate trace, maintaining indications of the best next log/event message and local variables bestScore and best. At the completion of the for-loop of steps 2054-2059, the score and indexes for the best match of the remaining log/event messages in the candidate trace are added to the local score and local indexes, in step 2059, and the score and indexes are returned in step 2060. There are, of course, additional possible methods for extracting transactions from a log/event-message dataset and many possible optimizations of the method illustrated in FIGS. 20A-D.

Figure 21:
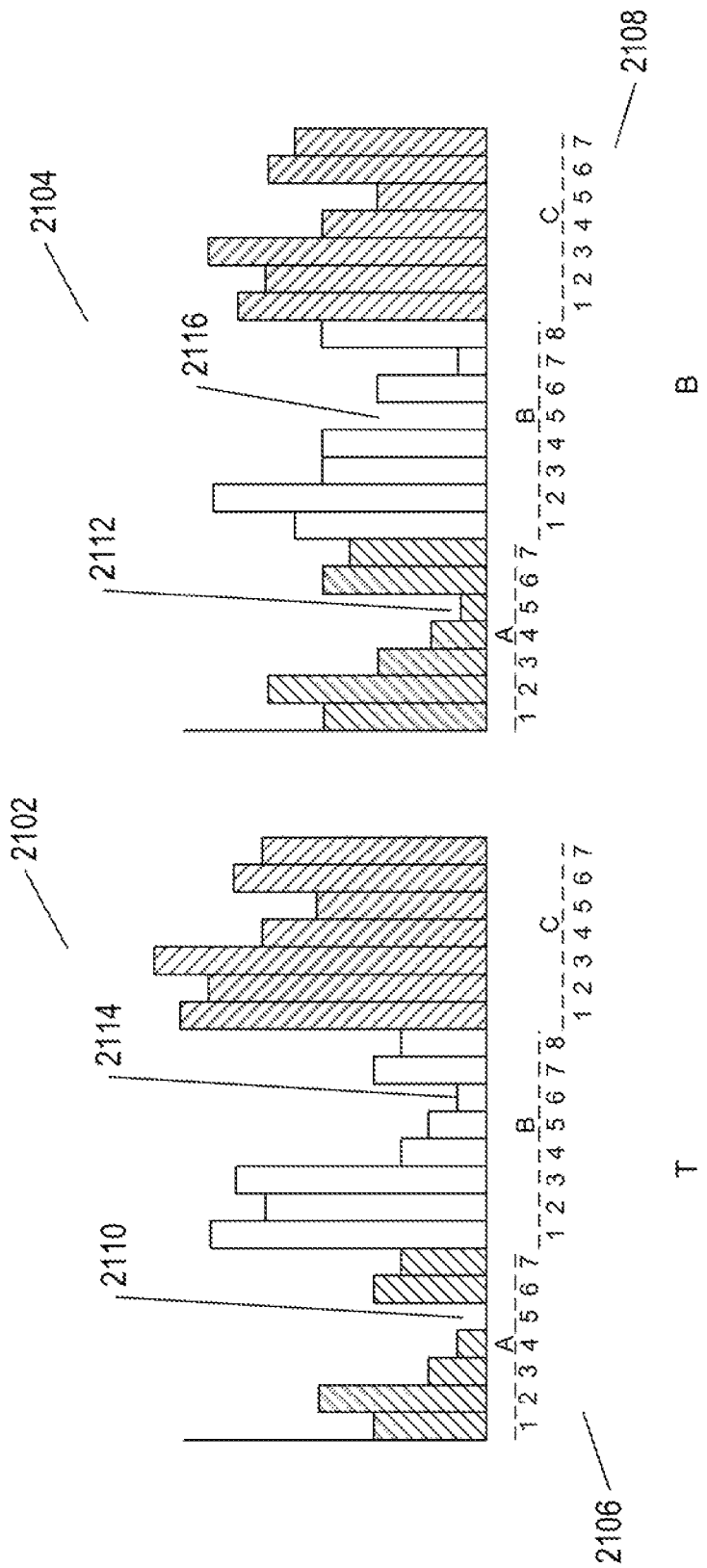
FIG. 21 provides an example of the dynamic nature of workloads.

As mentioned above, the current approaches to identifying particularly relevant log/event messages in a dataset, discussed with reference to FIGS. 16A-B, do not provide satisfactory results. Part of the reason for this is that the workload processed by distributed application is generally quite dynamic. FIG. 21 provides an example of the dynamic nature of workloads. FIG. 21 shows plots of the number of calls to the entrypoints of three different distributed applications A, B, and C during a current window 2102 and during a base window 2104, which are compared by currently available methods to determine relevant log/event messages, as discussed with reference to FIGS. 16A-B. Each vertical bar in the histogram-like plots represents the number of calls to a particular entrypoint of a particular distributed application. As indicated by annotations below the plots 2106 and 2108, the counts of entrypoint calls are organized in groups, each corresponding to one of the three distributed applications A, B, and C. Distributed applications A and C each include seven entrypoints and distributed application B includes eight entrypoints. In this example, the total number of entrypoint calls is relatively constant, but the number of calls to entrypoints of distributed application A is greater in the base window than in the current window while the number of calls to entrypoints of distributed application C is greater in the current window than in the base window, while relative frequencies of the calls to entrypoints of distributed application A and C are similar in both windows. By contrast, the relative frequencies of the calls to entrypoints of distributed application B are quite different in the two windows.

Current approaches base estimates of relevance of log/event messages on changes in the numbers of log/event messages of particular types, but, in the example shown in FIG. 21, almost all of the log/event-message types exhibit changes in the frequency of occurrence, generally due to the fact that the workload being processed in the current window is different from the workload being processed by the distributed applications and the base window. Consider, for example, the disappearance of calls to the fifth entrypoint of distributed application A 2110 from the plot for the current window while such calls occur 2112 in the plot for the base window. The absence of these calls in the current window may be reflective of the particular problem being diagnosed, or may simply be the result of the decreased portion of the workload directed to application A in the current window in comparison with the portion of the workload directed to application A in the current window. Similarly, there are calls to the sixth entrypoint of distributed application B 2114 in the current window but no calls to the sixth entrypoint of distributed application B 2116 in the base window. The calls in the current window to the sixth entrypoint of distributed application B might be related to the particular problem being diagnosed, but could also be reflective of what appears to be a high degree of variability in the number of calls to entrypoints of distributed application B between the base window and the current window. As pointed out above, there are many additional problems with current approaches, including the fact that distributed computer systems often have intermittent issues that are reflected by intermittent changes in the frequencies of the occurrence of one or more log/event messages, but these intermittent issues are often automatically remediated and the changes in the frequencies of the occurrence of one or more log/event messages associated with them are not reflective of more serious types of problems for which diagnosis by SRE personnel is needed.

The ability to identify traces in log/event-message datasets and use the identified traces to generate time-ordered sequences of transactions corresponding to the datasets provides an ability to more accurately identify log/event messages in the dataset that may be particularly related to a problem that is being diagnosed. Rather than crudely estimating relevance of a log/event-message type based on a change in the frequency of occurrence of log/event messages of that type between the base window and the current window, a more accurate and reliable method for estimating relevance of log/event messages with respect to a particular problem determines changes, between a base window and a current window, in relative frequencies of particular log/event-message types with respect to particular transactions in the traces of which they appear. Consider, for example, the tree-like representation of execution paths for a particular entrypoint, shown in the lower portion of FIG. 18B. A larger frequency of occurrence of a log/event messages of type $T_{68}$ observed in a current window relative to the frequency of occurrence of log/event messages of type $T_{68}$ in a base window may indicate either an increase in the rate of failure of transactions corresponding to the entrypoint associated with the root node 1844 or to an increase in the frequency of calls to the entrypoint associated with the root node. However, if a larger relative frequency of occurrence of log/event messages of type $T_{68}$ with respect to calls to the entrypoint associated with the root node is observed, there is a much stronger indication of an increased failure rate of the transaction corresponding to the entrypoint associated with the root node. In other words, the relative frequency of occurrence of log/event messages of type $T_{68}$ with respect to calls to the entrypoint associated with the root node is independent of the total number of calls made to the entrypoint, but is indicative of the frequency at which a call to the entrypoint results in an execution path leading to generation of a log/event messages of type $T_{68}$. Furthermore, rather than simply ranking individual log/event-message types, transactions can also be ranked for relevance, based on changes in the frequencies of different traces corresponding to each transaction, and these rankings may, in many cases, be far more useful to SRE personnel and other users seeking to identify information in a log/event-message database relevant to a particular problem.

Figure 22A:
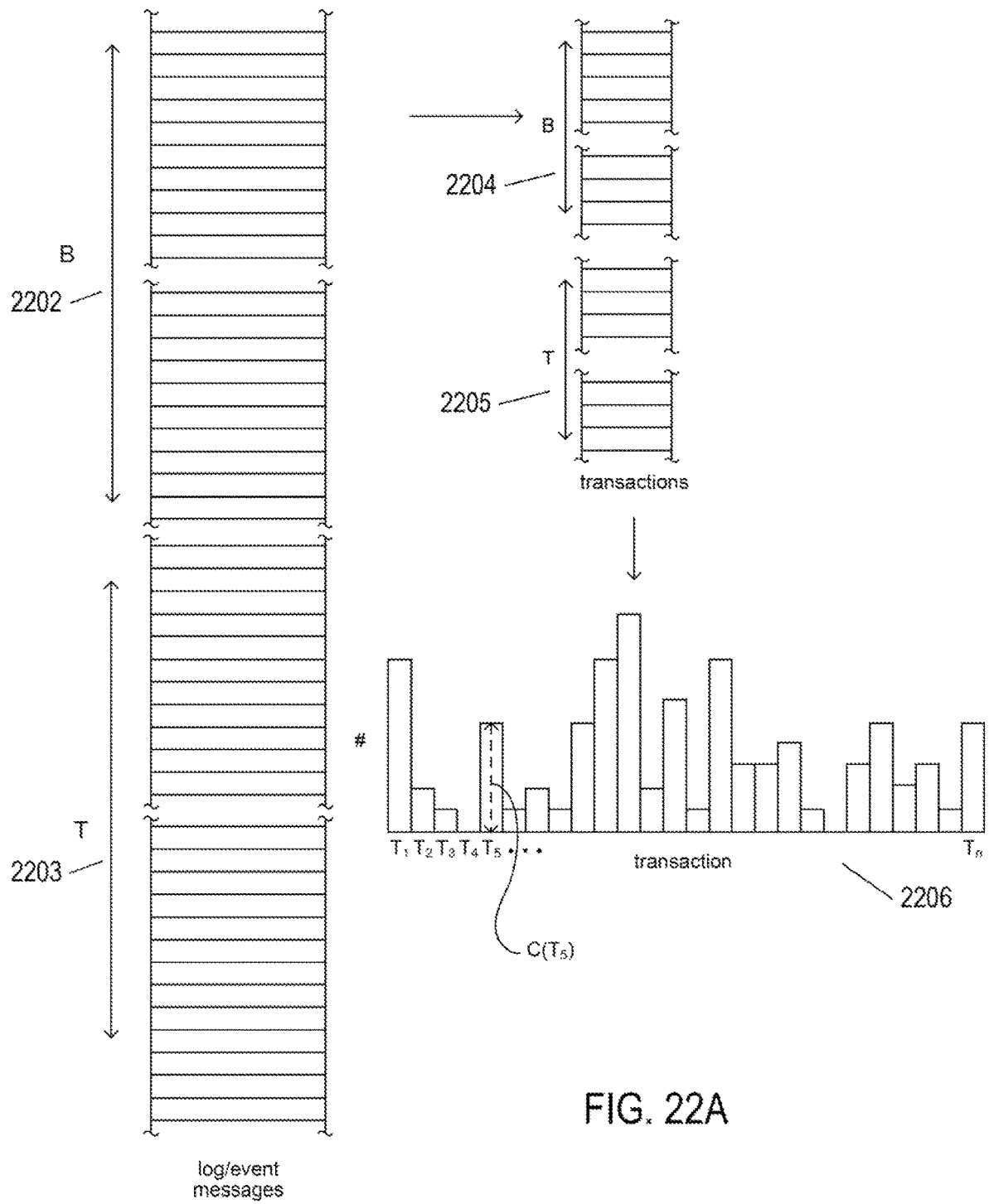
FIGS. 22A-D illustrates the currently disclosed method for computing relevant scores for log/event-message types as well as for transaction types.

FIGS. 22A-D illustrates the currently disclosed method for computing relevant scores for log/event-message types as well as for transaction types. FIG. 22A shows initial steps of the method. The initial dataset includes time-ordered log/event messages for a base window 2202 and time-ordered log/event messages for a current window 2203. The above-discussed method for generating time-ordered sequences of transactions is used to generate a sequence of transactions 2204 for the base window and a sequence of transactions 2205 for the current window. Each sequence of transactions can then be used to generate transaction counts for the base window and the current window. The transaction counts can be imagined as a histogram-like plot 2206 for each of the base and current windows in which the column heights correspond to the absolute counts of particular transaction types.

Figure 22B:
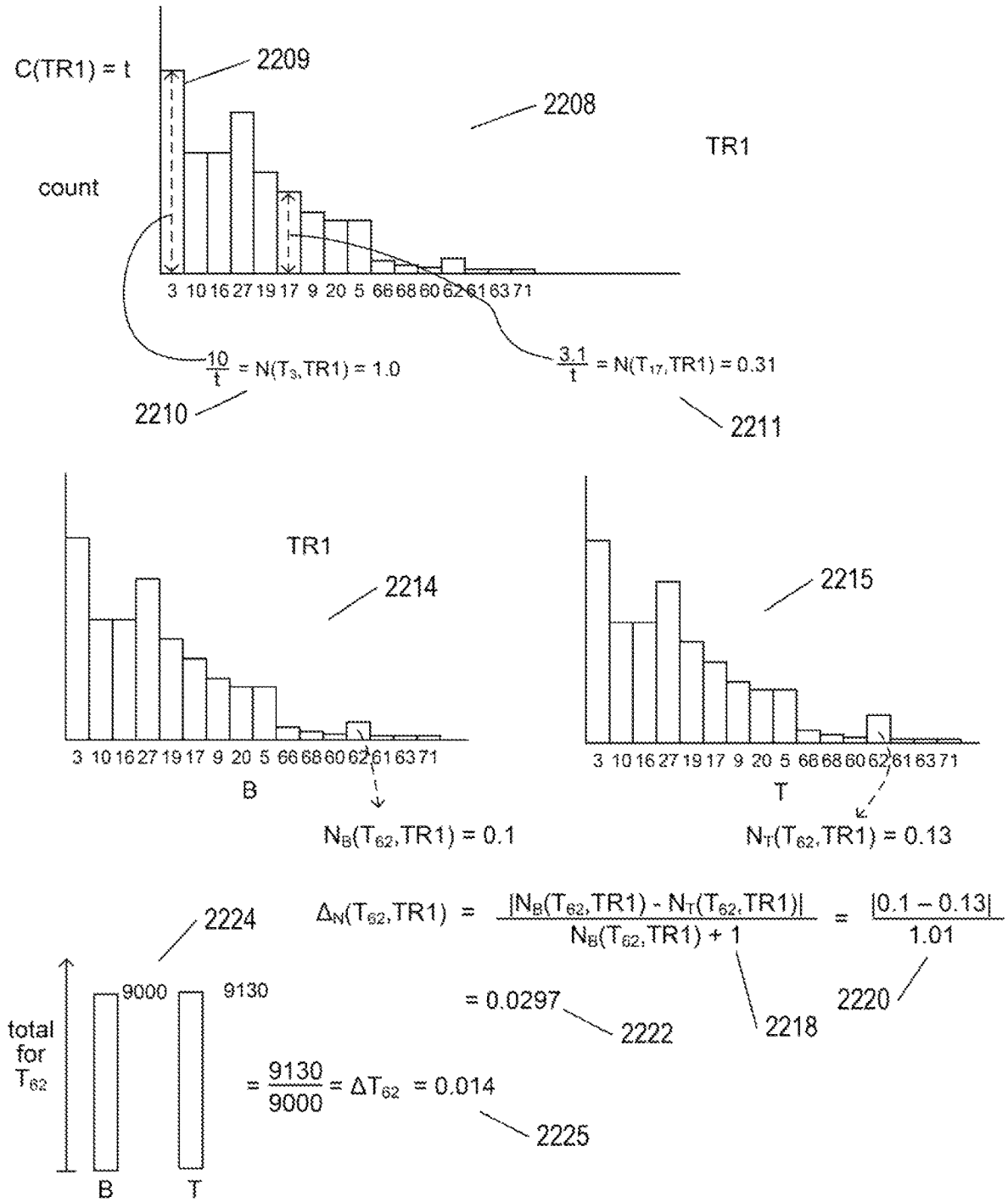

Next, as shown at the top of FIG. 22B, the relative numbers of log/event-message types that occur in the traces associated with each particular type of transaction are determined. Histogram 2208 represents the numbers of each of the 16 different log/event-message types that occur in the traces in the current window corresponding to the first transaction type represented by the tree-like graph in FIG. 18B. The first column 2209 represents a number t=10*inc of event/log messages of type $T_3$ observed in these traces, where 10 is the height of the column and the value inc represents scaling of the histogram. The number t is also the number of occurrences of transactions of the first transaction type in the log/event-message dataset corresponding to the current window, since, in the current example, transactions of the first type all begin with a call to entrypoint e2, which always generates an event/log messages of type $T_3$. The relative frequency of occurrence of event/log messages of type $T_3$ in transactions of the first type is therefore (10*inc)/t=1.0 (2210), as would be expected.

The relative frequencies of the other log/event-message types that can occur in traces corresponding to transactions of the first type are all less than 1.0, since there are multiple different possible execution paths, as represented by the tree-like representation shown in FIG. 18B. For example, 3.1*inc occurrences of the log/event message of type $T_{17}$ were observed in traces corresponding to the first transaction in the example dataset, which produces a relative frequency of the log/event message of type $T_{17}$ in traces corresponding to the first transaction of (3.1*inc)/t=0.31 (2211). The relative frequency of a log/event-message type y in traces corresponding to transaction type x is a denoted N(y, x) in the figures.

Relative frequencies of log/event-message types for the different types of transactions are generated for the base window and the current window. For example, the histograms of the counts of log/event-message types for the first type of transaction for the base window 2214 and the current window 2215 are shown in the middle of FIG. 22B. The computed relative frequencies of occurrence of a log/event-message type y in traces corresponding to transaction type x is a denoted $N_T(y, x)$ for the current window and is denoted $N_B(y, x)$ for the base window in the figures.

The change in the relative frequency of occurrence of a log/event-message type y in traces corresponding to transaction type x from the base window to the current window, or vice versa, $\Delta_N(y,x)$, is computed as the absolute value of the difference of the relative frequencies for the base and current windows divided by the sum of 1 and the relative frequency for the base window 2018. In the example for the log/event-message type $T_{62}$ in the first transaction type, $\Delta_N(y,x)$ is numerically computed as the ratio 2020 which is equal to 0.0297 (2022). In the example shown in FIG. 22B, the total counts of occurrence of log/event messages of type $T_{62}$ in the base and current windows is 9000 and 9130, respectively, as shown in abbreviated histogram 2024, representing an overall increase in frequency of occurrence of 1.4% (2025). However, the relative change in the frequency of occurrence of the log/event message of type $T_{62}$ within traces corresponding to the first transaction type is 2.97%. Therefore, although the overall change in frequency of occurrence of log/event messages of type $T_{62}$ is relatively modest, which might be attributed to differences in the workloads being processed during the base window and current window, the relative change in the frequency of occurrence of the log/event message of type $T_{62}$ within traces corresponding to the first transaction type is significantly higher, and is likely indicative of an increase in the failure rate of transactions of the first transaction type in the current window relative to the base window.

Figure 22C:
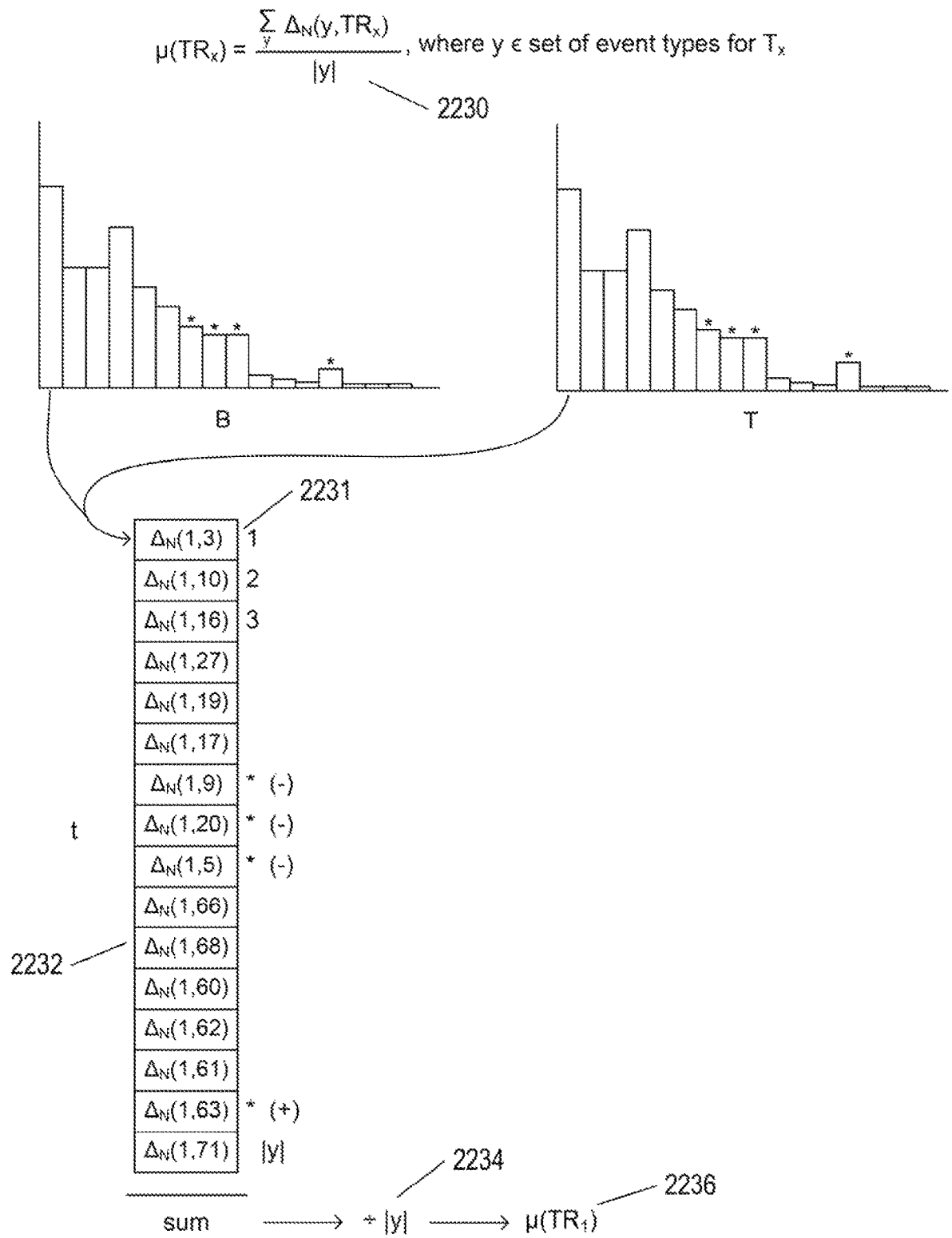

As shown in FIG. 22C, a cumulative relative change in the frequencies of occurrence of the log/event-message types that may occur in traces of a particular transaction type x, μ(x), is computed as the sum of the relative changes in the frequencies of occurrence of the log/event-message types divided by the number of log/event-message types that may occur in traces of the particular transaction type 2230. The lower portion of FIG. 22C illustrates this calculation. For each log/event-message type y, such as a first log/event-message type 2231, a $\Delta_N(y,x)$ value is computed from the relative frequencies of occurrences of the log/event-message type y in the base and current windows. The column of $\Delta_N(y,x)$ values for each log/event-message type y 2232 with respect to transaction type x is summed and then divided 2234 by the number of log/event-message types associated with the first transaction type x to produce the cumulative relative change in the frequencies of occurrence of the log/event messages that may occur in traces of transactions of type x, μ(x) 2236.

Figure 22D:
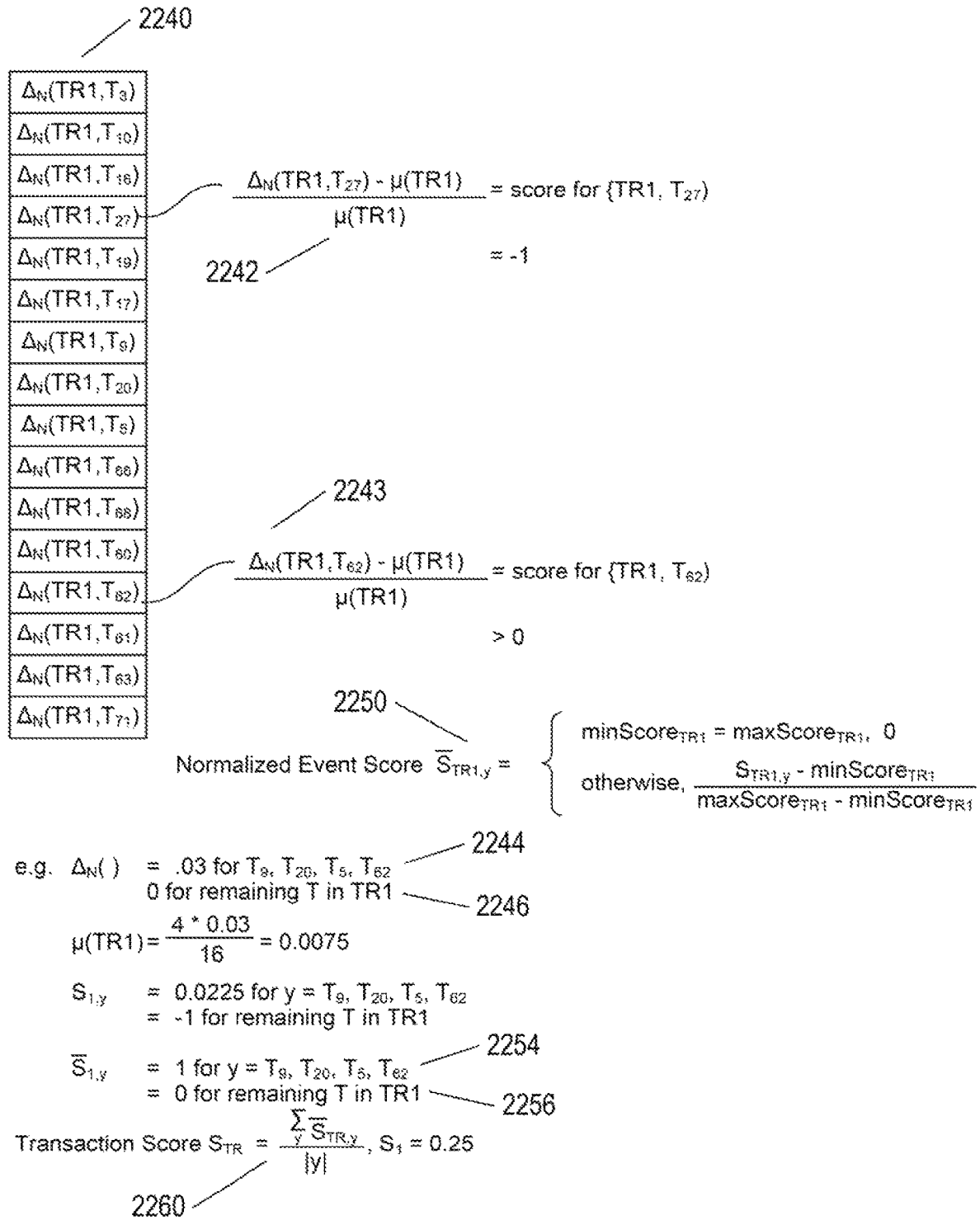

FIG. 22D illustrates computation of scores for each log/event-message-type/transaction-type pair as well as computation of transaction-type scores. The $\Delta_N(y,x)$ values for the first transaction, TR1, in the example of FIG. 22B, are shown in column 2240. A score is computed for each log/event-message type as the difference between the $\Delta_N(y,x)$ value and the $\mu(TR1)$ value for the transaction divided by the $\mu(TR1)$ value for the transaction 2242 and 2243. In the example shown in FIG. 22B, there is a small relative change in relative frequency for four of the log/event-message types 2244 and no change in relative frequency for the remaining log/event-message types 2246. The computed score is greater than 0 for the four log/event-message types 2244 with changes in relative frequency and −1 for the remaining log/event-message types 2246. As shown in expression 2250, a normalized score is computed from each log/event-message score using the minimum and maximum log/event-message type scores for transaction type TR1. When the minimum and maximum log/event-message-type scores are equal, the normalized score is 0. Otherwise, the normalized score is the ratio of the difference between the log/event-message score and the minimum log/event-message-type score to the difference between the maximum and minimum log/event-message-type scores. As shown in the lower portion of FIG. 22D, using the numerical example introduced in the middle of FIG. 22B, the normalized scores for the four log/event-message types with small changes in relative frequencies is 1 (2254) while the normalized scores for the remaining log/event-message types with no change in relative frequency is 0 (2256). The normalization of the log/event-message-type scores thus better spreads out the scores over the range [0, 1]. Finally, as shown by expression 2260, a transaction-type score is computed as the sum of normalized log/event-message-type scores for log/event-message types that occur in traces corresponding to the transaction type, divided by the number of normalized log/event-message-type scores for log/event-message types that occur in traces corresponding to the transaction type. In certain implementations, the various scores and intermediate values may be expressed as percentages rather than as real values in the range [0, 1].

As further discussed below, the normalized log/event-message-type scores for each log/event-message-type/transaction-type pair can be used to rank log/event messages within a log/event-message dataset with respect to relevance, allowing SRE personnel to quickly focus their attention on those log/event messages with greatest probability of facilitating diagnosis of a particular problem. Moreover, the transaction-type scores can direct the attention of SRE personnel to traces in a log/event-message dataset that are particularly relevant to a particular problem for which the log/event-message dataset is analyzed. Because these scores are computed based on relative frequency of occurrences of log/event-message types within traces corresponding to particular transactions, they have a much higher probability of identifying log/event messages and traces in a log/event-message dataset that are relevant to a problem being diagnosed.

FIGS. 23A-D provide control-flow diagrams illustrating an implementation of the method for computing normalized scores for each log/event-message-type/transaction-type pair and each transaction type identified in a log/event-message dataset. In a first step 2302 in FIG. 23A, the routine "score logs" receives a base-window log file, or dataset, B, a current-window log file, or dataset W, a transactions/traces definition file T, and a constraints file C. As with the above-described routine "generate transactions," the constraints file may be optional. In step 2304, the routine "score logs" creates transaction files TR1 and TR2 to store transactions identified in the base-window dataset and current-window dataset. In addition, the routine "score logs" sets a number of one-dimensional-array and two-dimensional-array local variables to have all-0 values and sets the values of a one-dimensional-array local variable Min[ ] to a large value, such as a maximum valued integer that can be stored in the element of the array.

The one-dimensional-array and two-dimensional-array local variables store the intermediate computed values and final normalized scores for each log/event-message-type/transaction-type pair and each transaction type. The local variables initialized in step 2304 include: (1) countEB[ ][ ], a two-dimensional array which stores the numeric counts of each transaction-type/log/event-message pair in the base-window dataset; (2) countEW[ ][ ], a two-dimensional array which stores the numeric counts of each transaction-type/log/event-message pair in the current-window dataset; (3) countTB[ ], a one-dimensional array which stores the numeric counts of each transaction type in the base-window dataset; (4) countTW[ ], a one-dimensional array which stores the numeric counts of each transaction type in the current-window dataset; (5) NB[ ][ ], a two-dimensional array which stores the relative frequency of occurrence of each log/event-message-type/transaction-type pair computed from the base-window dataset; (6) NW[ ] [ ], a two-dimensional array which stores the relative frequency of occurrence of each log/event-message-type/transaction-type pair computed from the current-window dataset; (7) Delta[ ] [ ], a two-dimensional array which stores the change in relative frequency of occurrence of log/event-message types in traces corresponding to transaction types, $\Delta_N(y,x)$; (8) mu[ ], a one-dimensional array which stores the cumulative relative change in the frequencies of occurrence of the log/event messages for transaction types x, $\mu(x)$; (9) Escores[ ] [ ], a two-dimensional array which stores the normalized scores for log/event-message-type/transaction-type pairs; (10) Tscores[ ], a one-dimensional array which stores the transaction-type scores; (11) N[ ], a one-dimensional array which stores the number of log/event-message types associated with each transaction type; (12) Max[ ], a one-dimensional array which stores the maximum normalized score for each transaction type; and (13) Min[ ], a one-dimensional array which stores a minimum normalized score for each transaction type. Of course, there are many different possible ways for implementing the above-described method for computing normalized scores for each log/event-message-type/transaction-type pair and each transaction type identified in a log/event-message dataset, some of which may use a fewer local variables and may store fewer intermediate results.

Figure 23A:
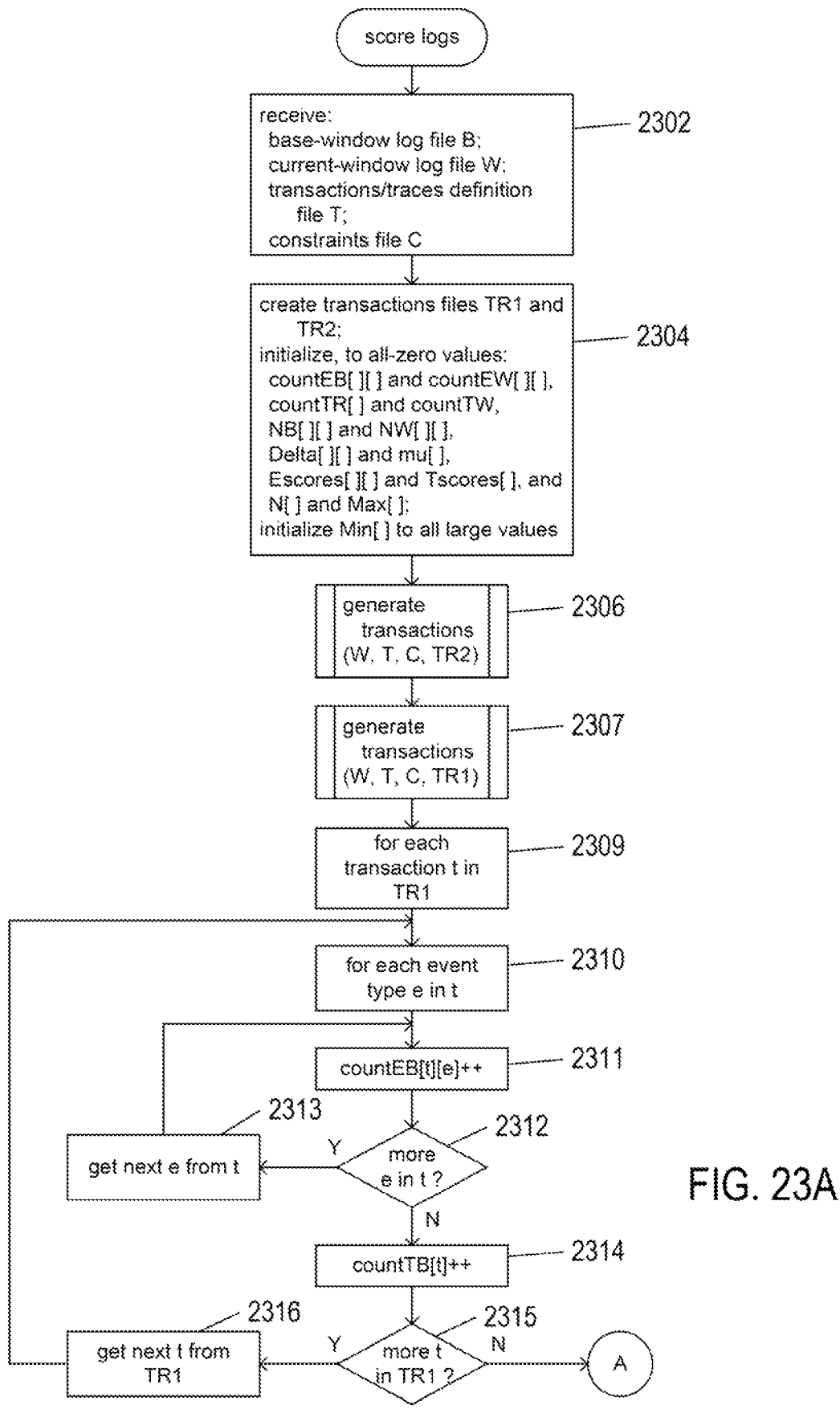
FIGS. 23A-D provide control-flow diagrams illustrating an implementation of the method for computing normalized scores for each log/event-message-type/transaction-type pair and each transaction type identified in a log/event-message dataset.
Figure 23B:
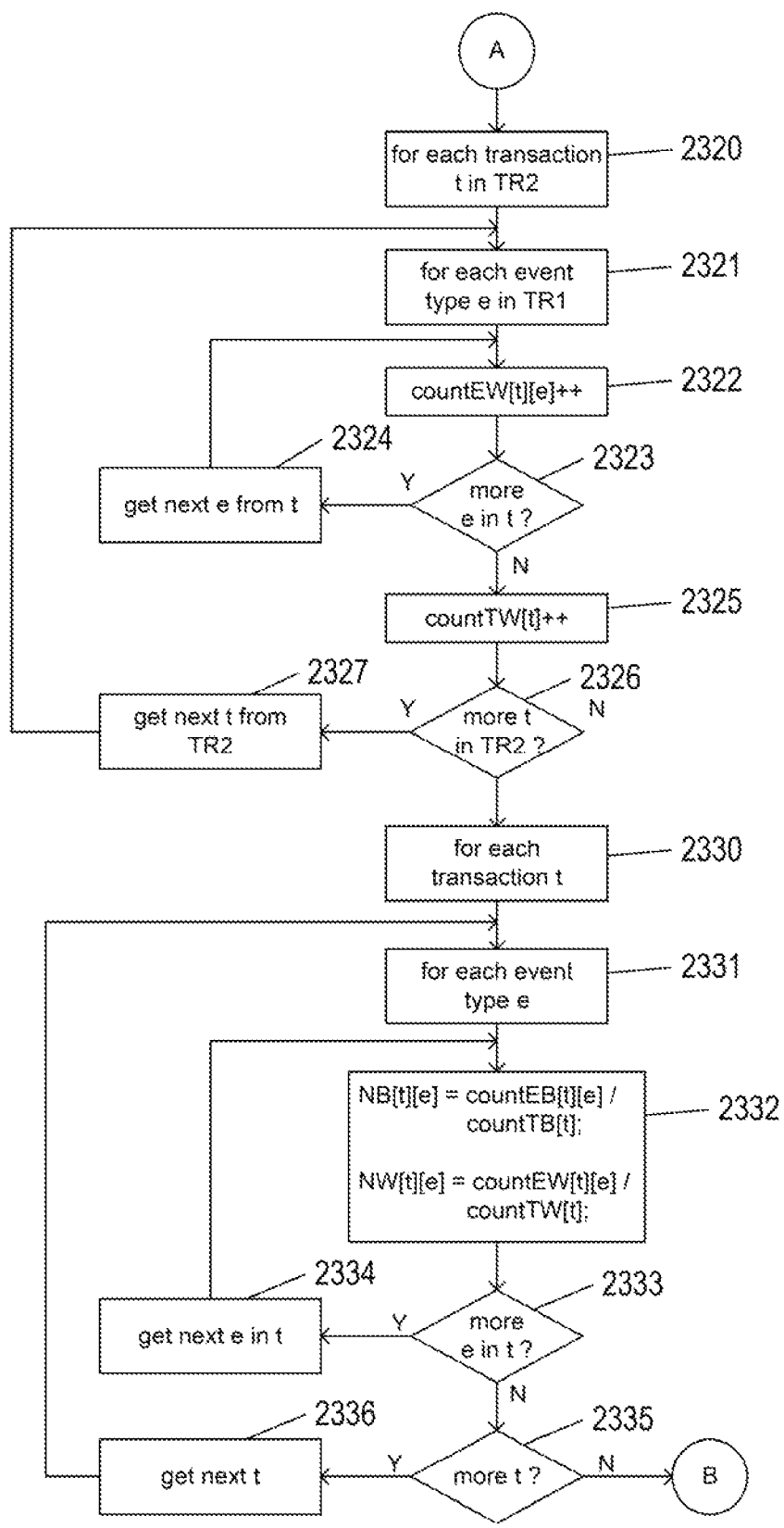
Figure 23C:
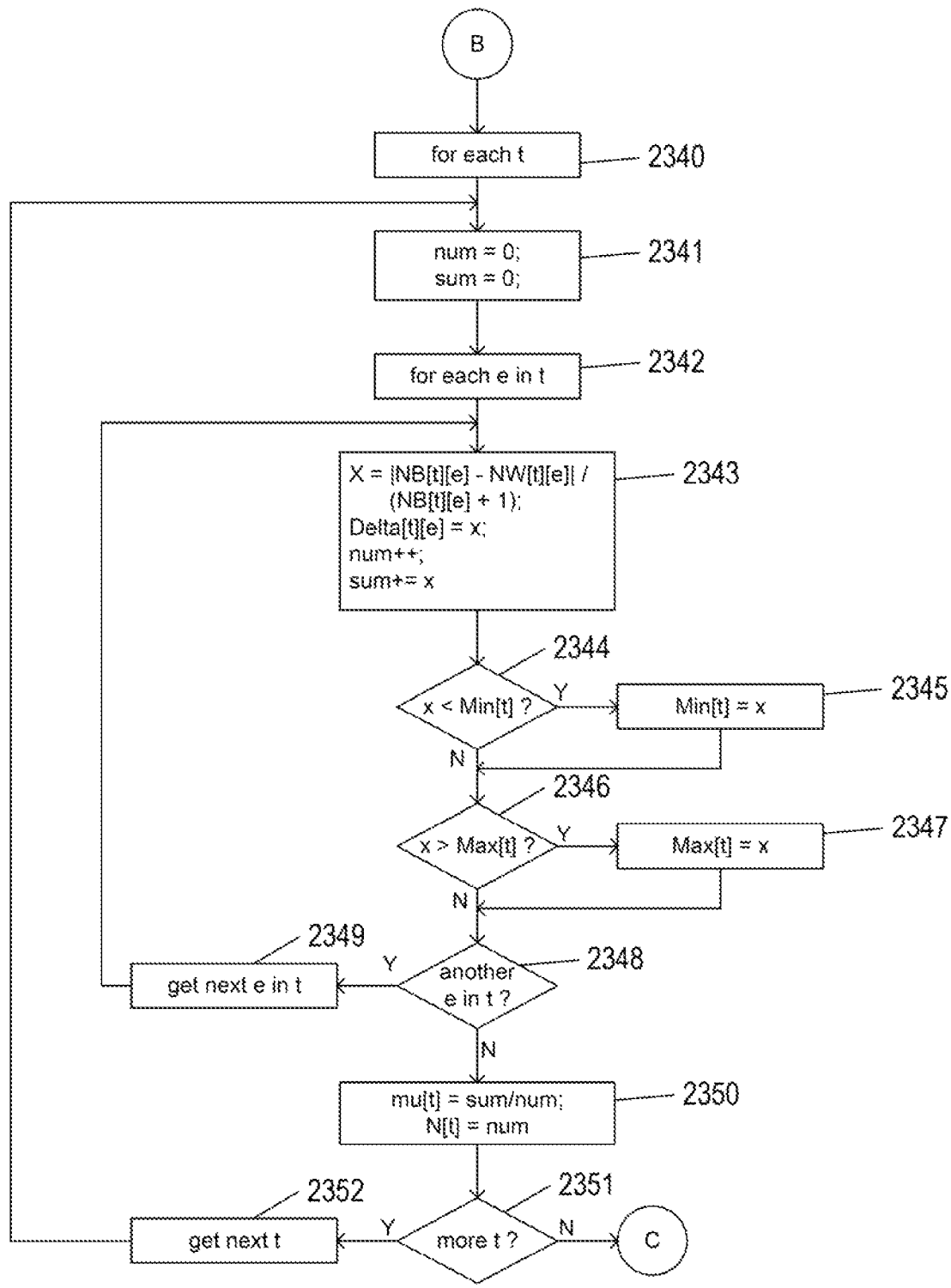
Figure 23D:
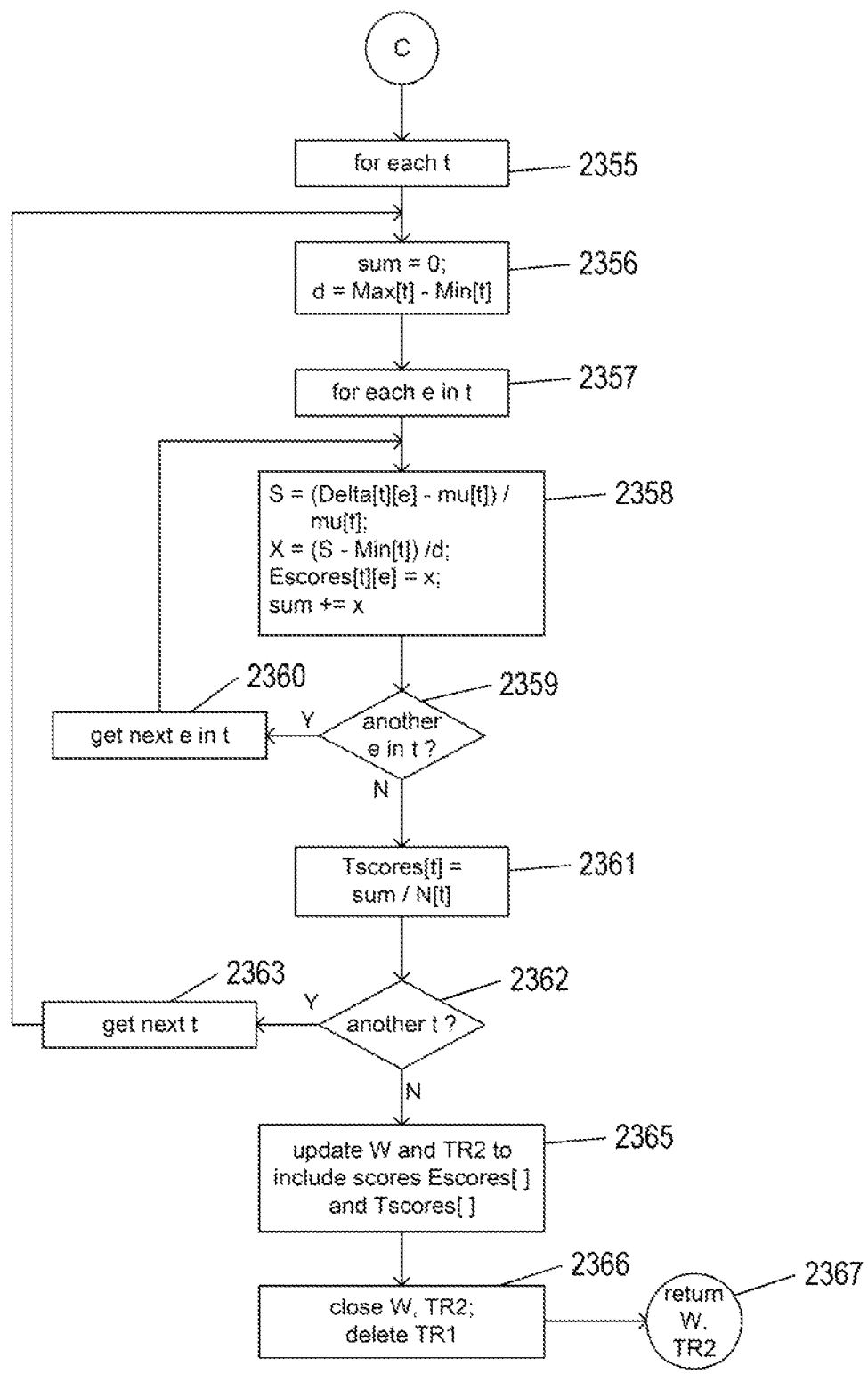

In steps 2306-2307, the routine "score logs" twice calls the routine "generate transactions," discussed above with reference to FIGS. 20A-D, to generate transaction sequences for the base-window and current-window datasets. The generated transaction sequences include indications of transaction types as well as indications of the log/event messages in the traces associated with the transaction types in the base-window and current-window datasets. In the nested for-loops of steps 2309-2316, the routine "score logs" counts the occurrences of each log/event-message-type/transaction-type pair and each transaction type in the base-window dataset, as discussed above with reference to FIGS. 22A-B. Then, turning to FIG. 23B, in the nested for-loops of steps 2320-2327, the routine "score logs" counts the occurrences of each log/event-message-type/transaction-type pair and each transaction type in the current-window dataset. In the nested for-loops of steps 2330-2336, the routine "score logs"

calculates and stores the relative occurrence frequencies for each log/event-message-type/transaction-type pair in the base-window dataset and the current-window dataset, as discussed above with reference to FIG. 22B. Turning to FIG. 23C, in the nested for-loops of steps 2340-2352, the routine "score logs" computes the change in the relative frequency of occurrence of log/event-message types in traces corresponding to transaction types, $\Delta_N(y,x)$, in step 2343, as discussed above with reference to FIG. 22B. In step 2350, the cumulative relative changes in the frequencies of occurrence of the log/event messages for each transaction type x, $\mu(x)$, is calculated. Finally, in the nested for-loops steps of steps 2355-2363, in FIG. 23D, the routine "score logs" computes the normalized scores for log/event-message-type/transaction-type pairs, in step 2358, and the transaction-type scores, in step 2361. In step 2365, the routine "score logs" updates the current-window data-set file W and transaction file TR2 to include trace indications, the computed normalized scores for log/event-message-type/transaction-type pairs, and the transaction-type scores. Files are closed and unneeded files are deleted, in step 2366, and the routine "score logs" returns the updated current-window data-set file W and transaction file TR2 in step 2367.

Figure 24:
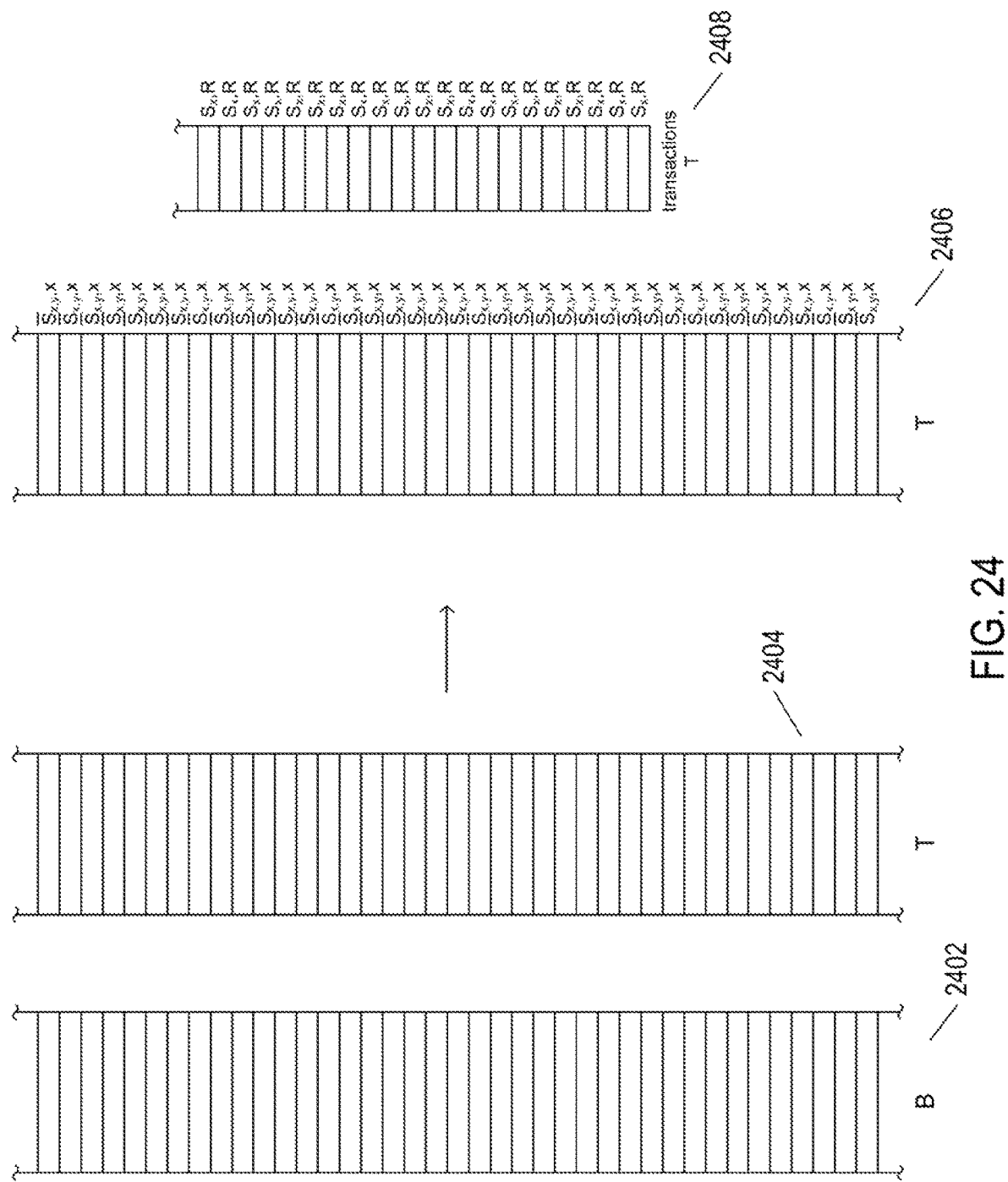
FIG. 24 summarizes the method implemented in the control-flow diagrams of FIGS. 23A-D and illustrated in FIGS. 22A-D.

FIG. 24 summarizes the method implemented in the control-flow diagrams of FIGS. 23A-D and illustrated in FIGS. 22A-D. The method receives a base-window dataset 2402 and a current-window dataset 2404 and returns an updated and annotated current-window dataset 2406 and current-window transaction sequence 2408. Each entry in the current-window dataset is annotated with a normalized score and an indication of the transaction type to which the log/event message represented by the entry belongs. Each entry in the transaction sequence 2408 is annotated with a transaction-type score and a set R of indexes for the log/event messages representing a trace corresponding to the transaction in the current-window dataset 2406. Of course, alternatively, the returned information may be contained in a single file and may be encoded in different alternative formats and organizations, such as a listing the log/event messages that comprise the trace for each transaction.

Figure 25:
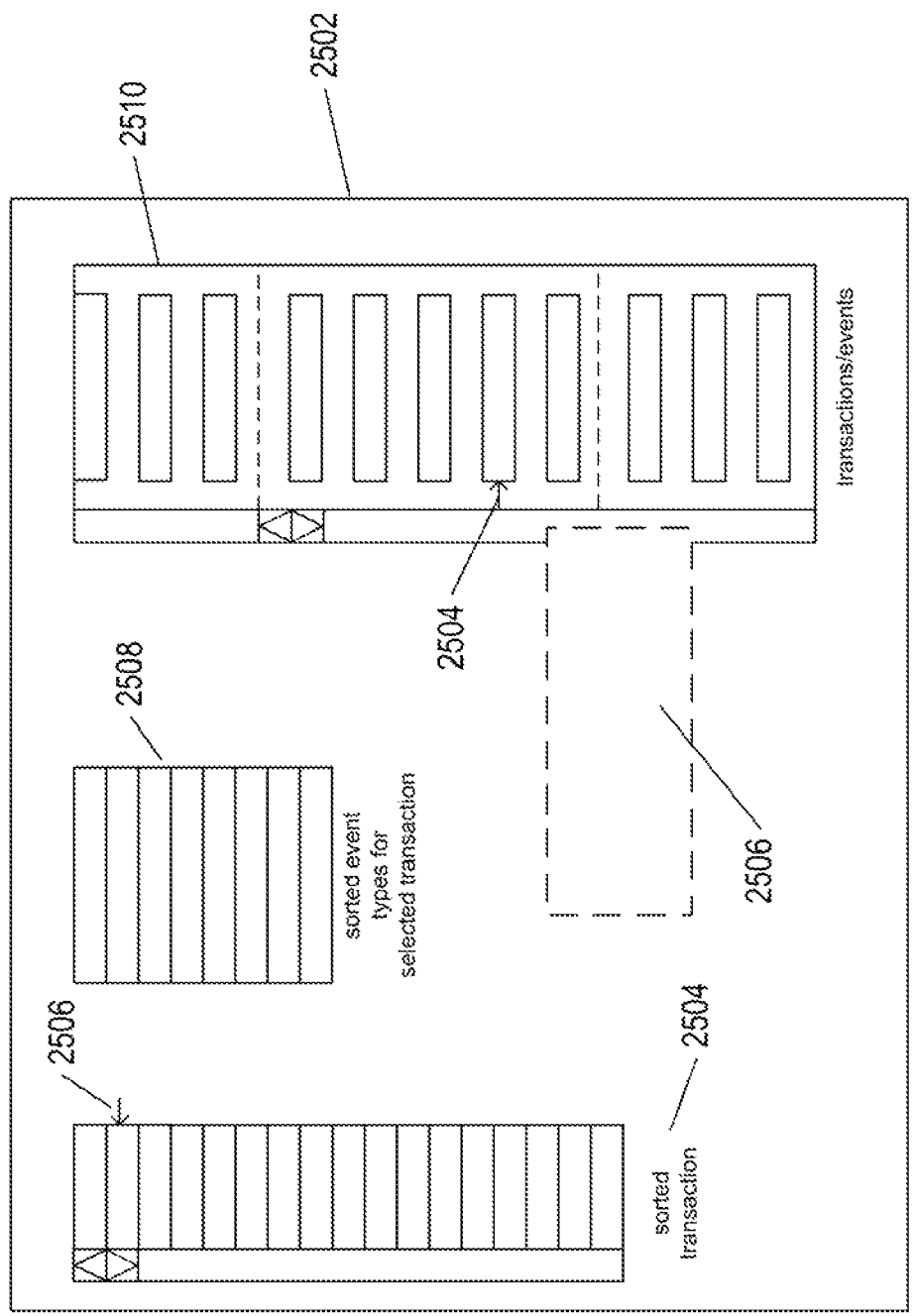
FIG. 25 illustrates one type of information display that can be provided to SRE personnel and other users based on normalized scores for log/event-message-type/transaction-type pairs and transaction-type scores.

FIG. 25 illustrates one type of information display that can be provided to SRE personnel and other users based on normalized scores for log/event-message-type/transaction-type pairs and transaction-type scores. The display 2502 includes a scrollable transaction window 2504 that provides indications of the sequence of transactions in an underlying dataset. A selection feature 2506 can be used to select a particular transaction, with an event-type display window 2508 displaying the types of the log/event messages in the trace for that transaction. In both the transaction display window and event-types display window, the transactions and events are sorted by scores computed by the above-described method. A scrollable transactions/event display window 2510 displays the log/event messages for each transaction in the sequence of transactions in the order that they occur in the dataset, with a selection feature 2504 that allows the full contents of a particular log/event message to be displayed in a details display window 2506. A user can quickly ascertain, from the transaction-display window 2504 and event-type display window 2508 those transactions and log/event messages that may be most relevant to a particular problem for which the dataset was obtained by acquiring the log/event-message query system. The user can then analyze these relevant transactions and messages in the context of the dataset in which they occur, using the transactions/event display window. An additional display window may provide indications of log/event-message types that occur in the base dataset but not in the current dataset, similar to the display 1630 shown in FIG. 16B. The normalized scores for log/event-message-type/transaction-type pairs and transaction-type scores can also be provided to automated error-and-failure detection and analysis systems and/or to and automated error-and-failure detection, analysis, and remediation systems that automatically carry out the analyses and actions carried out by human SRE personnel in many current distributed-computer-system facilities.

Figure 26:
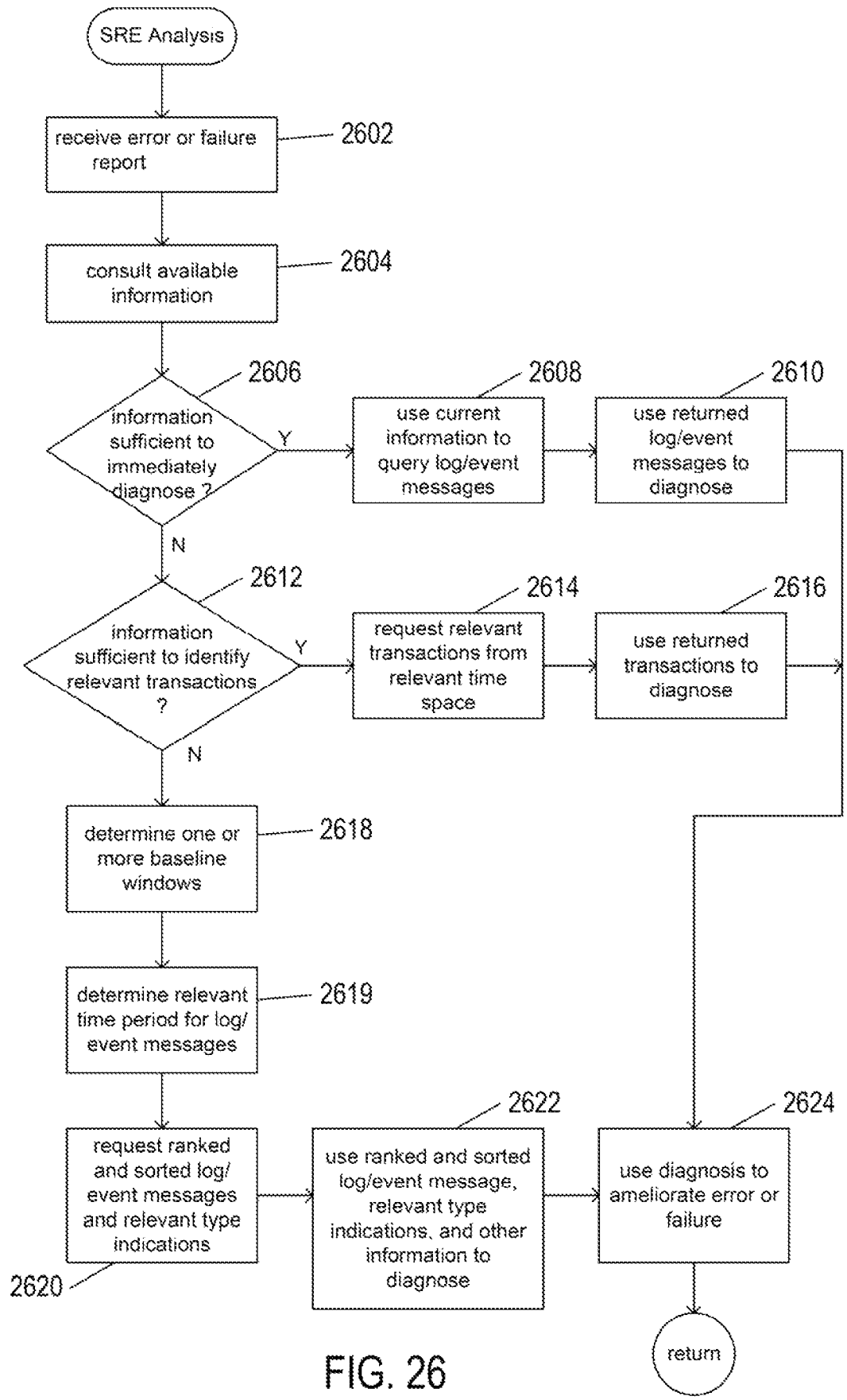
FIG. 26 provides a control-flow diagram for analysis, by an SRE analyst, of a log/event-message dataset obtained from a log/event-a message query system in order to diagnose of a particular problem that has emerged in a distributed computer system.

FIG. 26 provides a control-flow diagram for analysis, by an SRE analyst, of a log/event-message dataset obtained from a log/event-message query system in order to diagnose a particular problem that has emerged in a distributed computer system. In step 2602, the analyst receives an error or failure report. In step 2604, the analyst consults available information that may be relevant to the error or failure. For example, a similar error or failure may have been recently encountered and dealt with, and notes related to the previous occurrence of the error or failure may be available, as a result of which the analyst may be able to quickly identify relevant log/event messages in the dataset and determine possible causes and remedial actions in order to address the error or failure. Alternatively, SRE personnel may have compiled lists of relevant transactions for particular types of errors. Many types of information may be available to the SRE analyst. When the analyst determines that there is sufficient available information to diagnose the problem immediately, as determined in step 2606, the analyst queries the log/event-message query system for relevant messages, in step 2608, and then uses the query results to diagnose the error or failure in step 2610. Otherwise, when the information available is sufficient to identify relevant transactions related to the error or failure, as determined in step 2612, the analyst requests the relevant transactions for a relevant time span from the log/event-message query system, in step 2614, and uses the transactions to diagnose the error failure in step 2616. This, of course, assumes that the log/event-message query system is capable of generating a transaction sequence from the log/event messages stored for the relevant time span. If not, the transaction sequence can be separately generated by the analyst using transaction-sequence-generation tools or applications from log/event messages obtained for the relevant time span. Otherwise, in steps 2618-2619, the analyst determines time intervals for one or more baseline windows and a current window. In step 2620, the analyst requests a display of ranked and sorted log/event messages and relevant transaction-type indications, such as the display shown in FIG. 25, and uses information displayed, in step 2622, to diagnose the error or failure. Finally, in step 2624, the analyst uses the diagnosis obtained in one of steps 2610, 2616, and 2622 to suggest remedial actions and/or undertake remedial actions in order to address the error or failure. The above-discussed method for generating normalized scores for log/event-message-type/transaction-type pairs and transaction-type scores can be implemented, as suggested above, in the log/event-message query subsystem to allow users to receive scored and ranked log/event-message datasets and transaction sequences for input to a display routine or module. Alternatively, the above-discussed method can be implemented as a tool or application that is made available to SRE personnel and other users. Normalized scores for log/event-message-type/transaction-type pairs and transaction-type scores cannot, of course, be generated manually by humans due to the enormous size of the datasets and the many large-scale computational operations involved in generating the normalized scores and transaction-type scores.

The present invention has been described in terms of particular embodiments, it is not intended that the invention be limited to these embodiments. Modifications within the spirit of the invention will be apparent to those skilled in the art. For example, any of many different implementations of the above-disclosed methods and systems can be obtained by varying various design and implementation parameters, including modular organization, control structures, data structures, hardware, operating system, and virtualization layers, and other such design and implementation parameters. As mentioned above, there may be alternative methods for generating normalized scores for log/event-message-type/transaction-type pairs and transaction-type scores, including different types of intermediate calculations and use of different types of data structures.

What is claimed is:

1. An automated method that ranks log/event-message-type transaction-type pairs and transaction types, implemented within one or more computer systems, each having one or more processors and one or more memories, the method comprising:
   receiving a current-window dataset and a base-window dataset;
   identifying traces of transactions in the current-window dataset and the base-window dataset;
   determining relative frequencies of occurrence of log/event-message-type/transaction-type pairs for log event-message types and transaction types that occur in the identified traces of transactions;
   determining changes in relative frequency of occurrence of the log/event-message-type/transaction-type pairs;
   determining, from the changes in relative frequency of occurrence of the log/event-message-type/transaction-type pairs, a normalized score for each of the log/event-message-type/transaction-type pairs;
   determining transaction-type scores using the determined normalized scores for each of the log/event-message-type/transaction-type pairs; and
   providing the normalized scores and transaction-type scores to one or more of
      one or more human analysts, and
      an automated analysis and diagnosis system.

2. The automated method of claim 1
   wherein the current-window dataset and the base-window dataset each comprise log/event messages, each log/event message including a timestamp or other time-related value and each having a log/event-message type;
   wherein the timestamps or other time-related values included in the log/event messages of the current-window dataset fall within a time interval selected to include log/event messages related to a specific error or failure; and
   wherein the timestamps or other time-related values included in the log/event messages of the base-window dataset fall within a time interval selected to include log/event messages unrelated to the specific error or failure.

3. The automated method of claim 1
   wherein a trace is a sequence of one or more log/event-message types corresponding to a transaction corresponding to a time-ordered sequence of log/event messages within one or both of the current-window dataset and the base-window dataset; and
   wherein transactions are groups of logically connected events or operations within a system that each generates a specific set of one or more traces.

4. The automated method of claim 1 wherein identifying traces of transactions in the current-window dataset and the base-window dataset further comprises:
   using indications of transactions and corresponding traces that occur in the current-window dataset and the base-window dataset and, when available, constraints, to select a first set of traces onto which to map the log/event-message types of the log/event-messages of the current-window dataset, the selected first set of traces satisfying a maximum number of constraints satisfied by any possible trace set; and
   using indications of transactions and corresponding traces that occur in the current-window dataset and the base-window dataset and, when available, constraints, to select a second set of traces onto which to map the log/event-message types of the log/event messages of the base-window dataset, the selected second set of traces satisfying a maximum number of constraints satisfied by any possible trace set.

5. The automated method of claim 1 wherein determining relative frequencies of occurrence of log/event-message-type/transaction-type pairs for log/event-message types and transaction types that occur in the identified traces of transactions further comprises:
   for each dataset,
      for each identified trace,
         incrementing a count of each log/event-message-type/transaction-type pair that includes a log/event-message type in the identified trace; and
         incrementing a count of the transaction type corresponding to the identified trace; and
   for each dataset,
      generating a relative frequency for each log/event-message-type/transaction-type pair by dividing the count of the log/event-message-type/transaction-type pair by the count of the transaction type in the log/event-message-type/transaction-type pair.

6. The automated method of claim 1 wherein determining changes in relative frequency of occurrence of the log/event-message-type/transaction-type pairs further comprises:
   for each event-message-type/transaction-type pair, determining a change in relative frequency of occurrence for the log/event-message-type/transaction-type pair by
      generating a difference by subtracting the relative frequency for the log/event-message-type/transaction-type pair generated from one of the current-window dataset and the base-window dataset from the relative frequency for the log/event-message-type/transaction-type pair generated from the other of the current-window dataset and the base-window dataset; and
      dividing the difference by the relative frequency for the log/event-message-type/transaction-type pair generated from the base-window dataset.

7. The automated method of claim 1 wherein determining, from the changes in relative frequency of occurrence of the log/event-message-type/transaction-type pairs, a normalized score for each of the log/event-message-type/transaction-type pairs further comprises:
   for each log/event-message-type/transaction-type pair,
      generating a score by
         generating a difference by subtracting a cumulative change in relative frequencies of occurrence of log/event-message-types for the transaction type of the log/event-message-type/transaction-type pair from the change in relative frequency of occurrence of the log, vent-message-type/transaction-type pair, and dividing the difference by the cumulative change in relative frequencies of occurrence of log/event-message-types for the transaction type of the log/event-message-type/transaction-type pair; and for each score, generating a normalized score.

8. The automated method of claim 7 wherein a cumulative change in relative frequencies of occurrence of log/event-message-types for a transaction type is generated by:

generating a sum of changes in relative frequencies of occurrence of the log/event-message-types that occur in traces corresponding to the transaction type, and dividing the sum by a number of log/event-message-types that occur in traces corresponding to the transaction type.

9. The automated method of claim 7 wherein a normalized score is generated for a log/event-message-type/transaction-type pair by:

generating a first difference by subtracting a minimum log/event-message-type/transaction-type-pair score for the transaction-type of the log/event-message-type/transaction-type-pair from the score generate for the log/event-message-type/transaction-type-pair; and dividing the difference by a second difference generated by subtracting the minimum log/event-message-type/transaction-type-pair score for the transaction-type of the log/event-message-type/transaction-type-pair from a maximum log/event-message-type/transaction-type-pair score for the transaction-type of the log, event-message-type/transaction-type-pair.

10. The automated method of claim 1 wherein determining transaction-type scores using the determined normalized scores for each of the log/event-message-type/transaction-type pairs further comprises:

for each transaction type, determining a cumulative normalized score as the sum of the normalized scores for the log/event-message-type/transaction-type pairs for the transaction type, and dividing the cumulative normalized score by the number of log/event-message-type/transaction-type pairs for the transaction type.

11. The automated method of claim 1 wherein the normalized scores and transaction-type scores are provided to one or more of one or more human analysts and an automated analysis and diagnosis system as relevance rankings of log/event-message-type/transaction-type pairs and transaction type with respect to a particular specific error or failure for diagnosis of which the current-window dataset and the base-window dataset were generated.

12. A method that analyzes an error or a failure in a system, the method comprising:

receiving an error report or a failure report;

consulting available information regarding the error or the failure reported in the error report or the failure report;

when the available information is sufficient to identify log/event messages relevant to the error or the failure, querying a log/event-message query system to retrieve the identified log/event messages, and using the retrieved log/event messages to diagnose the error or the failure;

when the available information is not sufficient to identify log/event messages relevant to the error or the failure but is sufficient to identify transaction types relevant to the error or the failure, querying the log/event-message query system to retrieve traces corresponding to the identified transactions, and using the retrieved traces to diagnose the error or the failure; and when the available information is not sufficient to identify log/event messages relevant to the error or the failure and not sufficient to identify transaction types relevant to the error or the failure, querying the log/event-message query system to generate a current-window data set and a base-window dataset;

applying an automated method to the current-window data set and the base-window dataset to generate transactions from each of the current-window data set and a base-window dataset and to generate a normalized score for each log/event-message-type/transaction-type pair and a score for each transaction type; and using the normalized scores and transaction-type scores to diagnose the error or the failure.

13. The method of claim 12 wherein the automated method generates normalized scores and transaction-type scores by:

identifying traces of transactions in the current-window dataset and the base-window dataset;

determining relative frequencies of occurrence of log/event-message-type/transaction-type pairs for log, event-message types and transaction types that occur in the identified traces of transactions;

determining changes in relative frequency of occurrence of the log/event-message-type/transaction-type pairs;

determining, from the changes in relative frequency of occurrence of the log/event-message-type/transaction-type pairs, a normalized score for each of the log, event-message-type/transaction-type pairs; and determining transaction-type scores using the determined normalized scores for each of the log/event-message-type/transaction-type pairs.

14. The method of claim 13 wherein the current-window dataset and the base-window dataset each comprise log/event messages, each log/event message including a timestamp or other time-related value and each having a log/event-message type;

wherein the timestamps or other time-related values included in the log/event messages of the current-window dataset fall within a time interval selected to include log/event messages related to a specific error or failure; and wherein the timestamps or other time-related values included in the log/event messages of the base-window dataset fall within a time interval selected to include log/event messages unrelated to the specific error or failure.

15. The method of claim 13 wherein a trace is a sequence of one or more log/event-message types corresponding to a transaction corresponding to a time-ordered sequence of log/event messages within one or both of the current-window dataset and the base-window dataset; and wherein transactions are groups of logically connected events or operations within a system that each generates a specific set of one or more traces.

16. The method of claim 13 wherein identifying traces of transactions in the current-window dataset and the base-window dataset further comprises:
  using indications of the transactions and corresponding traces that occur in the current-window dataset and the base-window dataset and, when available, constraints, to select a first set of traces onto which to map the log/event-message types of the log/event messages of the current-window dataset, the selected first set of traces satisfying a maximum number of constraints satisfied by any possible trace set; and
  using indications of the transactions and corresponding traces that occur in the current-window dataset and the base-window dataset and, when available, constraints, to select a second set of traces onto which to map the log/event-message types of the log/event-messages of the base-window dataset, the selected second set of traces satisfying a maximum number of constraints satisfied by any possible trace set.

17. The method of claim 13 wherein determining relative frequencies of occurrence of log/event-message-type/transaction-type pairs for log/event-message types and transaction types that occur in the identified traces of transactions further comprises:
  for each dataset,
    for each identified trace,
      incrementing a count of each log/event-message-type/transaction-type pair that includes a log/event-message type in the identified trace; and
      incrementing a count of the transaction type corresponding to the identified trace; and
  for each dataset,
    generating a relative frequency for each log/event-message-type/transaction-type pair by dividing the count of the log/event-message-type/transaction-type pair by the count of the transaction type in the log/event-message-type/transaction-type pair.

18. The method of claim 13 wherein determining changes in relative frequency of occurrence of the log/event-message-type/transaction-type pairs further comprises:
  for each event-message-type/transaction-type pair, determining a change in relative frequency of occurrence for the log/event-message-type/transaction-type pair by
    generating a difference by subtracting the relative frequency for the log/event-message-type/transaction-type pair generated from one of the current-window dataset and the base-window dataset from the relative frequency for the log/event-message-type/transaction-type pair generated from the other of the current-window dataset and the base-window dataset; and
    dividing the difference by the relative frequency for the log/event-message-type/transaction-type pair generated from the base-window dataset.

19. The method of claim 13 wherein determining, from the changes in relative frequency of occurrence of the log/event-message-type/transaction-type pairs, a normalized score for each of the log/event-message-type/transaction-type pairs further comprises:
  for each log/event-message-type/transaction-type pair,
    generating a score by
      generating a difference by subtracting a cumulative change in relative frequencies of occurrence of log/event-message-type for the transaction type of the log/event-message-type/transaction-type pair from the change in relative frequency of occurrence of the log/event-message-type/transaction-type pair, and
      dividing the difference by the cumulative change in relative frequencies of occurrence of log/event-message-types for the transaction type of the log/event-message-type/transaction-type pair; and
  for each score,
    generating a normalized score.

20. The method of claim 19 wherein a cumulative change in relative frequencies of occurrence of log/event-message-types for a transaction type is generated by:
  generating a sum of changes in relative frequencies of occurrence of the log/event-message-types that occur in traces corresponding to the transaction type, and
  dividing the sum by a number of log/event-message-types that occur in traces corresponding to the transaction type.

21. The method of claim 19 wherein a normalized score is generated for a log/event-message-type/transaction-type pair by:
  generating a first difference by subtracting a minimum log/event-message-type/transaction-type-pair score for the transaction-type of the log/event-message-type/transaction-type-pair from the score generate for the log/event-message-type/transaction-type-pair; and
  dividing the difference by a second difference generated by subtracting the minimum log/event-message-type/transaction-type-pair score for the transaction-type of the log/event-message-type/transaction-type-pair from a maximum log/event-message-type/transaction-type-pair score for the transaction-type of the log/event-message-type transaction-type-pair.

22. The method of claim 21 wherein determining transaction-type scores using the determined normalized scores for each of the log/event-message-type/transaction-type pairs further comprises:
  for each transaction type,
    determining a cumulative normalized score as the sum of the normalized scores for the log/event-message-type/transaction-type pairs for the transaction type, and
    dividing the cumulative normalized score by the number of log/event-message-type/transaction-type pairs for the transaction type.

23. A system comprising:
  one or more processors;
  one or more memories;
  and computer instructions stored in one or more of the one or more memories that, when executed by the one or more processors, rank log/event-message-type transaction-type pairs and transaction types by
    receiving a current-window dataset and a base-window dataset;
    identifying traces of transactions in the current-window dataset and the base-window dataset;
    determining relative frequencies of occurrence of log/event-message-type/transaction-type pairs for log/event-message types and transaction types that occur in the identified traces of transactions;
    determining changes in relative frequency of occurrence of the log/event-message-type/transaction-type pairs;
    determining, from the changes in relative frequency of occurrence of the log/event-message-type transaction-type pairs, a normalized score for each of the log/event-message-type/transaction-type pairs;
determining transaction-type scores using the determined normalized scores for each of the log/event-message-type/transaction-type pairs; and
providing the normalized scores and transaction-type scores to one or more of
one or more human analysts, and
an automated analysis and diagnosis system.

24. A physical data-storage device that stores computer instructions that, when executed by processors within one or more computer systems, control the one or more computer systems to rank log/event-message-type/transaction-type pairs and transaction types by:
receiving a current-window dataset and a base-window dataset;
identifying traces of transactions in the current-window dataset and the base-window dataset;
determining relative frequencies of occurrence of log/event-message-type/transaction-type pairs for log/event-message types and transaction types that occur in the identified traces of transactions;
determining changes in relative frequency of occurrence of the log, event-message-type/transaction-type pairs;
determining, from the changes in relative frequency of occurrence of the log/event-message-type/transaction-type pairs, a normalized score for each of the log/event-message-type/transaction-type pairs;
determining transaction-type scores using the determined normalized scores for each of the log/event-message-type/transaction-type pairs; and
providing the normalized scores and transaction-type scores to one or more of
one or more human analysts, and
an automated analysis and diagnosis system.

* * * * *